US012675256B2

(12) United States Patent
D'Amato et al.

(10) Patent No.: US 12,675,256 B2
(45) Date of Patent: Jul. 7, 2026

(54) WIRELESS POWER TRANSFER FOR AUDIO PLAYBACK DEVICES

(71) Applicant: Sonos, Inc., Goleta, CA (US)

(72) Inventors: Nicholas D'Amato, Santa Barbara, CA (US); Chadwick Souza, Providence, RI (US); Jonathan Cole Harris, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 113 days.

(21) Appl. No.: 18/175,308

(22) Filed: Feb. 27, 2023

(65) Prior Publication Data

US 2023/0205486 A1     Jun. 29, 2023

Related U.S. Application Data

(63) Continuation of application No. PCT/US2021/071327, filed on Aug. 31, 2021.
(Continued)

(51) Int. Cl.
*G06F 3/16*          (2006.01)
*H02J 50/00*          (2016.01)
(Continued)

(52) U.S. Cl.
CPC ............. *G06F 3/165* (2013.01); *H02J 50/00* (2016.02); *H04R 3/00* (2013.01); *H04R 3/12* (2013.01); *H04R 2430/01* (2013.01)

(58) Field of Classification Search
CPC  G06F 3/165; G06F 3/167; H02J 50/00; H02J 50/60; H02J 7/00034; H02J 7/0048; H02J 9/005; H04R 3/00; H04R 2430/01; H04R 3/12; H04R 1/1025; H04R 2227/005; H04R 2420/07; H04R 1/1041; H04N 21/43615; H04N 21/43637; H04N 21/443; H04N 21/8113; H04N 21/4436
See application file for complete search history.

(56) References Cited

U.S. PATENT DOCUMENTS 5,440,644  A     8/1995   Farinelli et al.
5,761,320  A     6/1998   Farinelli et al.
(Continued)

FOREIGN PATENT DOCUMENTS

CN          110290412  B     11/2019
EP            1389853  A1     2/2004
(Continued)

OTHER PUBLICATIONS

Audio Tron Quick Start Guide, Version 1.0, Mar. 2001, 24 pages.
(Continued)

*Primary Examiner* — Angelica M McKinney
(74) *Attorney, Agent, or Firm* — Fortem IP LLP

(57)          ABSTRACT

Disclosed herein are devices (e.g., audio playback devices) configured to transmit and/or receive wireless power. Wireless power can be transferred using mid-range or long-range techniques, such as electromagnetic radiation (e.g., lasers, microwaves) or electromagnetic coupling (e.g., inductive coupling, capacitive coupling). Device performance and/or power transmission may be modified dynamically based on wireless power levels, user behavior, the behavior of other devices, device grouping, or other parameters.

20 Claims, 34 Drawing Sheets

Related U.S. Application Data

(60) Provisional application No. 62/706,647, filed on Aug. 31, 2020.

(51) Int. Cl.
H04R 3/00 (2006.01)
H04R 3/12 (2006.01)

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,787,913 B2 | 8/2010 | Cornell | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,942,252 B2 | 1/2015 | Balassanian et al. | |
| 9,860,644 B1 * | 1/2018 | Ramos | H03G 5/165 |
| 10,050,477 B2 | 8/2018 | Nago | |
| 10,957,319 B2 | 3/2021 | Zhu et al. | |
| 11,019,438 B2 | 5/2021 | Mayman et al. | |
| 11,206,052 B1 | 12/2021 | Park et al. | |
| 12,081,289 B2 | 9/2024 | Choi et al. | |
| 12,341,350 B2 | 6/2025 | Park et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2004/0024478 A1 | 2/2004 | Hans et al. | |
| 2007/0142944 A1 | 6/2007 | Goldberg et al. | |
| 2010/0262266 A1 | 10/2010 | Chang et al. | |
| 2012/0294463 A1 | 11/2012 | Chu et al. | |
| 2014/0204641 A1 | 7/2014 | Gaudreau et al. | |
| 2014/0232333 A1 * | 8/2014 | Kim | G06F 1/30 |
| | | | 320/108 |
| 2014/0300317 A1 | 10/2014 | Kim | |
| 2016/0204641 A1 | 7/2016 | Woo et al. | |
| 2016/0204642 A1 | 7/2016 | Oh et al. | |
| 2016/0246566 A1 | 8/2016 | Fullerton et al. | |
| 2017/0054778 A1 | 2/2017 | Tornielli | |
| 2018/0254654 A1 | 9/2018 | Ikefuji | |
| 2018/0301939 A1 * | 10/2018 | Byun | H02J 50/12 |
| 2018/0301941 A1 * | 10/2018 | Kim | G05F 1/66 |
| 2020/0006988 A1 | 1/2020 | Leabman | |
| 2020/0125158 A1 * | 4/2020 | Giusti | G01S 13/04 |
| 2020/0220367 A1 | 7/2020 | Cho et al. | |
| 2020/0336010 A1 | 10/2020 | Holmvik et al. | |
| 2020/0364703 A1 | 11/2020 | Joveski et al. | |
| 2021/0377714 A1 * | 12/2021 | Meyer | G08B 5/00 |

FOREIGN PATENT DOCUMENTS

| | | | |
|---|---|---|---|
| JP | 2008005573 A | 1/2008 |
| JP | 2008161045 A | 7/2008 |
| JP | 2011101326 A | 5/2011 |
| JP | 2012085499 A | 4/2012 |
| JP | 2012147417 A | 8/2012 |
| JP | 2012254003 A | 12/2012 |
| JP | 2013169100 A | 8/2013 |
| JP | 2013540409 A | 10/2013 |
| JP | 2014534801 A | 12/2014 |
| JP | 2017034563 A | 2/2017 |
| JP | 2017076914 A | 4/2017 |
| JP | 2017212849 A | 11/2017 |
| JP | 2018102099 A | 6/2018 |
| TW | 201129000 A | 8/2011 |
| WO | 200153994 | 7/2001 |
| WO | 2003093950 A2 | 11/2003 |
| WO | 2017043434 A1 | 3/2017 |
| WO | 2017119646 A2 | 7/2017 |
| WO | 2019139326 A1 | 7/2019 |
| WO | 2021243377 A1 | 12/2021 |

OTHER PUBLICATIONS

Audio Tron Reference Manual, Version 3.0, May 2002, 70 pages.
Audio Tron Setup Guide, Version 3.0, May 2002, 38 pages.
Australian Patent Office, Australian Examination Report Action mailed on May 9, 2023, issued in connection with Australian Application No. 2021332597, 4 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Examination Report mailed on May 25, 2023, issued in connection with Canadian Application No. 3192552, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European EPC Article 94.3 mailed on Jul. 26, 2023, issued in connection with European Application No. 21782861.5, 44 pages.
International Bureau, International Search Report and Written Opinion mailed on Feb. 14, 2022, issued in connection with International Application No. PCT/US2021/071327, filed on Aug. 31, 2021, 17 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
Sonos, Inc. v. DM Holdings (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.

(56) References Cited

OTHER PUBLICATIONS

Yamaha DME Designer 3.5 setup manual guide; copyright 2004, 16 pages.
Yamaha DME Designer 3.5 User Manual; Copyright 2004, 507 pages.
International Search Report and Written Opinion mailed Feb. 14, 2022; International Application No. PCT/US2021/071327; 17 pages.
Australian Patent Office, Examination Report mailed on Jul. 1, 2024, issued in connection with Australian Application No. 2023229492, 4 pages.
Canadian Patent Office, Canadian Examination Report mailed on May 17, 2024, issued in connection with Canadian Application No. 3192552, 5 pages.
European Patent Office, European EPC Article 94.3 mailed on Mar. 1, 2024, issued in connection with European Application No. 21782861.5, 5 pages.
European Patent Office, European EPC Article 94.3 mailed on Oct. 27, 2023, issued in connection with European Application No. 21782861.5, 6 pages.
European Patent Office, European Extended Search Report mailed on Jul. 30, 2024, issued in connection with European Application No. 24155508.5, 32 pages.
European Patent Office, European Extended Search Report mailed on Aug. 7, 2024, issued in connection with European Application No. 24155507.7, 8 pages.
International Bureau, International Preliminary Report on Patentability and Written Opinion, mailed on Mar. 9, 2023, issued in connection with International Application No. PCT/US2021/071327, filed on Aug. 31, 2021, 12 pages.

Japanese Patent Office, Decision of Refusal and Translation mailed on Apr. 2, 2024, issued in connection with Japanese Patent Application No. 2023-514079, 7 pages.
Australian Patent Office, Australian Examination Report Action mailed on Jun. 5, 2025, issued in connection with Australian Application No. 2023229492, 3 pages.
Canadian Patent Office, Canadian Examination Report mailed on Feb. 27, 2025, issued in connection with Canadian Application No. 3192552, 6 pages.
Corrected Notice of Allowance mailed on Sep. 30, 2025, issued in connection with U.S. Appl. No. 18/175,320, filed Feb. 27, 2023, 06 pages.
Final Office Action mailed on Jun. 6, 2025, issued in connection with U.S. Appl. No. 18/175,320, filed Feb. 27, 2023, 21 pages.
Final Office Action mailed on May 29, 2025, issued in connection with U.S. Appl. No. 18/175,314, filed Feb. 27, 2023, 08 pages.
Japanese Patent Office, Notice of Reasons for Refusal and Translation mailed on Apr. 30, 2025, issued in connection with Japanese Patent Application No. 2024-074356, 12 pages.
Japanese Patent Office, Office Action and Translation mailed on Sep. 30, 2025, issued in connection with Japanese Application No. 2024-074356, 7 pages.
Non-Final Office Action mailed on Feb. 3, 2025, issued in connection with U.S. Appl. No. 18/175,320, filed Feb. 27, 2023, 15 pages.
Non-Final Office Action mailed on Feb. 19, 2025, issued in connection with U.S. Appl. No. 18/175,314, filed Feb. 27, 2023, 8 pages.
Notice of Allowance mailed on Aug. 7, 2025, issued in connection with U.S. Appl. No. 18/175,314, filed Feb. 27, 2023, 09 pages.
Notice of Allowance mailed on Sep. 15, 2025, issued in connection with U.S. Appl. No. 18/175,320, filed Feb. 27, 2023, 08 pages.

* cited by examiner

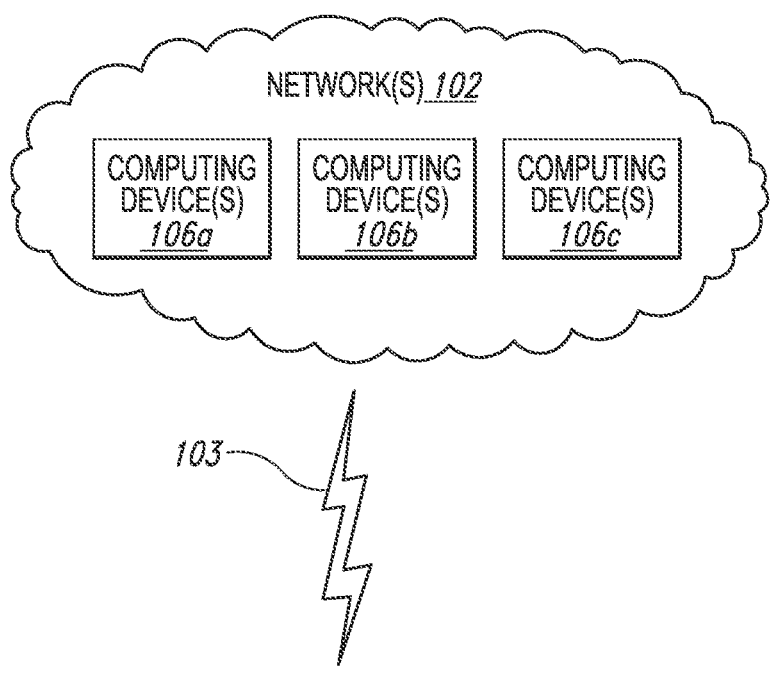
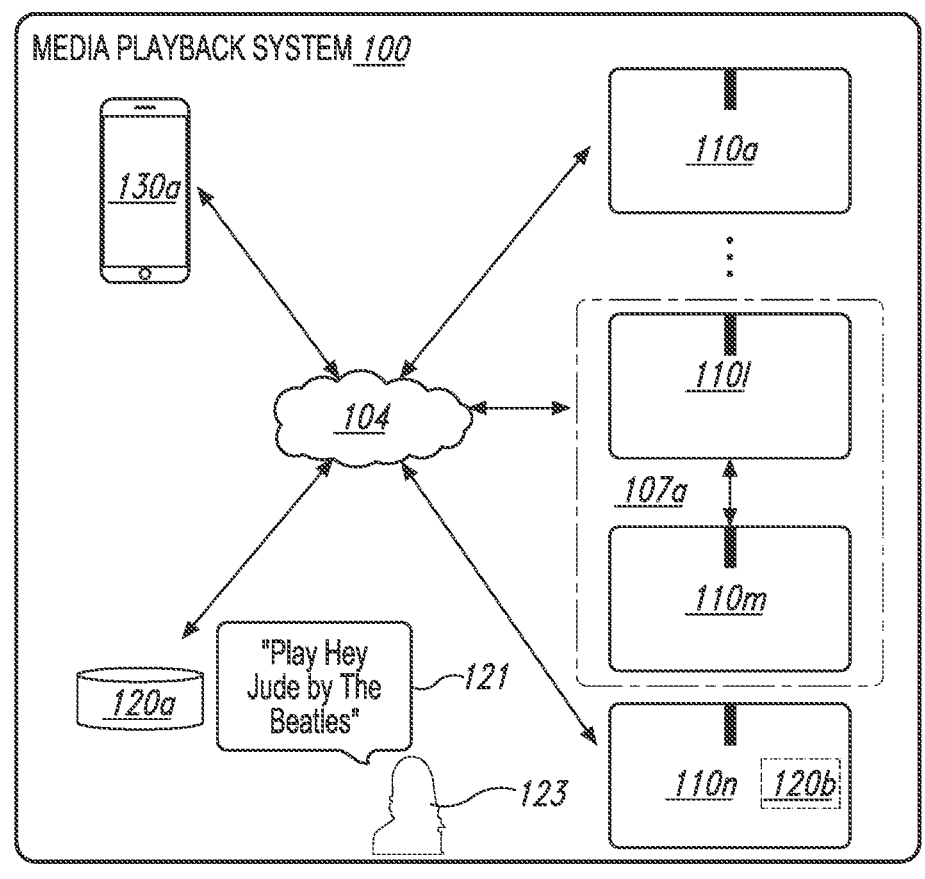
*Fig. 1B*

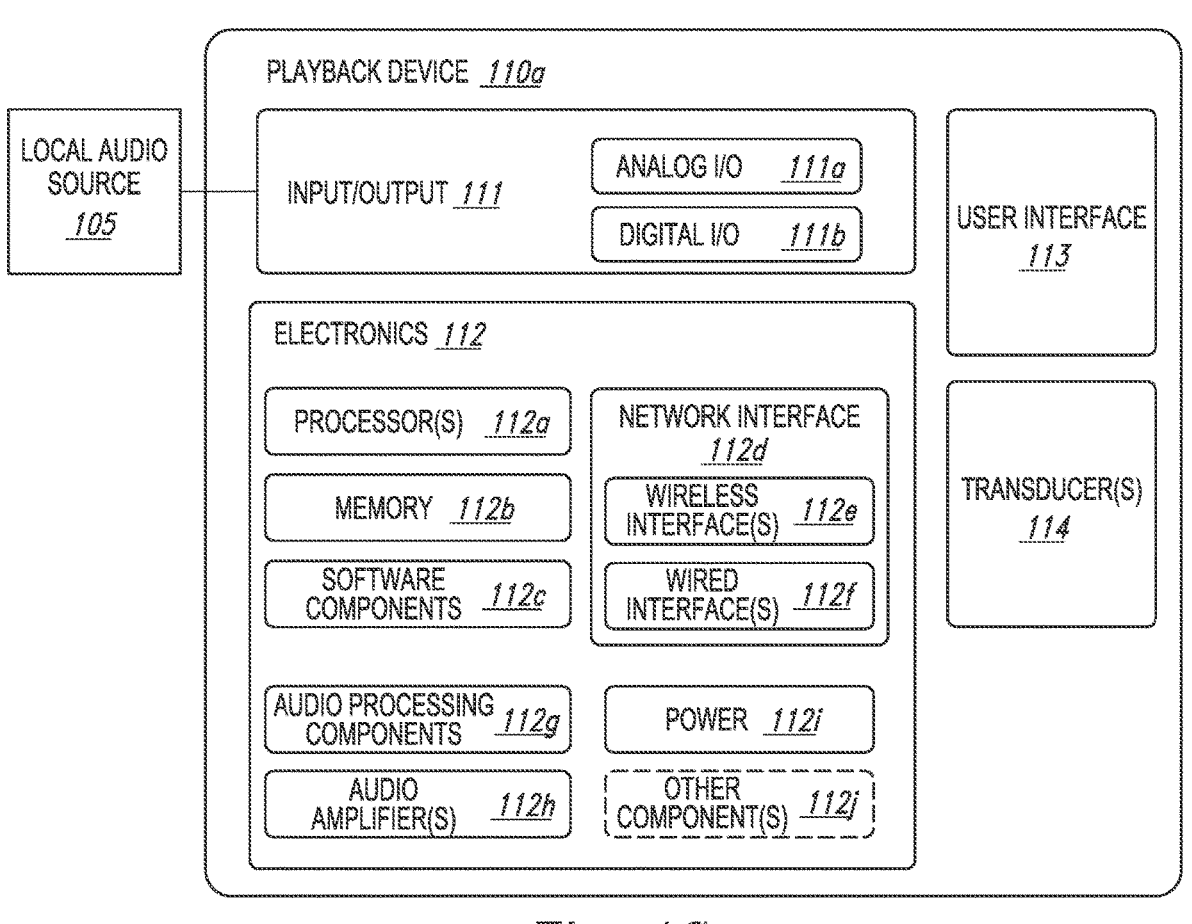
*Fig. 1C*
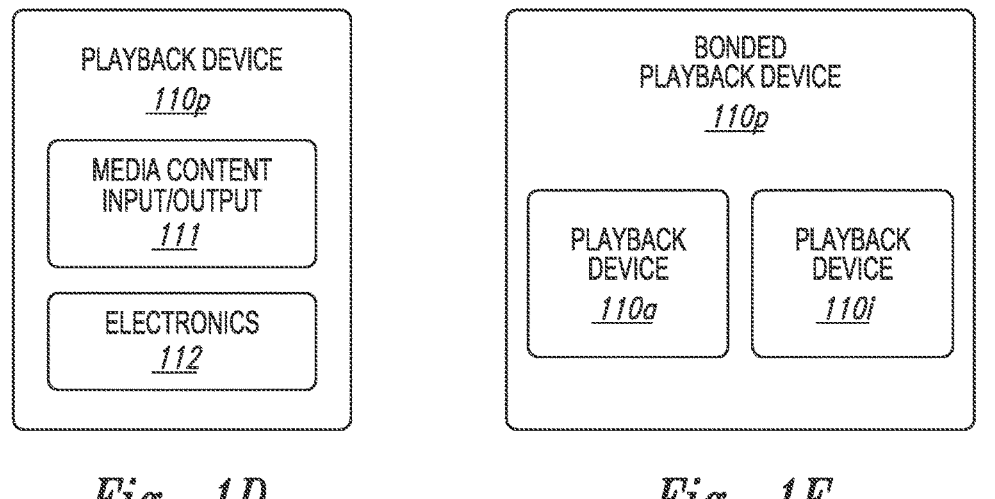
*Fig. 1D*          *Fig. 1E*

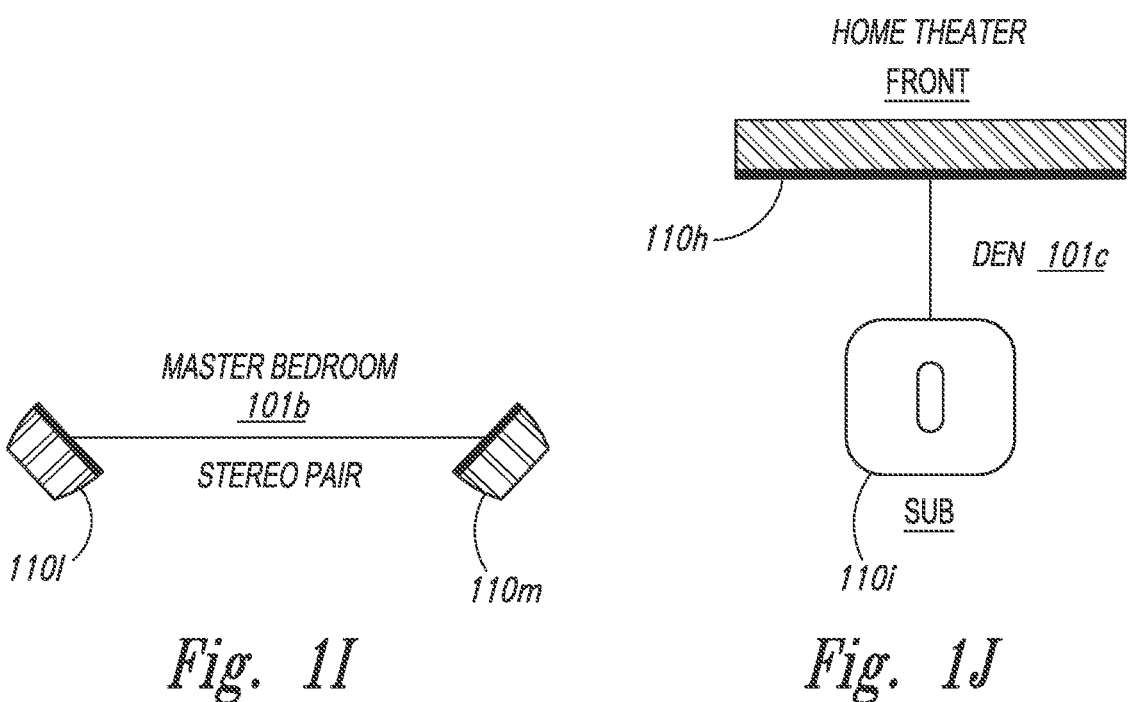
*Fig. 1I*
*Fig. 1J*
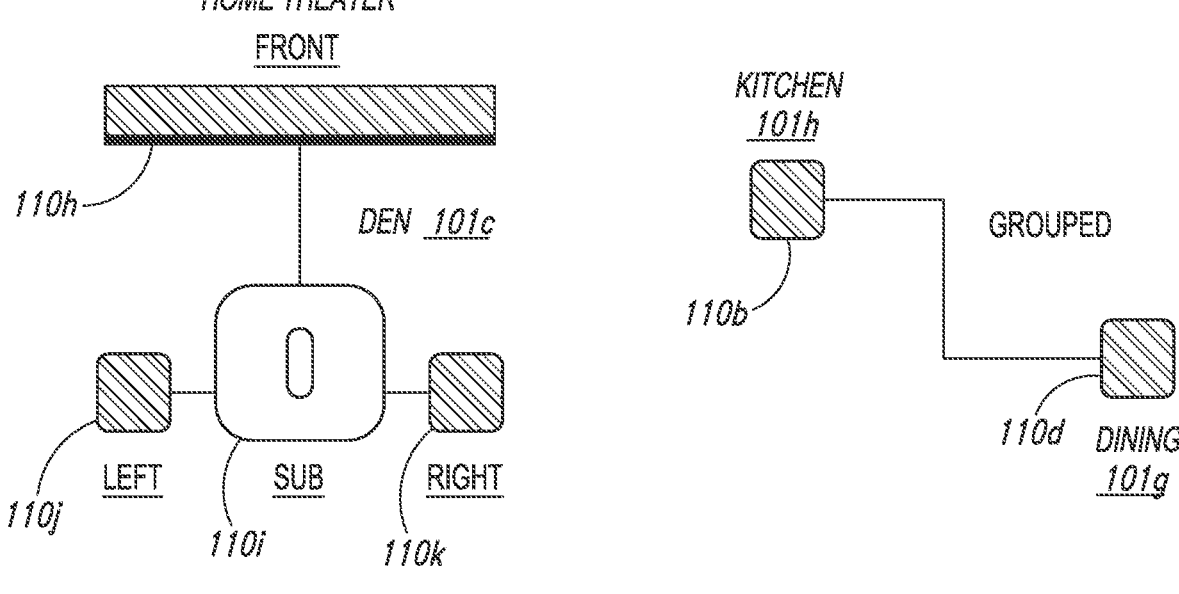
*Fig. 1K*
*Fig. 1L*

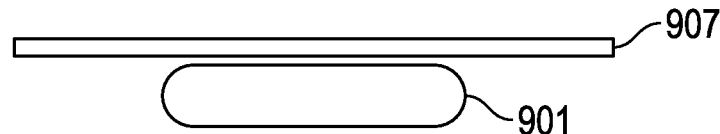
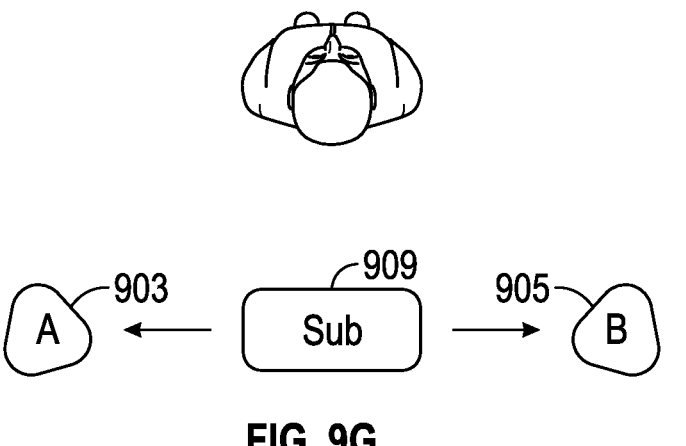
FIG. 9G
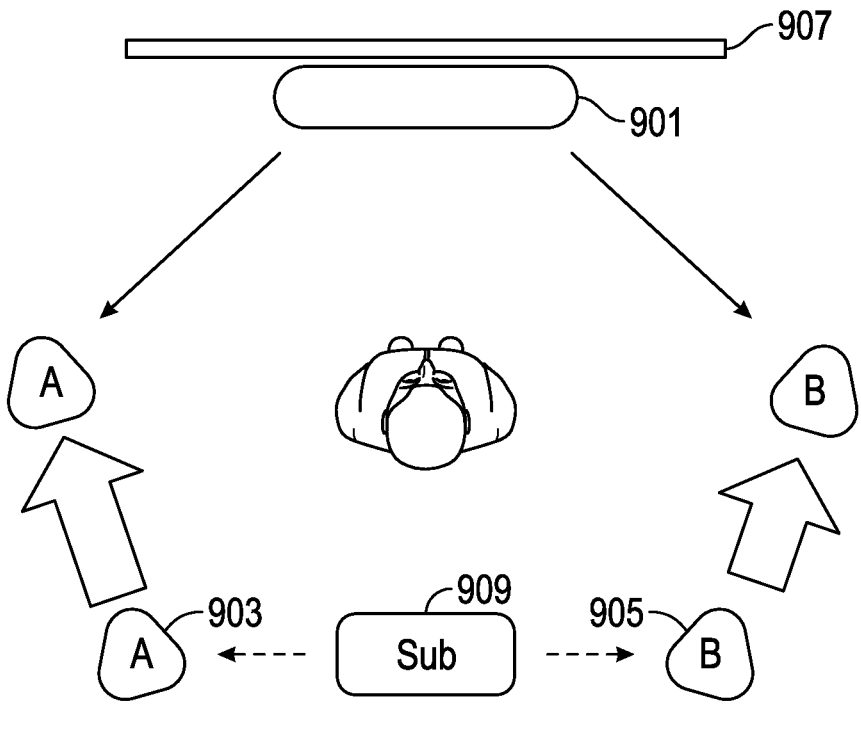
FIG. 9H

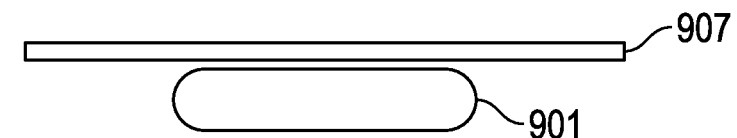
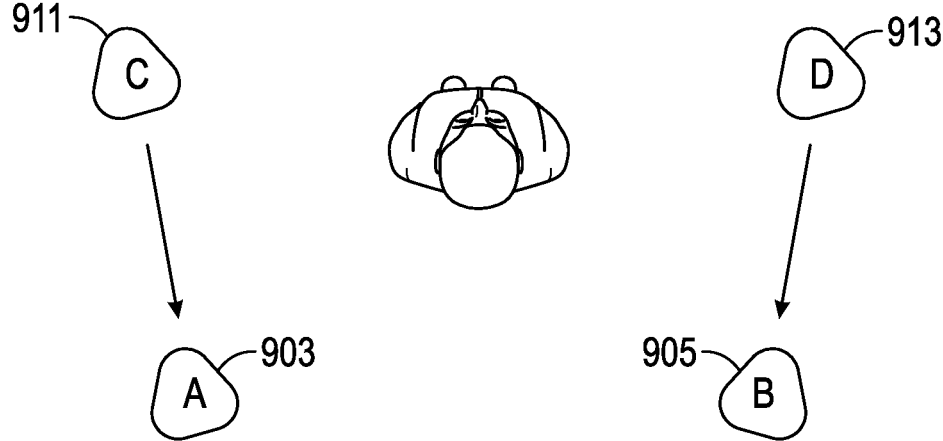
FIG. 9K
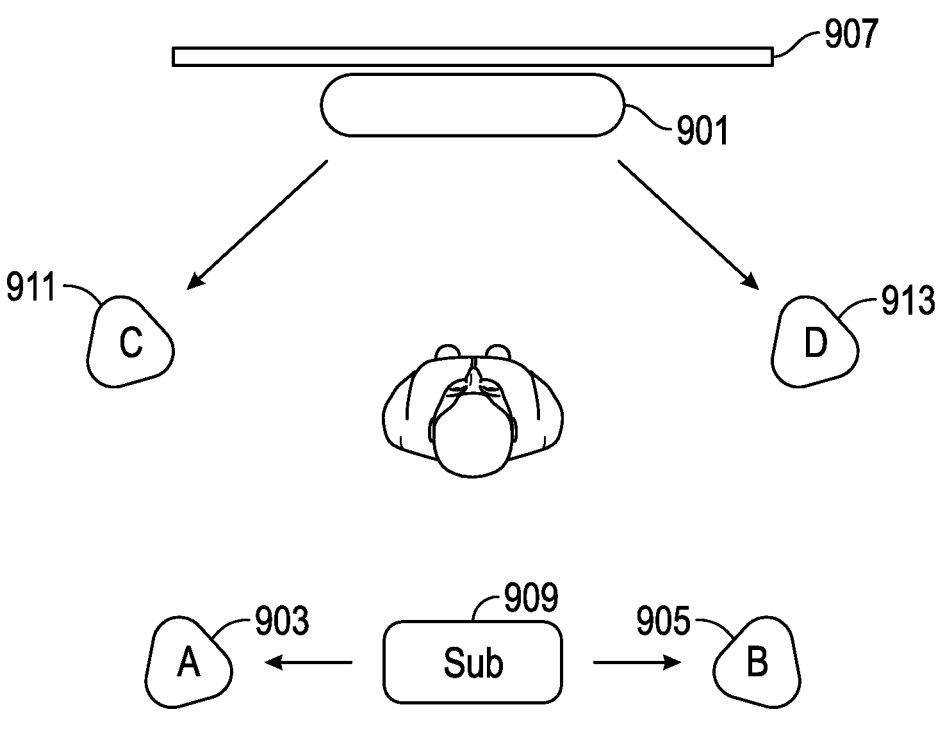
FIG. 9L

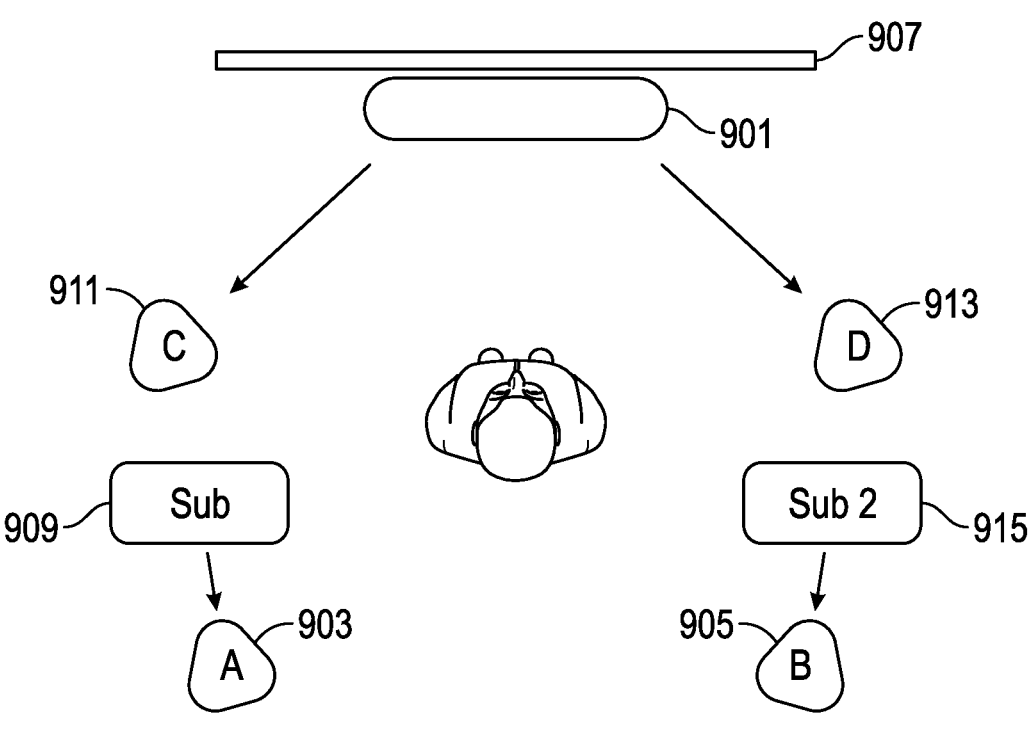
FIG. 9S
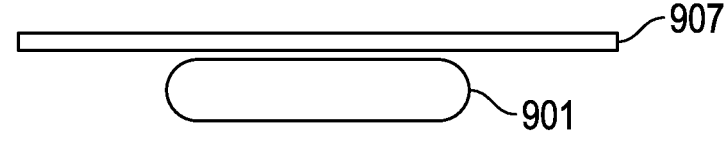
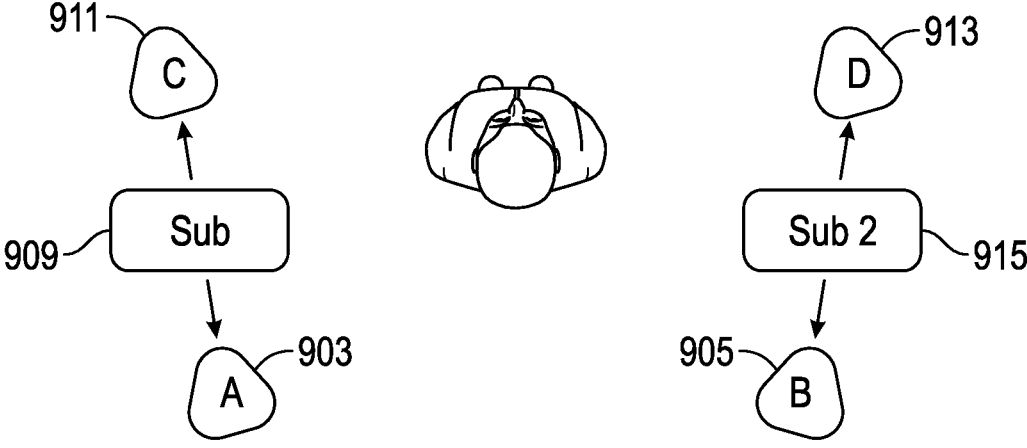
FIG. 9T

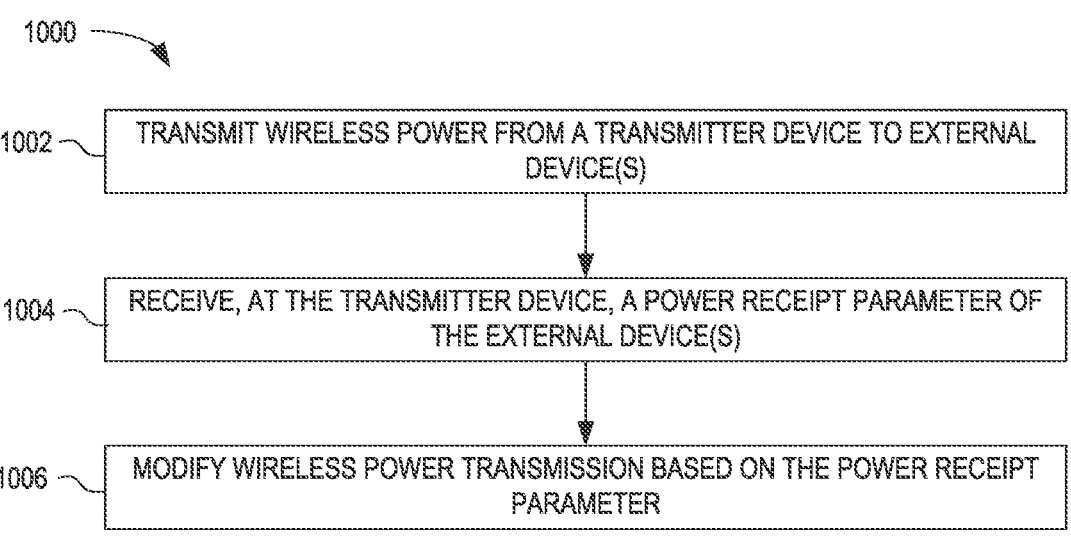

1000

1002 — TRANSMIT WIRELESS POWER FROM A TRANSMITTER DEVICE TO EXTERNAL DEVICE(S)

1004 — RECEIVE, AT THE TRANSMITTER DEVICE, A POWER RECEIPT PARAMETER OF THE EXTERNAL DEVICE(S)

1006 — MODIFY WIRELESS POWER TRANSMISSION BASED ON THE POWER RECEIPT PARAMETER

*Fig. 10*

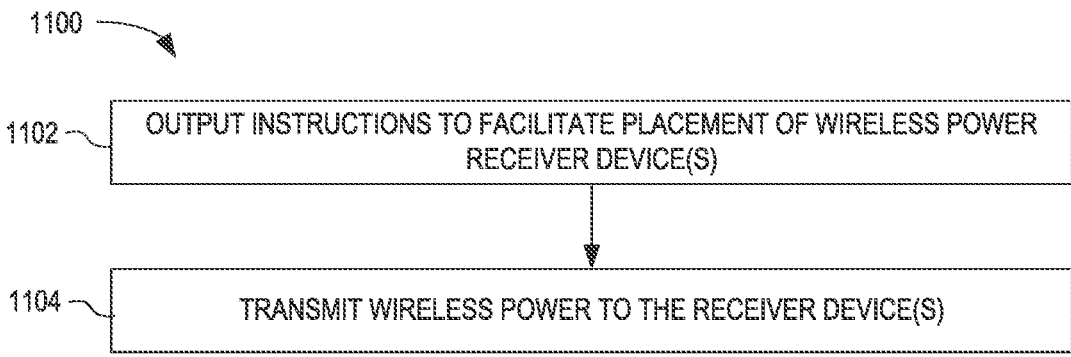

1100

1102 — OUTPUT INSTRUCTIONS TO FACILITATE PLACEMENT OF WIRELESS POWER RECEIVER DEVICE(S)

1104 — TRANSMIT WIRELESS POWER TO THE RECEIVER DEVICE(S)

*Fig. 11*

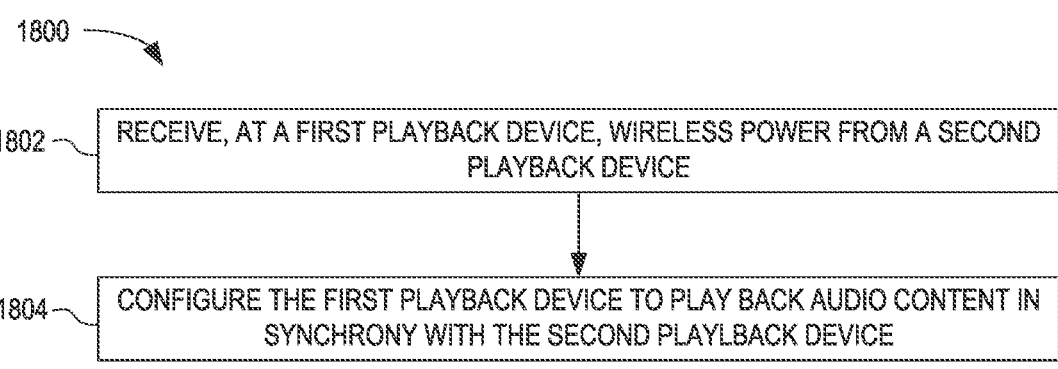

1800

1802 — | RECEIVE, AT A FIRST PLAYBACK DEVICE, WIRELESS POWER FROM A SECOND PLAYBACK DEVICE

1804 — | CONFIGURE THE FIRST PLAYBACK DEVICE TO PLAY BACK AUDIO CONTENT IN SYNCHRONY WITH THE SECOND PLAYLBACK DEVICE

*Fig. 18*

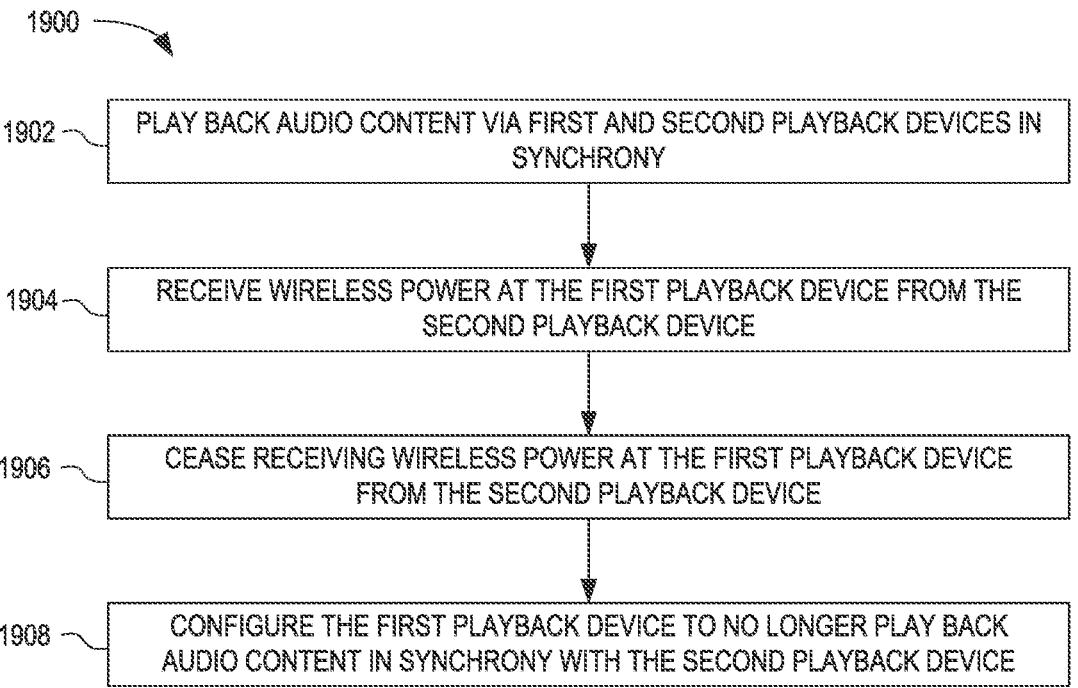

1900

1902 — | PLAY BACK AUDIO CONTENT VIA FIRST AND SECOND PLAYBACK DEVICES IN SYNCHRONY

1904 — | RECEIVE WIRELESS POWER AT THE FIRST PLAYBACK DEVICE FROM THE SECOND PLAYBACK DEVICE

1906 — | CEASE RECEIVING WIRELESS POWER AT THE FIRST PLAYBACK DEVICE FROM THE SECOND PLAYBACK DEVICE

1908 — | CONFIGURE THE FIRST PLAYBACK DEVICE TO NO LONGER PLAY BACK AUDIO CONTENT IN SYNCHRONY WITH THE SECOND PLAYBACK DEVICE

*Fig. 19*

WIRELESS POWER TRANSFER FOR AUDIO PLAYBACK DEVICES

CROSS-REFERENCE TO RELATED APPLICATIONS

This application is a continuation of International Patent Application No. PCT/US2021/071327, filed Aug. 31, 2021, which claims the benefit of priority to U.S. Patent Application No. 62/706,647, filed Aug. 31, 2020, which are incorporated herein by reference in their entireties.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1B shows a schematic diagram of the media playback system of FIG. 1A and one or more networks.

FIG. 1C shows a block diagram of a playback device.

FIG. 1D shows a block diagram of a playback device.

FIG. 1E shows a block diagram of a network microphone device.

FIGS. 1I through 1L show schematic diagrams of corresponding media playback system zones.

FIGS. 10-19 illustrate example methods relating to wireless power transfer in accordance with the disclosed technology.

Figure 1A:
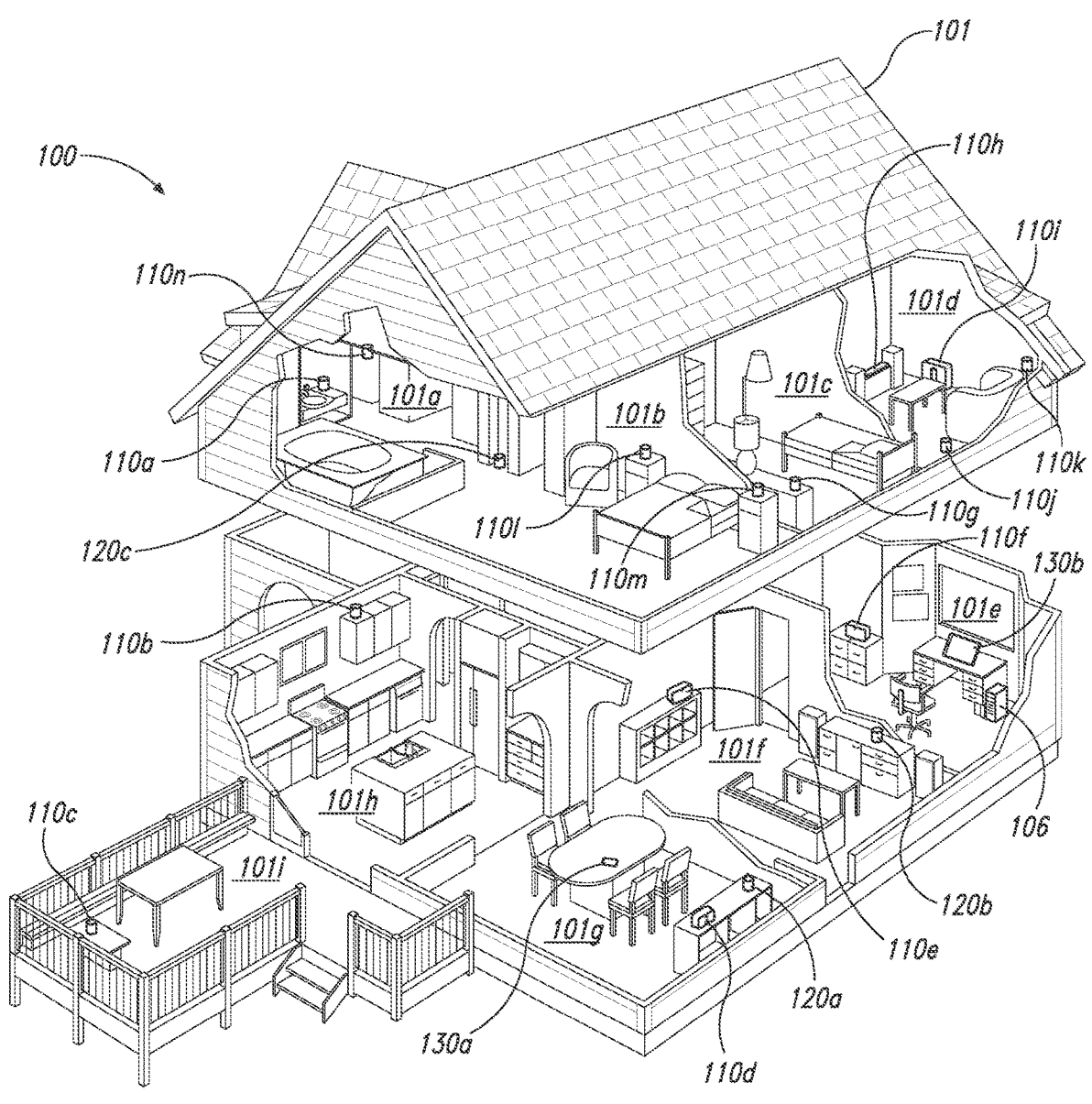
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

SONOS Inc. has been an innovator in the space of wireless audio devices and associated accessories. For example, SONOS Inc. pioneered wireless playback devices that receive audio content via wireless connections and also have the ability to play back audio content synchronously as a group. Additionally, SONOS Inc. has created the portable playback device SONOS MOVE and the associated docking accessory to facilitate recharging.

While these devices have represented significant advances, they remain tethered to the use of a physical link such as an electrical wire for power delivery (e.g., connected to the playback device itself or connected to a docking station on which a portable playback device is periodically placed). Building on these prior innovations, SONOS Inc. is further extending the goal of wireless audio playback devices to provide devices that can be powered wirelessly. For example, a playback device can include a wireless power receiver that is configured to receive wireless power from an external wireless power transmitter device. The wireless power transmitter device can be another audio playback device, or the transmitter device may be a separate external device, such as a power transmitter hub, a television with an integrated wireless power transmitter, etc. In some examples, the wireless power transmitter can include a power input port (e.g., for receiving power over a physical link such as a power cord). Additionally or alternatively, a wireless power transfer device can include both a wireless power receiver and a wireless power transmitter.

Such wireless power transfer can include mid- or long-range wireless power transfer, for example with devices being configured to provide effective power transfer with the transmitter and receiver separated from one another by a distance of greater than about 10 cm, or in some examples greater than about 50 cm or greater than about 1 m.

Examples of such mid-range or long-range wireless power transfer technologies include radiative techniques such as lasers, radio waves, microwaves, or other such techniques involving propagation of electromagnetic radiation from the transmitter device towards the receiver device. In various examples, the wireless power receiver in such instances can include a photovoltaic cell, a diode, an antenna (e.g., a rectenna), or other suitable hardware that can convert electromagnetic radiation into electrical energy. Similarly, the wireless power transmitter in such instances can include an optical source such as a laser, a microwave source, an antenna (e.g., directional antennas, phased array antennas, etc.), or other suitable source of electromagnetic radiation.

Additionally or alternatively, such mid- or long-range wireless power transmission can include non-radiative transmission techniques such as electromagnetic coupling (e.g., inductive coupling, resonant inductive coupling, capacitive coupling, resonant capacitive coupling, magnetodynamic coupling, etc.). In such instances, one or both the wireless power transmitter and the wireless power receiver can include electrically conductive coils (e.g., in the case of inductive coupling), electrodes (e.g., in the case of capacitive coupling), or rotating armatures carrying magnets thereon (e.g., in the case of magnetodynamic coupling).

In at least some examples, the devices disclosed herein may transmit and/or receive wireless power using short-range wireless power transmission (e.g., transfer of wireless power over a distance of less than about 10 cm, less than about 5 cm, or less than about 1 cm). Such short-range wireless power transmission can be in addition to or instead of the mid- and long-range wireless power transmission described herein.

Additionally or alternatively, such wireless power transfer devices can incorporate one or more energy harvester components that are configured to derive power from ambient energy in the environment. Example energy harvester components can be configured to derive power from, for example, solar energy, thermal energy, wind energy, salinity gradients, kinetic energy, etc.). In some examples, the energy harvesters can include one or more photovoltaic cells configured to convert received light into a voltage. Any of a variety of energy harvesters may be included in a wireless power transfer device. Examples of such energy harvesters include photovoltaic cells, thermoelectric generators, micro wind turbines, piezoelectric crystals, electroacoustic transducers, and kinetic energy harvesters.

While providing playback devices (and other devices) with wireless power capabilities provide several advantages, this framework also presents certain challenges. For example, because wireless power transfer is generally less efficient than wired power transfer, and because mid- and long-range wireless power transfer is generally less efficient than near-range wireless power transfer, it may be beneficial to configure the wireless transmitter device(s) and/or the wireless power receiver device(s) to maximize wireless power transfer and/or to minimize power consumption of one or both devices. Power transfer can be increased, for example, by providing guidance to a user to facilitate appropriate relative positioning of the receiver and/or transmitter devices. Such guidance may take into account both the wireless power transfer properties of the positioning as well as the acoustic performance of one or both devices at various locations. Additionally or alternatively, a transmitter device can include dynamic steering capabilities, such that the direction of the wireless power transmission can be modified, such as by using moveable directional antennas, mirrors, lenses, or other adjustable components. In operation, the transmitter device may adjust the steering of the wireless power transmission so as to increase the rate of wireless power received at one or more wireless power receiver devices.

Playback devices that rely on wireless power transmission may intermittently suffer from low power or even lose power completely. Accordingly, it may be beneficial to modify device performance based on a stored energy level (e.g., battery charge indicator), a rate of wireless power received at a receiver device, and/or a rate of power consumption at the wireless power receiver device. One example of modifying device performance includes reducing power consumption by entering a low-power or standby mode based on scheduling, user presence detection, or other such use parameter. In some examples, audio playback parameters can be adjusted based on variations in power levels (e.g., stored energy levels or a rate of wireless power transfer). In various examples, in response to variations in power levels, audio playback can be modified to have a reduced volume, a reduced low-frequency output, and/or to offload at least some audio playback responsibilities to another audio playback device. In some examples, audio playback of a non-affected device may be modified so as to match or otherwise correspond to a reduced audio performance of an impacted audio playback device (e.g., a device that is suffering low battery or lower wireless power receipt levels).

Additionally, in some instances, wireless power transmission may be affected by other activity, such as a user being positioned in between a transmitter device and a receiver device. In such instances, it may be useful to modify the wireless power transmission, for example by transmitting wireless power to a different receiver device, temporarily pausing wireless transmission, or taking other steps such as providing an alert to the user or suggesting relocating one or both of the receiver and transmitter devices.

In some examples, wireless power transmission can be utilized to simultaneously transfer data between a transmitter device and a receiver device. For example, the wireless power signal can include a carrier wave (e.g., light emitted via a laser, the AC current through an inductive coil, etc.), which can be modulated to incorporate data therein. At the receiver device, the wireless power signal can be demodulated to recover the transmitted data while also being converted to electrical energy for operation of the receiver device. In various examples, modulation of the wireless power signal to transmit data therein can include amplitude modulation, frequency modulation, phase modulation, pulse-width modulation, spread spectrum modulation, or any other suitable modulation scheme and/or combination of modulation schemes. In at least some instances, the data transmitted via the wireless power signal can include synchronization signals, power level indicators, device identifiers, audio content metadata, or other such data. It should be appreciated that the data to be transmitted may (or may not) be encoded according to one or more encoding schemes prior to transmission to, for example, reduce data errors in transmission (e.g., a channel encoding scheme that adds redundancy) and/or compress the data for transmission (e.g., a compression scheme that reduces the size of the data).

In some examples, wireless power transfer can be used to automatically group or un-group playback devices for synchronous audio playback, or conversely grouping or ungrouping playback devices can cause wireless power transfer to be initiated. For example, when a first audio playback device receives wireless power from a second audio playback device, the first audio playback device and the second audio playback device may be automatically grouped or bonded together for synchronous audio playback. Similarly, when the first audio playback device no longer receives wireless power from the second audio playback device, the first and second playback devices can be ungrouped or unbonded.

Although many of the examples disclosed herein relate to audio playback devices such as home theatre arrangements, examples of the present technology may also be applied to non-playback devices. For example, in some instances, the wireless transmitter device need not be a playback device. Additionally or alternatively, wireless power transfer as described herein can be applied outside the context of audio playback altogether, for example to facilitate wireless power transfer among other electronic devices while maintaining satisfactory user experience and device performance.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the patio 101*i*. In some aspects, a single playback zone may include multiple rooms or spaces. In certain aspects, a single room or space may include multiple playback zones.

In the illustrated embodiment of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

To facilitate synchronous playback, the playback device (s) described herein may, in some embodiments, be configurable to operate in (and/or switch between) different modes such as an audio playback group coordinator mode and/or an audio playback group member mode. While operating in the audio playback group coordinator mode, the playback device may be configured to coordinate playback within the group by, for example, performing one or more of the following functions: (i) receiving audio content from an audio source, (ii) using a clock (e.g., a physical clock or a virtual clock) in the playback device to generate playback timing information for the audio content, (iii) transmitting portions of the audio content and playback timing for the portions of the audio content to at least one other playback device (e.g., at least one other playback device operating in an audio playback group member mode), (iv) transmitting timing information (e.g., generated using the clock to the at least one other playback device; and/or (v) playing back the audio content in synchrony with the at least one other playback device using the generated playback timing information and/or the clock. While operating in the audio playback group member mode, the playback device may be configured to perform one or more of the following functions: (i) receiving audio content and playback timing for the audio content from the at least one other device (e.g., a playback device operating in an audio playback group coordinator mode); (ii) receiving timing information from the at least one other device (e.g., a playback device operating in an audio playback group coordinator mode); and/or (iii) playing the audio content in synchrony with at least the other playback device using the playback timing for the audio content and/or the timing information.

a. Suitable Media Playback System

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN) (e.g., the Internet), one or more local area networks (LAN) (e.g., one or more WIFI networks), one or more personal area networks (PAN) (e.g., one or more BLUETOOTH networks, Z-WAVE networks, wireless Universal Serial Bus (USB) networks, ZIGBEE networks, and/or IRDA networks), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct or indirect connections, PANs, LANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through IM.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

As described in more detail elsewhere herein, in some examples the power components 112i can include one or more of: a wireless power transmitter (e.g., a laser, induction coils, etc.), a wireless power receiver (e.g., a photovoltaic cell, induction coils, etc.), an energy storage component (e.g., a capacitor, a rechargeable battery), an energy harvester, a wired power input port, and/or associated power circuitry. In operation, the playback device 110a can be configured to transmit wireless power to one or more external devices. Additionally or alternatively, the playback device 110a can be configured to receive wireless power from one or more external transmitter devices, instead of or in addition to receiving power over a wired connection.

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio information from an audio source (e.g., one or more of the computing devices 106a-c (FIG. 1B)), and/or another one of the playback devices 110. In some embodiments, the operations further include causing the playback device 110a to send audio information to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). The headphone may comprise a headband coupled to one or more earcups. For example, a first earcup may be coupled to a first end of the headband and a second earcup may be coupled to a second end of the headband that is opposite the first end. Each of the one or more earcups may house any portion of the electronic components in the playback device, such as one or more transducers. Further, the one or more of earcups may include a user interface for controlling operation of the headphone such as for controlling audio playback, volume level, and other functions. The user interface may include any of a variety of control elements such as buttons, knobs, dials, touch-sensitive surfaces, and/or touchscreens. An ear cushion may be coupled each of the one or more earcups. The ear cushions may provide a soft barrier between the head of a user and the one or more earcups to improve user comfort and/or provide acoustic isolation from the ambient (e.g., provide passive noise reduction (PNR)). Additionally (or alternatively), the headphone may employ active noise reduction (ANR) techniques to further reduce the user's perception of outside noise during playback.

In some instances, the headphone device may take the form of a hearable device. Hearable devices may include those headphone devices (e.g., ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.).

In some embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

Figures 1F, 1G, 1H:
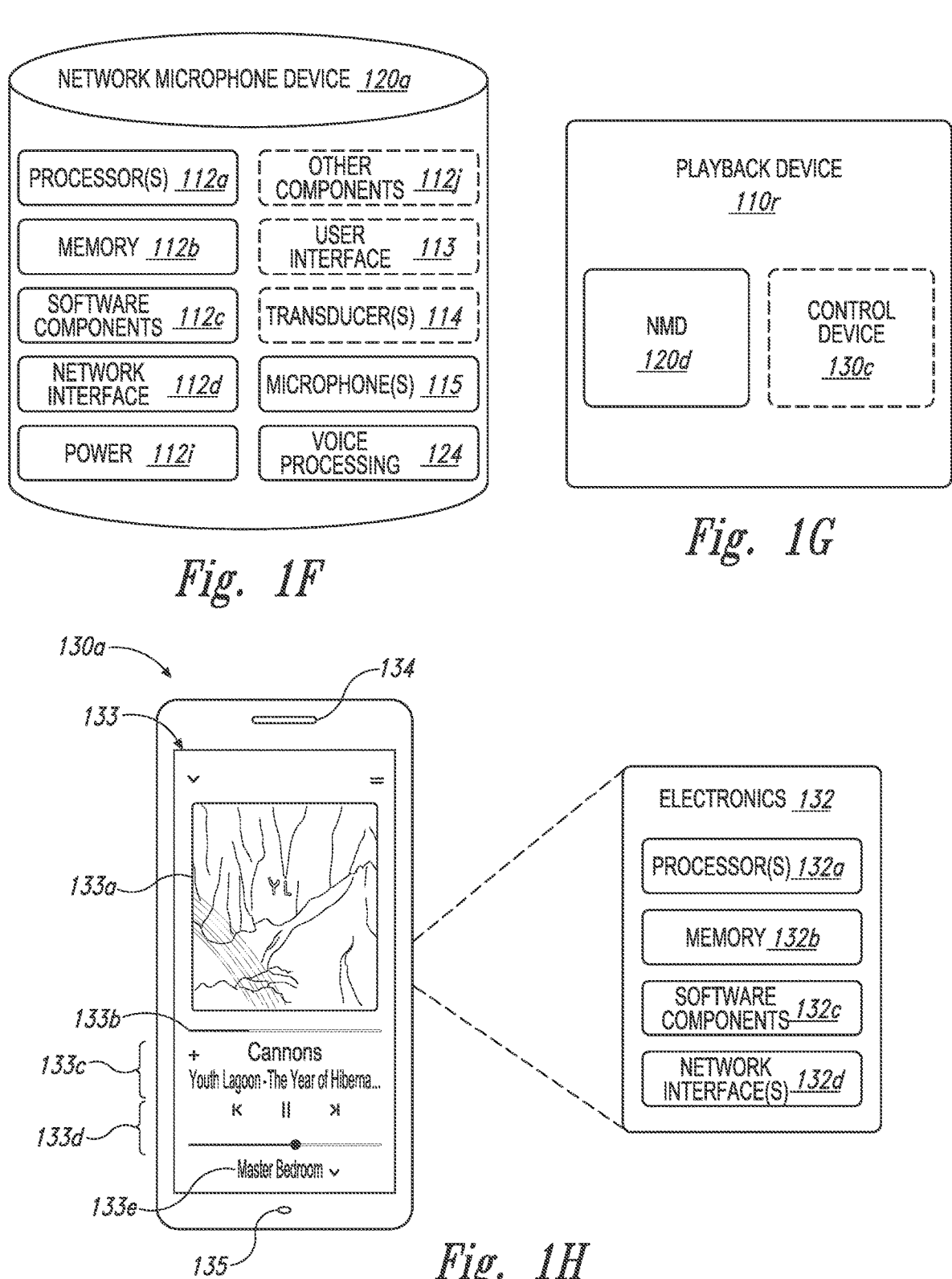
FIG. 1F shows a block diagram of a network microphone device.
FIG. 1G shows a block diagram of a playback device.
FIG. 1H shows a partially schematic diagram of a control device.

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, the power components 112i, and the microphones 115. As described elsewhere herein, the power components 112i can include one or more of: a wireless power transmitter (e.g., a laser, induction coils, etc.), a wireless power receiver (e.g., a photovoltaic cell, induction coils, etc.), an energy storage component (e.g., a capacitor, a rechargeable battery), an energy harvester, a wired power input port, and/or associated power circuitry. In operation, an NMD 120a can be configured to transmit wireless power to one or more external devices. Additionally or alternatively, the NMD 120a can be configured to receive wireless power from one or more external transmitter devices, in addition to or instead of receiving power over a wired connection.

The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 304 to one or more of playback devices. The network interface 132*d* can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate 'control of the media playback system 100. The user interface 133 includes media content art 133*a* (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as a playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1M:
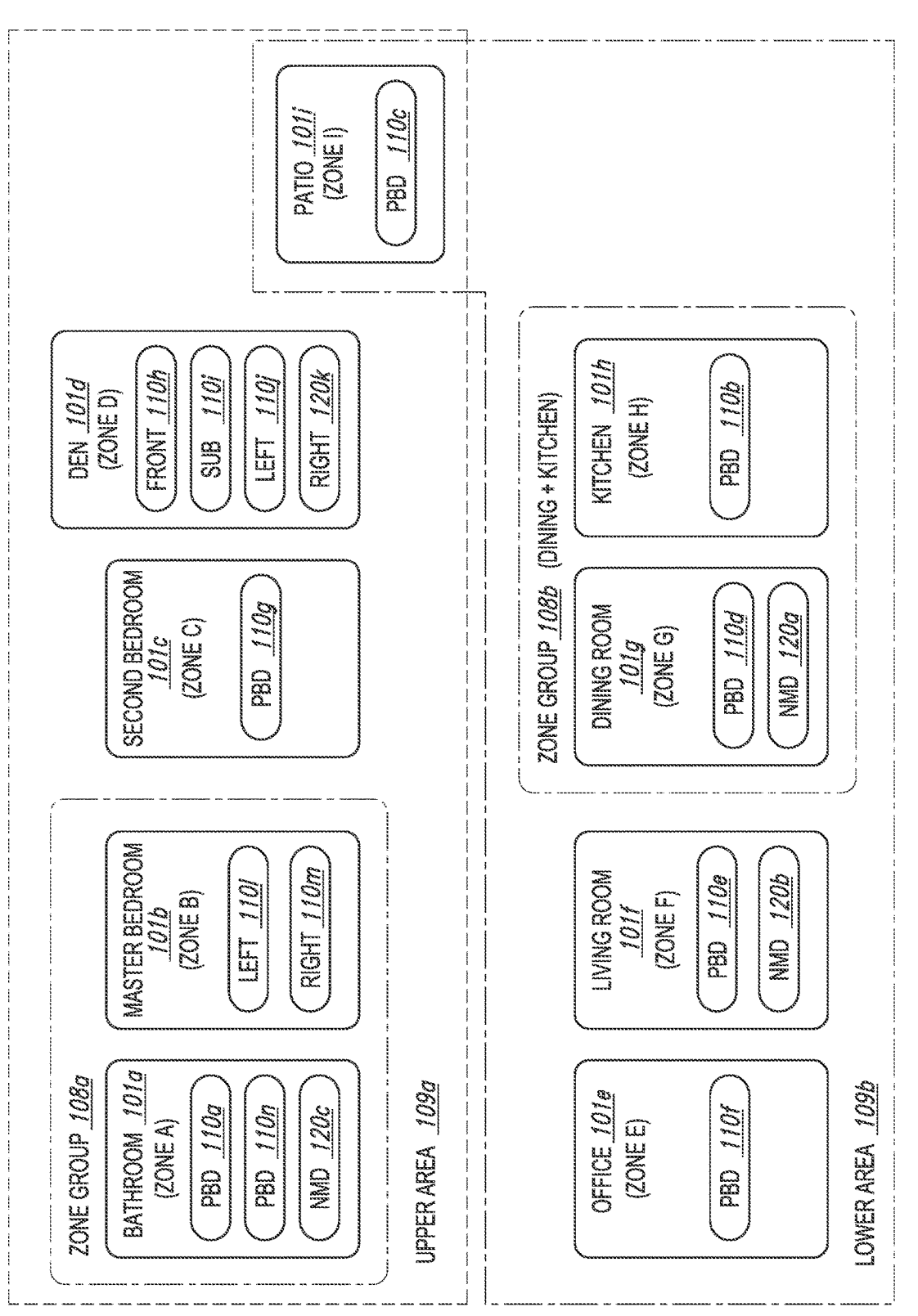
FIG. 1M shows a schematic diagram of media playback system areas.

FIGS. 1-I through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*l* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be merged to form a merged group or a zone group 108*b*. The merged playback devices 110*g* and 110*h* may not be specifically assigned different playback responsibilities. That is, the merged playback devices 110*h* and 110*i* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 1M. In some embodiments, a zone group may be given a unique name selected by a user.

Certain data may be stored in a memory of a playback device (e.g., the memory 112*b* of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101*c* may indicate that the playback device is the only playback device of the Zone C and not in a zone group. Identifiers associated with the Den may indicate that the Den is not grouped with other zones but includes bonded playback devices 110*h*-110*k*. Identifiers associated with the Dining Room may indicate that the Dining Room is part of the Dining+Kitchen zone group 108*b* and that devices 110*b* and 110*d* are grouped (FIG. 1L). Identifiers associated with the Kitchen may indicate the same or similar information by virtue of the Kitchen being part of the Dining+Kitchen zone group 108*b*. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109*a* including Zones A-D, and a Lower Area 109*b* including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
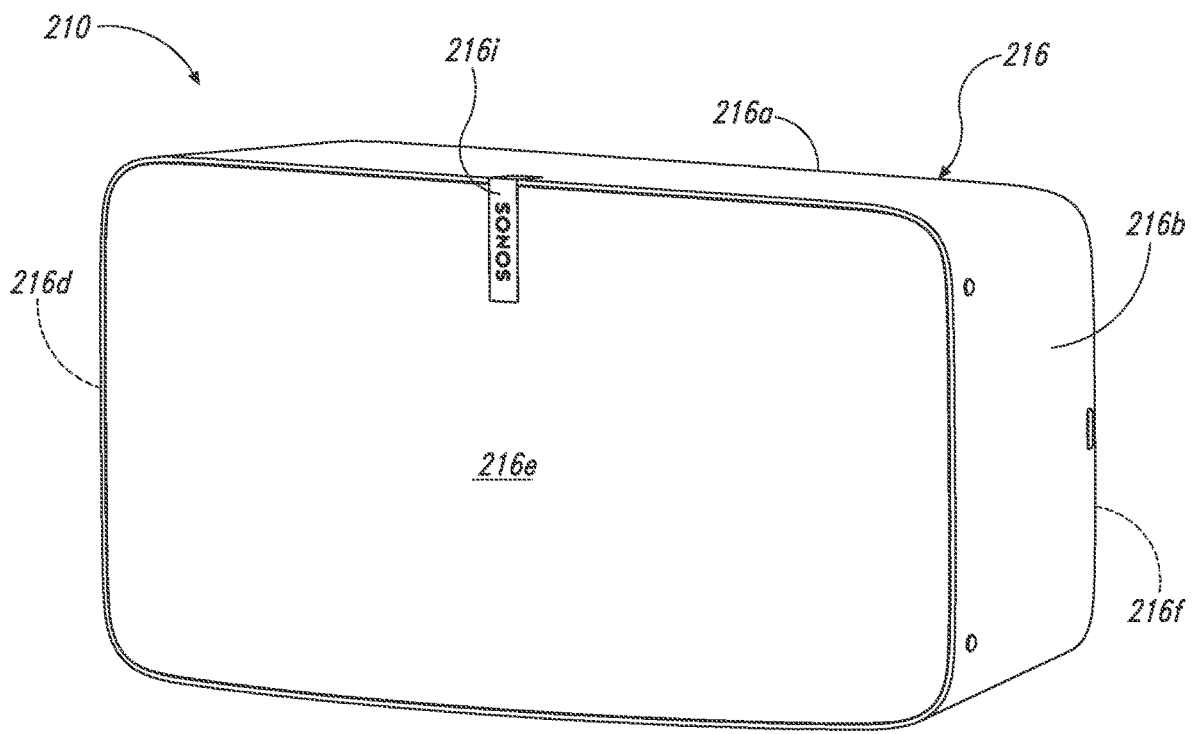
FIG. 2A shows a front isometric view of a playback device configured in accordance with aspects of the disclosed technology.
Figure 2B:
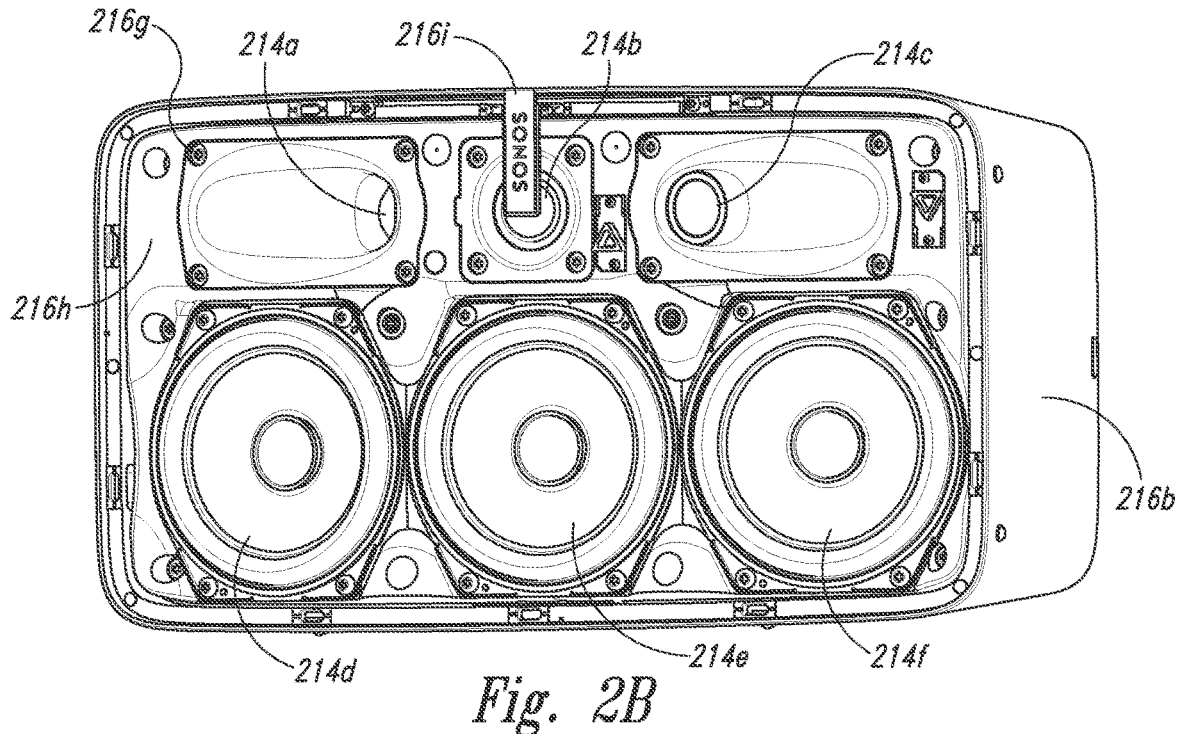
FIG. 2B shows a front isometric view of the playback device of FIG. 3A without a grille.
Figure 2C:
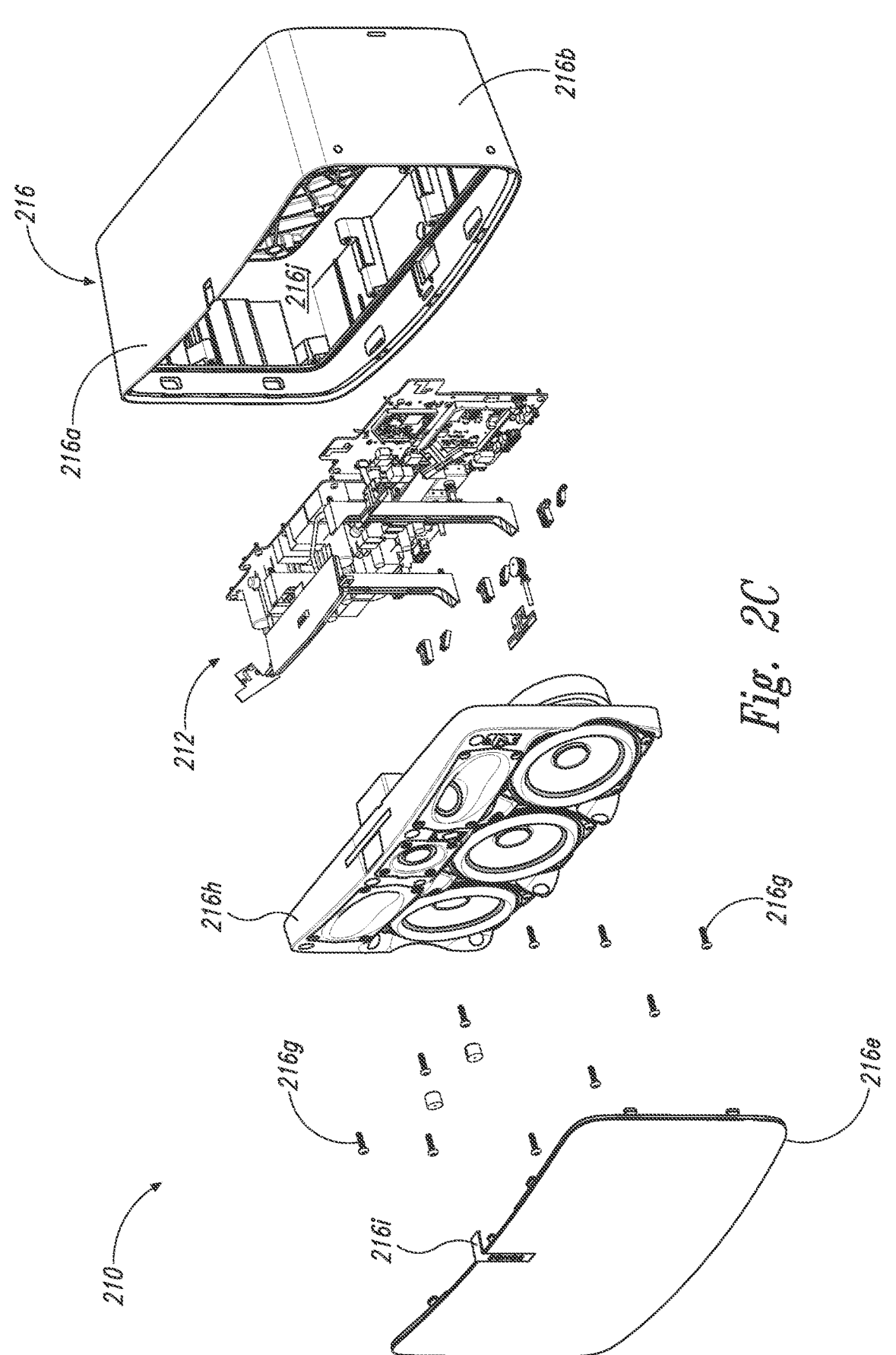
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figures 3A, 3B:
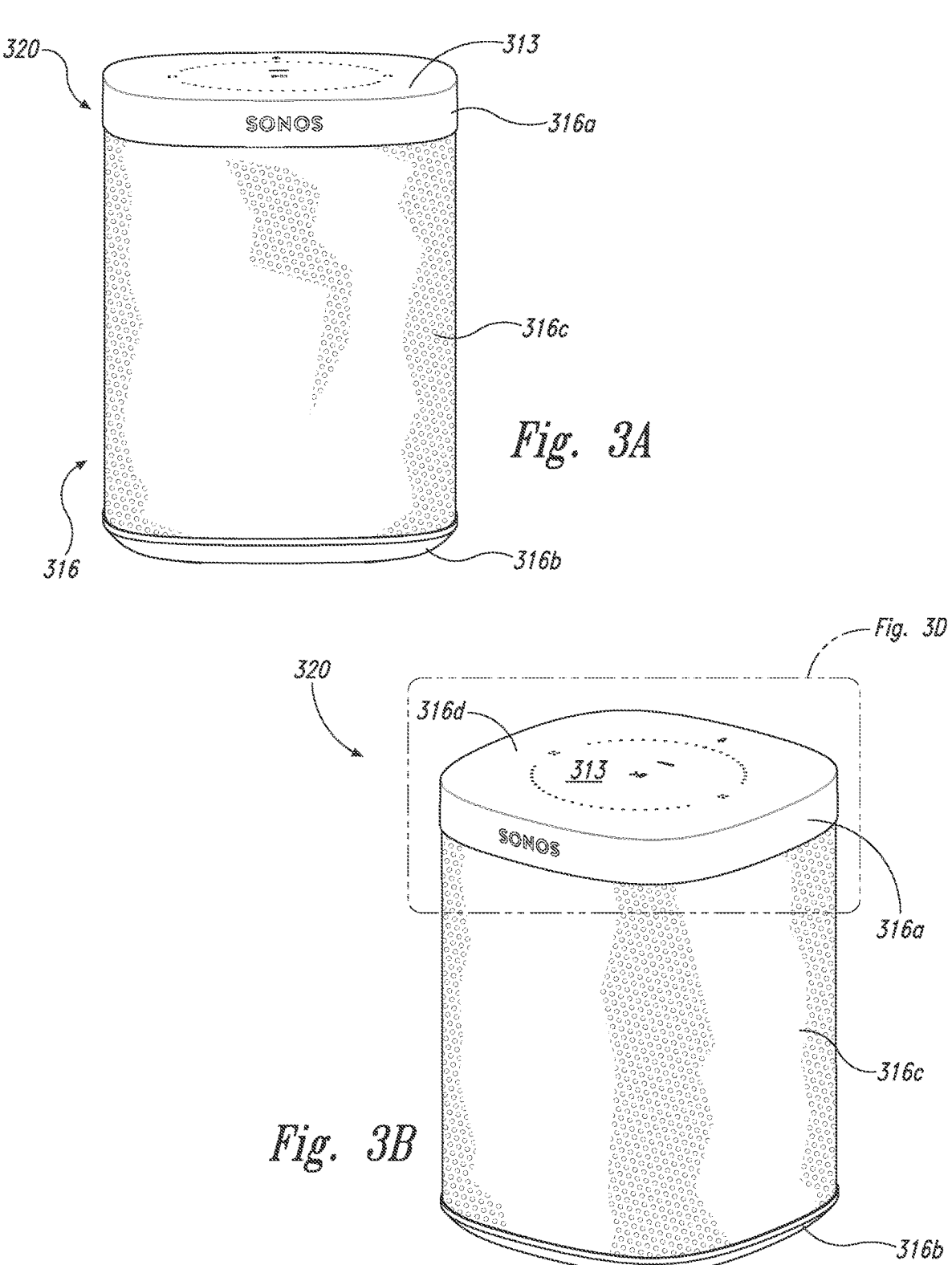
FIG. 3A shows a front view of a network microphone device configured in accordance with aspects of the disclosed technology.
FIG. 3B shows a side isometric view of the network microphone device of FIG. 3A.
Figure 3C:
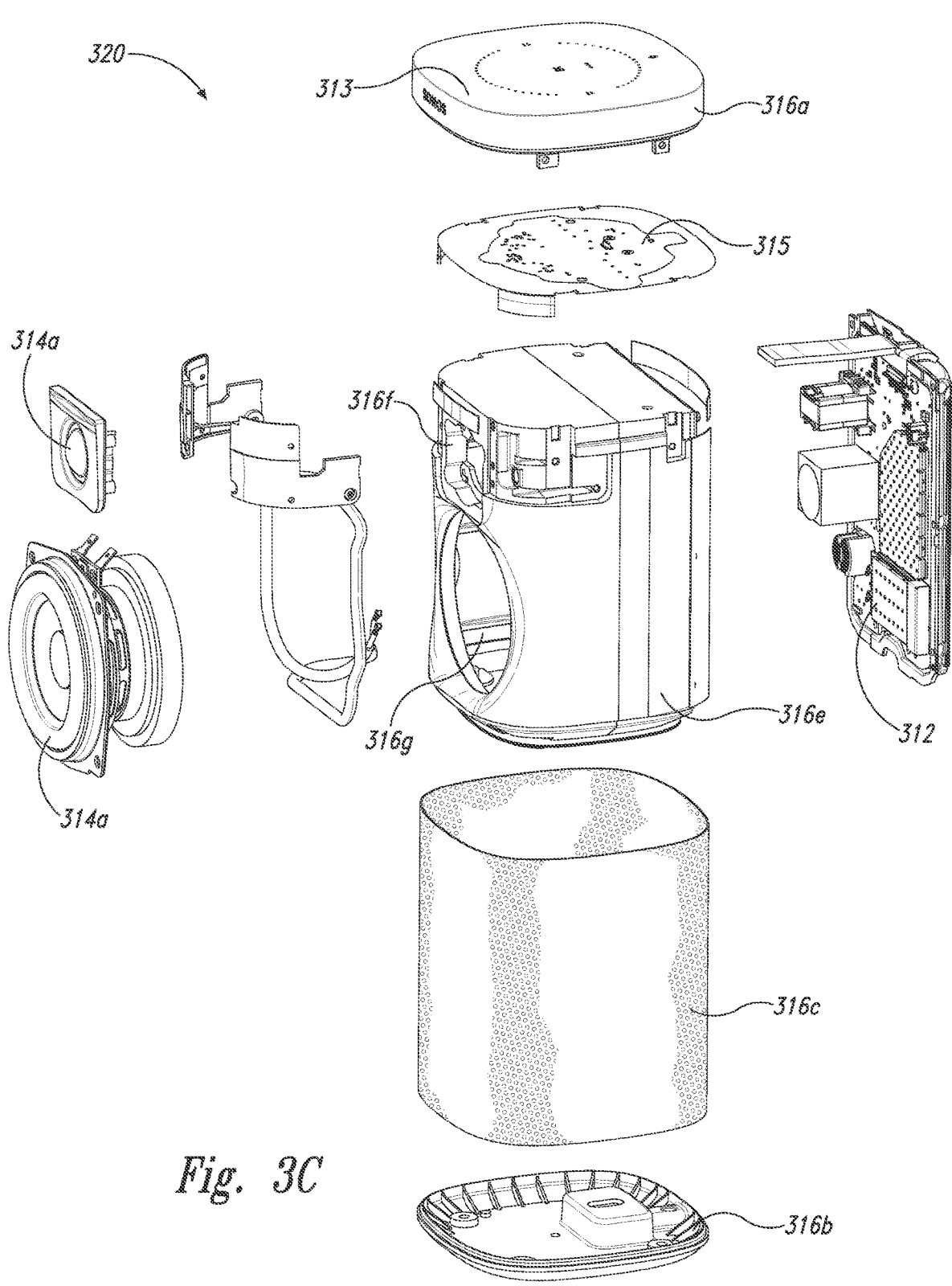
FIG. 3C shows an exploded view of the network microphone device of FIGS. 3A and 3B.
Figure 3D:
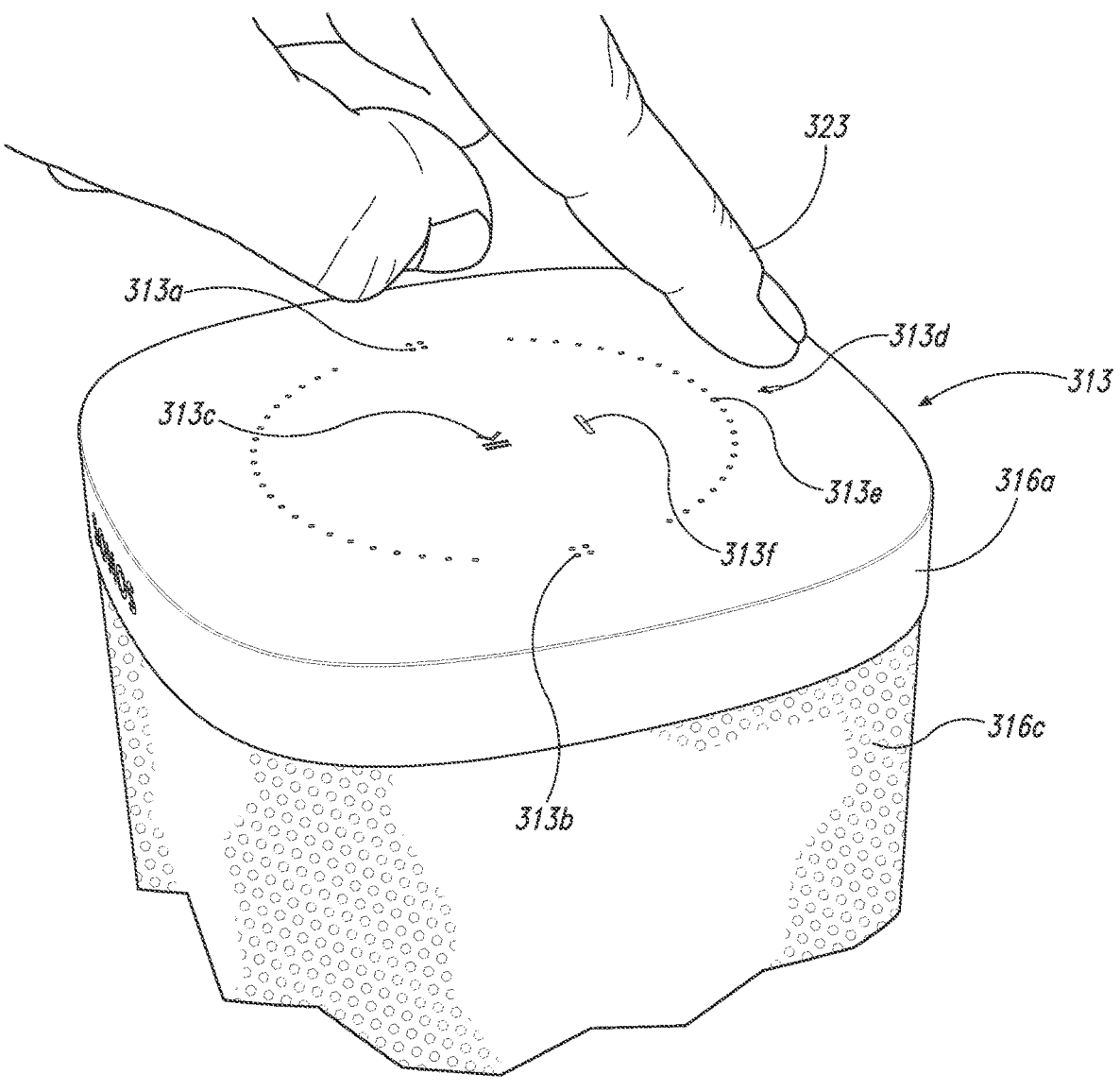
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d (e.g., a grille). A plurality of ports, holes or apertures 316d in the upper portion 316a allow sound to pass through to one or more microphones 315 (FIG. 3C) positioned within the housing 316. The one or more microphones 315 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio information corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figures 3E, 3F:
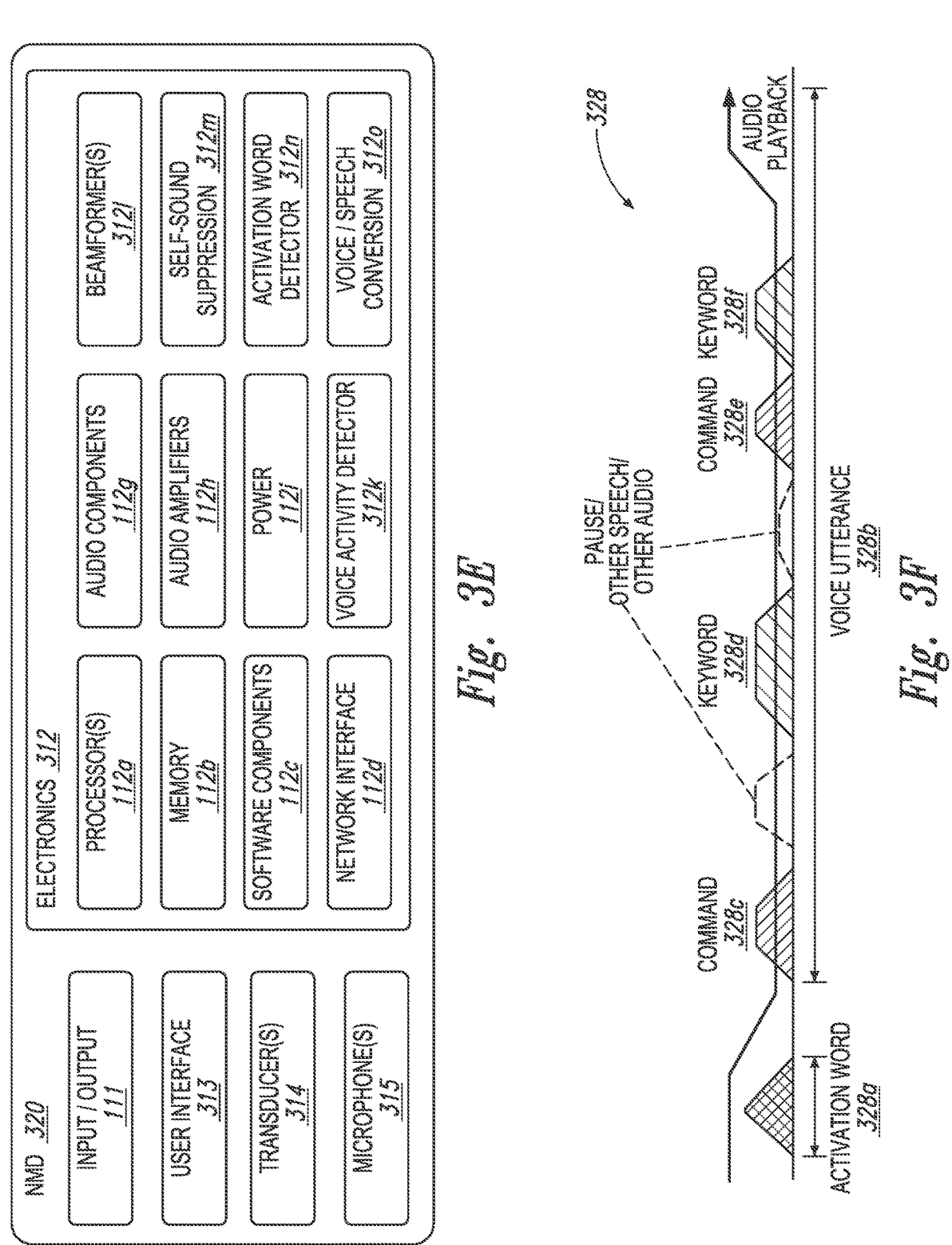
FIG. 3E shows a block diagram of the network microphone device of FIGS. 3A-3D
FIG. 3F shows a schematic diagram of an example voice input.

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise. The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio.

Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

FIG. 3F is a schematic diagram of an example voice input 328 captured by the NMD 320 in accordance with aspects of the disclosure. The voice input 328 can include an activation word portion 328a and a voice utterance portion 328b. In some embodiments, the activation word 557a can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figures 4A, 4B, 4C, 4D:
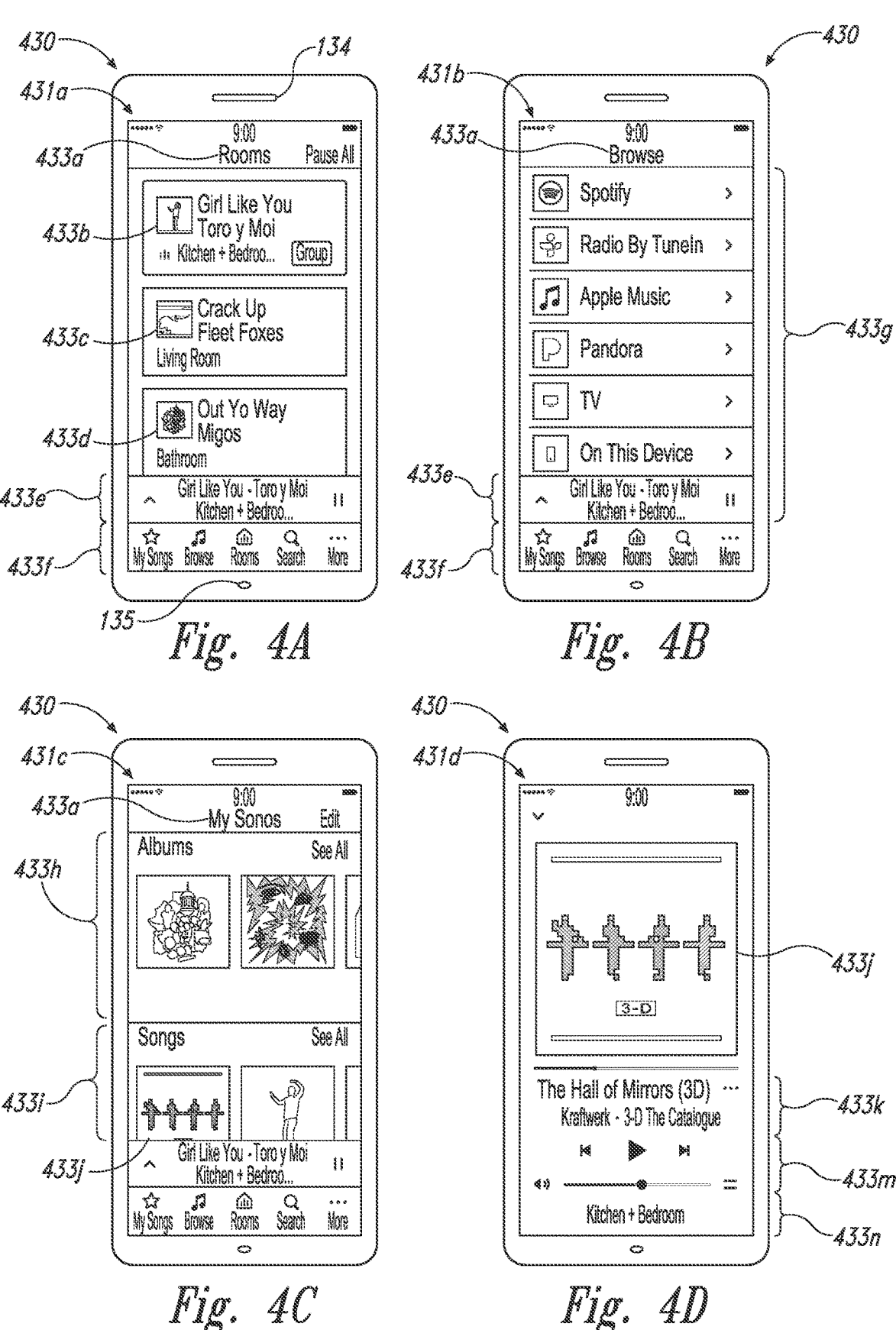
FIGS. 4A-4D show schematic diagrams of a control device in various stages of operation in accordance with aspects of the disclosed technology.

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
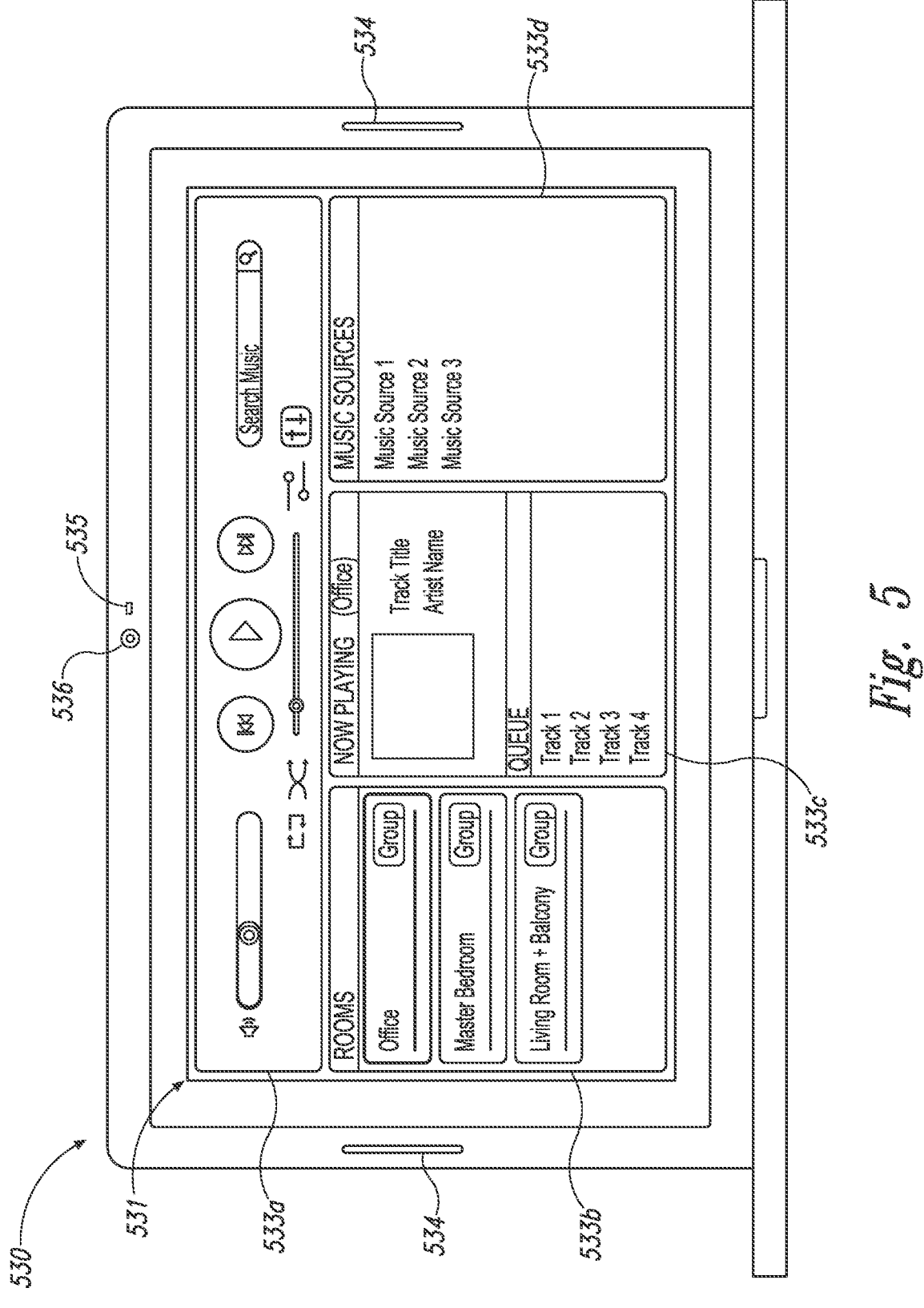
FIG. 5 shows front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as a playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
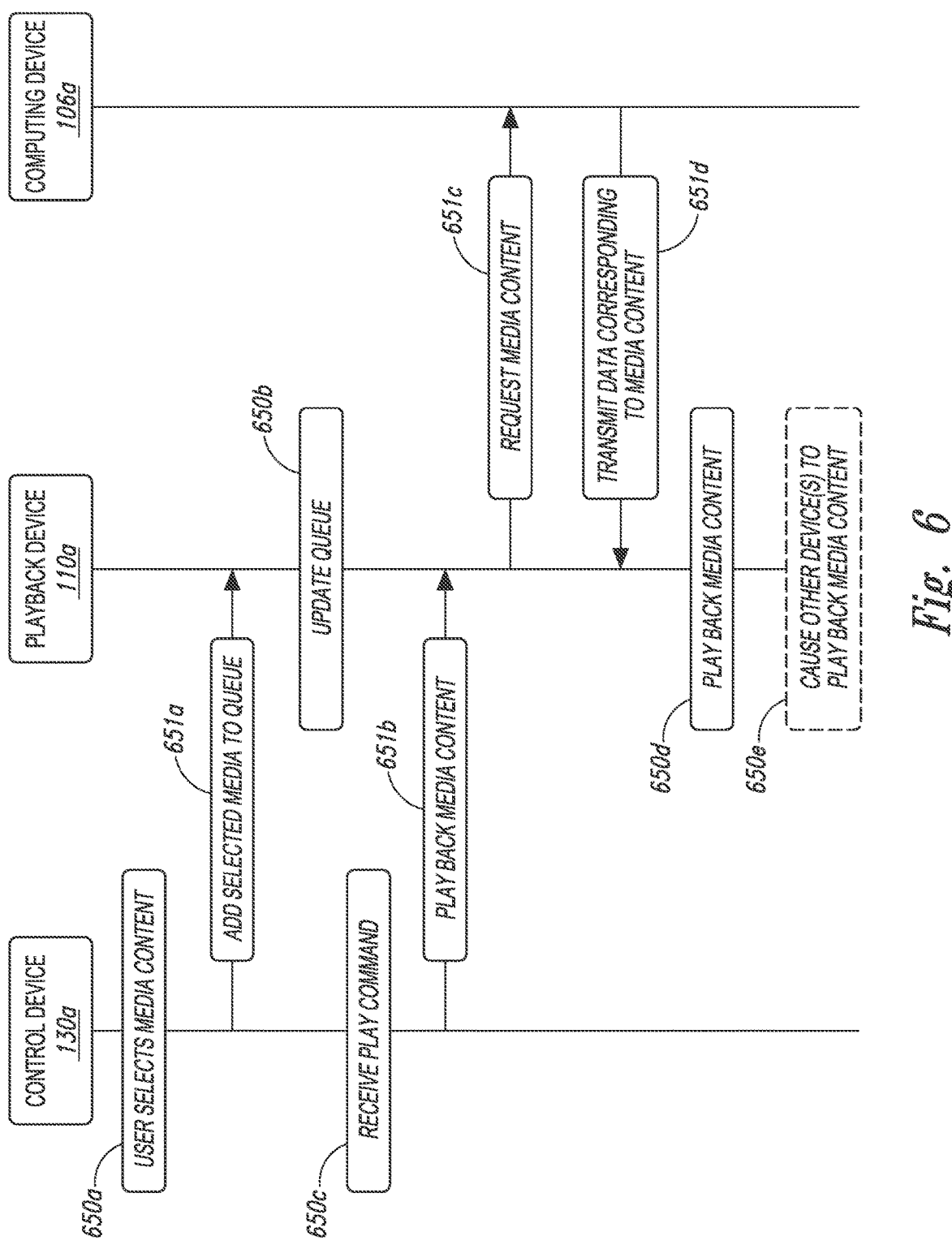
FIG. 6 shows a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the first computing device 106a requesting the selected media content. The first computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the first computing device 106a, and begin playback of the selected media content in response to a message from the playback device 110a such that all of the devices in the group play back the selected media content in synchrony.

IV. Wireless Power Transfer Devices and Associated Systems and Methods

Audio playback devices capable of receiving wireless power provide several distinct advantages over conventional wired devices. For example, there is no need to hide unsightly power cords by routing them through a wall or underneath furniture. Wireless power transfer may also allow a user to reposition devices more easily around a home or room without needing to disconnect or re-route power cords. To enable this functionality, one or more wireless power transmitter devices can be provided in the vicinity of an audio playback device having a wireless power receiver therein. Such a transmitter device can include another playback device (e.g., a soundbar, subwoofer, or any playback device having a wired power connection), or a non-playback device (e.g., a power hub that provides wireless power to the playback device without itself driving audio output). In some examples, one or more playback devices can include both a wireless power receiver and a wireless power transmitter, such that these devices may be used in either configuration, or in some instances may be used in both configurations simultaneously (e.g., as a "relay" in which a device receives wireless power from an external transmitter device and transmits wireless power to an external receiver device). In some instances, a plurality of such playback devices can transfer wireless power among one another in a mesh configuration, with the particular device-to-device transmission being selected to provide the desired power levels, device performance, and user experience.

As used herein, a "wireless power transmitter" or "transmitter device" includes any device (or component(s) of a device) capable of sending wireless power that can be received and recovered by a suitable receiver device. Similarly, a "wireless power receiver" or "receiver device" includes any device (or component(s) of a device) capable of receiving wireless power from a remote transmitter device and utilizing that power to operate one or more components of the receiver device (e.g., to power at least one amplifier of a playback device). In various examples, a single playback device (or other device) can be both a wireless power transmitter and a wireless power receiver, while in other examples a particular device may be only a transmitter device or only a receiver device.

In various examples disclosed herein, such wireless power transfer can include mid- or long-range wireless power transfer. As used herein, mid- and long-range wireless power transfer includes wireless power transfer over a distance of greater than about 10 cm, or in some examples greater than about 50 cm or greater than about 1 m. For example, in some instances a wireless power transmitter device and a wireless power receiver device can be separated from one another by at least about 10 cm, at least about 50 cm, or at least about 1 m during wireless power transfer.

As noted elsewhere herein, such mid- or long-range wireless power transfer technologies include radiative techniques (e.g., lasers, radio waves, microwaves, or other such propagation of electromagnetic radiation from the transmitter device towards the receiver device). In various examples, the wireless power receiver in such instances can include a photovoltaic cell, a diode, an antenna (e.g., a rectenna), or other suitable hardware that can convert electromagnetic radiation into electrical energy. Similarly, the wireless power transmitter in such instances can include an optical source such as a laser, a microwave source, an antenna (e.g., directional antennas, phased array antennas, etc.), or other suitable source of electromagnetic radiation.

Additionally or alternatively, such mid- or long-range wireless power transmission can include non-radiative transmission such as electromagnetic coupling (e.g., inductive coupling, resonant inductive coupling, capacitive coupling, resonant capacitive coupling, magnetodynamic coupling, etc.). In such instances, both the wireless power transmitter and the wireless power receiver can include electrically conductive coils (e.g., in the case of inductive coupling), electrodes (e.g., in the case of capacitive coupling), or rotating armatures carrying magnets thereon (e.g., in the case of magnetodynamic coupling).

a. Suitable Wireless Power Transfer Device Components

Figure 7:
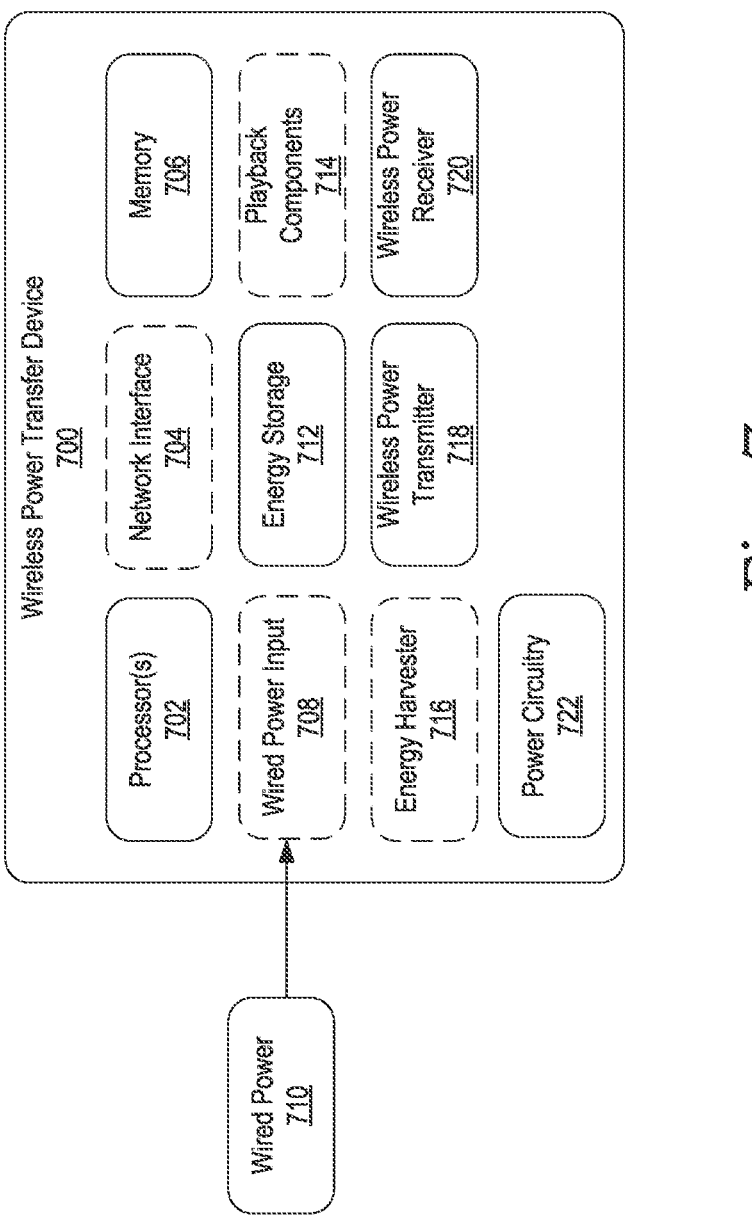
FIG. 7 shows an example configuration of a wireless power transfer device in accordance with the disclosed technology.

FIG. 7 is a schematic block diagram of a wireless power transfer (WPT) device 700. In some examples, the device 700 can be coupled to, integrated into, or included within a playback device (e.g., playback device 110a of FIG. 1C), an NMD (e.g., NMD 120a of FIG. 1F), or other suitable device.

Referring to FIG. 7, the WPT device 700 includes one or more processors 702, a network interface 704, and memory 706. These can be similar to, identical to, or include, processors 112a, network interface 112d, and memory 112b described above with respect to FIGS. 1C and 1F. In various examples, the wireless power transfer device 700 can include any or all of the features of playback device 110a or NMD 120a described previously herein. In some examples, the network interface 704 can include one or more transceivers that are configured to communicate via at least one WIFI network, and/or at least one BLUETOOTH network.

WPT device 700 optionally includes a wired power input port 708 that is configured to be electrically coupled to wired power 710 (e.g., via 110/220V wall power, a USB-C charger, etc.), such as an AC power port or a USB port (e.g., a USB TYPE-A port, a USB TYPE-B port, a USB TYPE-C port, etc.). The power input port 708 can be coupled (e.g., via cable) directly to a household power outlet (e.g., to receive alternating current (AC) power) or indirectly via a power adapter (e.g., a device that converts the AC power from the household power outlet to direct current (DC) power). In some examples, the wired power input port 708 is omitted, and the WPT device 700 operates solely on the basis of power received wirelessly from external transmitter device (s) and/or energy generated via energy harvester(s) 716.

The WPT device 700 further includes an energy storage component 712, which can take the form of a rechargeable battery, a capacitor, a supercapacitor, or any other suitable component that can store energy. The energy storage component 712 can be configured to store energy and to facilitate operation of the device (e.g., powering one or more amplifiers of a playback device). In this regard, the energy storage component 712 can be a battery that has a chemistry that facilitates recharging the battery, such as lithium-ion (Li-ion), nickel-metal hydride (NiMH), nickel-cadmium (NiCd), etc. The battery can be sized such that the processor (s) 702 and other components of the WPT device 700 can operate on battery power alone for an extended amount of time without the battery needing to be recharged. For example, the battery can have a 20 watt-hours (Wh) capacity that facilitates continuous playback of audio for at least 4 hours on battery power alone. The battery can be charged using power from one or more other components in the device 700 (e.g., wired power input port 708, wireless power receiver 720, energy harvester 716, etc.).

As noted previously, in some examples, the wireless power device 700 can include audio playback components 714 (e.g., one or more transducers, audio processing circuitry, microphones, voice processing circuitry, etc.), and as such the WPT device 700 can include or be part of an audio playback device or a network microphone device as described elsewhere herein. In various examples, such an audio playback device can be a soundbar, a subwoofer, a headphone device, a hearable device, a portable audio playback device, an architectural playback device, or a video playback device The WPT device 700 optionally includes one or more energy harvesters 716. Energy harvesters 716 may include those devices configured to derive power from energy sources in the environment (e.g., solar energy, thermal energy, wind energy, salinity gradients, kinetic energy, sound energy, etc.). For example, the energy harvesters 716 can include one or more photovoltaic cells configured to convert received light into a voltage. Any of a variety of energy harvesters 716 may be included in the WPT device 700. Examples of such energy harvesters include photovoltaic cells, thermoelectric generators, micro wind turbines, piezoelectric crystals, electroacoustic transducers, and kinetic energy harvesters.

The WPT device additionally includes a wireless power transmitter 718, a wireless power receiver 720, and power circuitry 722. In operation, the WPT device 700 can receive wireless power from an external transmitter device via the receiver 720, and can transmit wireless power to an external receiver device via the transmitter 720, with the power circuitry 722 controlling some or all of the functions associated with these operations.

The wireless power transmitter 718 can include any component or combination of components capable of transmitting wireless power to an external wireless power receiver device. Such wireless power transfer can include mid- or long-range wireless power transfer, for example being configured to provide effective power transfer with the transmitter and receiver separated from one another by a distance of greater than about 10 cm, or in some examples greater than about 50 cm or greater than about 1 m. In various examples, the wireless power transmitter 718 can transmit power via radiative techniques such as using lasers, radio waves, microwaves, or other such techniques involving propagation of electromagnetic radiation from the transmitter device towards the receiver device. In various embodiments, such electromagnetic radiation may be directional (e.g., directed towards one or more receiver devices) or omnidirectional (e.g., radiating in substantially all directions from the wireless power transmitter 718). In various examples, the wireless power transmitter 718 in such instances can include an optical source such as a laser, a microwave source, an antenna (e.g., directional antennas, phased array antennas, etc.), or any other source of electromagnetic radiation. In some instances, the wireless power transmitter 718 can include one or more steering components configured to direct, focus, or steer wireless power. Such steering components can include, for example, one or more lenses, mirrors, directional antennas, or other suitable components.

Additionally or alternatively, the wireless power transmitter 718 can be configured to transmit wireless power using non-radiative techniques such as electromagnetic coupling (e.g., inductive coupling, resonant inductive coupling, capacitive coupling, resonant capacitive coupling, magnetodynamic coupling, etc.). In such instances, the wireless power transmitter 718 can include electrically conductive coils (e.g., in the case of inductive coupling), electrodes (e.g., in the case of capacitive coupling), rotating armatures carrying magnets thereon (e.g., in the case of magnetody-namic coupling), or any other suitable structure capable of receiving power wirelessly via electromagnetic coupling.

The wireless power receiver 720 can include any component or structure configured to receive power wirelessly (e.g., via inductance, resonance, radiation, etc.) from an external wireless transmitter device. As noted previously, such wireless power transfer can include mid- or long-range wireless power transfer, for example being configured to provide effective power transfer with the transmitter and receiver separated from one another by a distance of greater than about 10 cm, or in some examples greater than about 50 cm or greater than about 1 m. In various examples, the wireless power receiver 720 can receive power via radiative techniques such as lasers, radio waves, microwaves, or other such techniques involving propagation of electromagnetic radiation from the transmitter device towards the receiver device. The wireless power receiver 720 in such instances can include an optical receiver such as a diode, a photovoltaic cell, an antenna (e.g., a rectenna), or other suitable hardware that can convert electromagnetic radiation into electrical energy.

Additionally or alternatively, the wireless power receiver 720 can be configured to receive wireless power using non-radiative techniques such as electromagnetic coupling (e.g., inductive coupling, resonant inductive coupling, capacitive coupling, resonant capacitive coupling, magnetodynamic coupling, etc.). In such instances, the wireless power receiver 720 can include electrically conductive coils (e.g., in the case of inductive coupling), electrodes (e.g., in the case of capacitive coupling), a rotating armature carrying a magnets thereon (e.g., in the case of magnetodynamic coupling), or any other suitable structure capable of receiving power wirelessly via electromagnetic coupling.

With continued reference to FIG. 7, the WPT device 700 can include power circuitry 722 configured to receive power from the energy storage component 712, the wired power input 708, and/or the wireless power receiver 720, and, using the power obtained therefrom, drive an amplifier and/or a electroacoustic transducer with an audio output based on source audio. The power circuitry 722 can be configured to perform any of a variety of power-related tasks including, for example, one or more of the following: (1) power conversion (e.g., AC-AC conversion, AC-DC conversion, DC-AC conversion, and/or DC-DC conversion); (2) power regulation; (3) battery charging; and/or (4) power monitoring (e.g., battery monitoring). Examples of electrical components that may be integrated into the power circuitry 722 include transformers, rectifiers, inverters, converters, regulators, battery chargers, and/or power management integrated circuits (PMICs). In some examples, such power circuitry 722 can be integrated into either or both the wireless power transmitter 718 and the wireless power receiver 720.

In some examples, the power circuitry 722 can include battery circuitry that facilitates monitoring a state of a battery. In these examples, the battery circuitry can identify battery state information that includes information regarding one or more of the following battery states: a state-of-charge (SoC), temperature, age, and/or internal impedance. The battery circuitry can communicate the battery state information to, for example, the processor 702.

The power circuitry 722 can include regulation circuitry that facilitates converting a variable amount of voltage (e.g., a variable voltage from a battery, a variable voltage from an energy harvester, etc.) to a stable DC voltage. For example, the regulation circuitry can include switching regulator circuitry such as buck, boost, buck-boost, flyback, resonant, etc. switching regulator circuitry. The regulation circuitry can include one or more linear voltage regulators such as low-dropout (LDO) regulators. The regulation circuitry can be configured to output one or more fixed DC voltages (e.g., ±5V, ±12V) or AC voltages.

b. Wireless Power Group Examples

Figure 8:
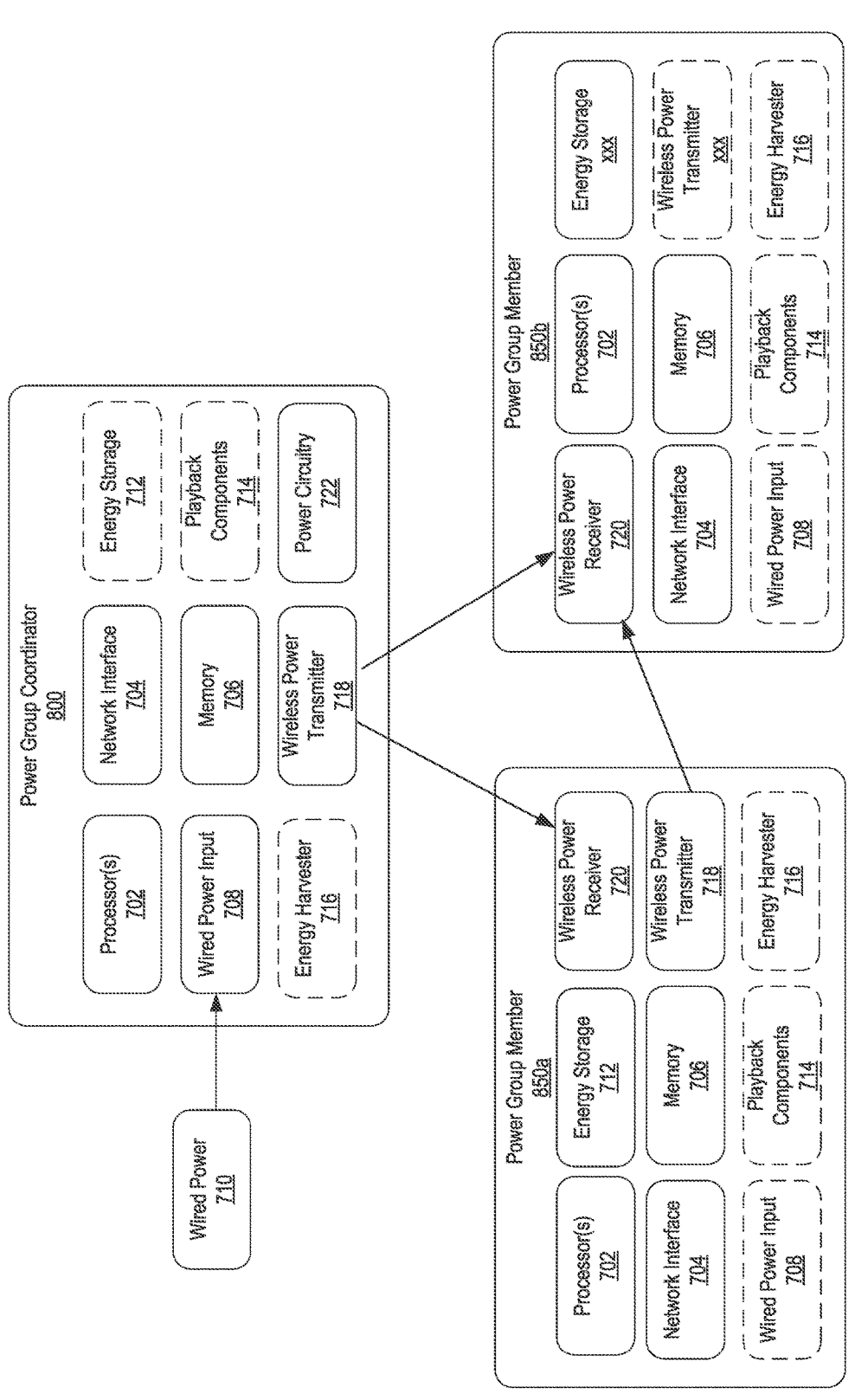
FIG. 8 shows an example configuration of a wireless power group in accordance with the disclosed technology.

FIG. 8 shows interactions among a power group, which includes a plurality of WPT devices that can transfer power and/or data among one another. In the example shown in FIG. 8, the group includes a power group coordinator 800, and first and second power group members 850a and 850b. Each of the power group coordinator 800 and the power group members 850a and 850b can include some or all of the components described above with respect to the WPT device 700 of FIG. 7. In some examples, some or all of these devices can include or be audio playback devices. Although the illustrated group includes three devices, in various examples there may be one, two, four, five, or many more power group members (not shown).

As used herein, a "power group" can include two or more devices that are configured to wirelessly transfer power therebetween. In the illustrated example, the coordinator 800 transmits wireless power (e.g., via wireless power transmitter 718) to each of the first power group member 850a and the second power group member 850b. Additionally, the first group member 850a transmits wireless power to the second power group member 850b. In alternative examples, the power group coordinator 800 may transmit wireless power to fewer than all members of the wireless power group, with one or more group members 850 transmitting power to other group members 850 such that each device of the group receives or transmits wireless power to or from at least one other device of the group.

In the illustrated example, the power group coordinator 800 does not include a wireless power receiver 720, and it is connected to wired power 710. However, in other instances the power group coordinator 800 may have no connection to wired power 710, and may itself only be powered via wireless power transmission and/or energy harvesting. In some examples, one or more of the power group members 850 may be connected to wired power instead of or in addition to receiving wireless power from other group members.

As used herein, a "power group coordinator" can include a wireless power transfer device that is configured to transmit instructions to one or more power group members to initiate, cease, or modulate wireless power transmission therebetween. For example, a power group coordinator may cause the first power group member 850a to initiate wireless power transmission to the second power group member 850b. As described in more detail elsewhere herein, in some examples wireless power transmission may be initiated, ceased, or modified based on a number of parameters (e.g., a battery level of a device, a level or rate or wireless power received at a device, audio playback levels, etc.). In some examples, such parameters may be determined by or transmitted to the power group coordinator 800, which may then determine any appropriate modifications to wireless power transfer within the group, and may transmit instructions to group members accordingly.

In at least some instances, there may be no power coordinator. In such cases, each wireless power transfer device may independently determine whether, how, and when to transmit or receive wireless power from any external transmitter or receiver devices.

As noted previously, in some examples a plurality of audio playback devices can be grouped together for synchronous audio playback (e.g., as a bonded zone). In such instances, one of the playback devices may be a coordinator of the group, and may transmit and receive timing information from one or more other devices in the group. In various examples, the power group may be identical to the audio playback group. Alternatively, the power group may differ at least in part from any audio playback grouping. In at least some examples, the power group coordinator 800 may also serve as an audio playback group coordinator. In such cases, the power group coordinator 800 may transmit timing data or other information to group members via a wireless network and/or via data incorporated into the wireless power signals, as described in more detail elsewhere herein. Alternatively, the power group coordinator 800 and the audio playback group coordinator may be different devices. In still other examples, the power group may be formed without any audio playback grouping taking place, in which case there may be no audio playback group coordinator.

V. Example Wireless Power Transfer Scenarios

Figures 9A, 9B:
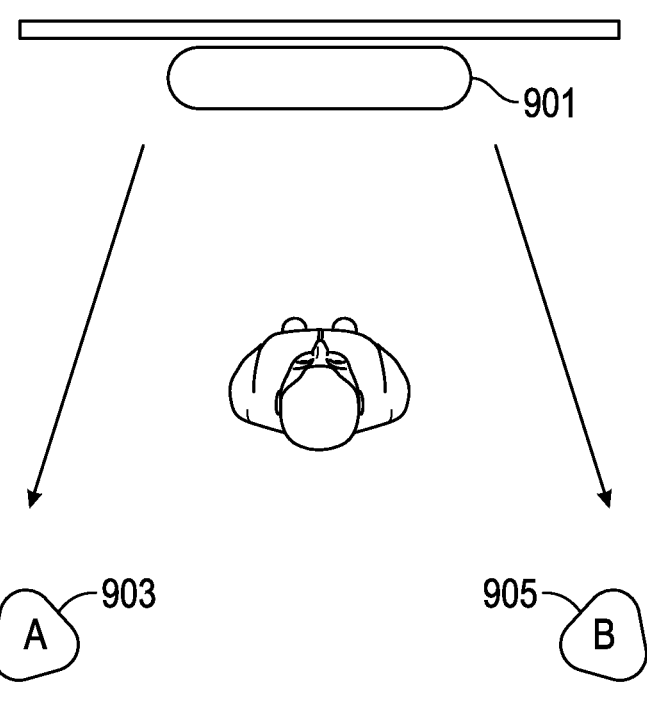
FIGS. 9A-9X illustrate example wireless power transfer scenarios in accordance with the disclosed technology.
Figure 9C:
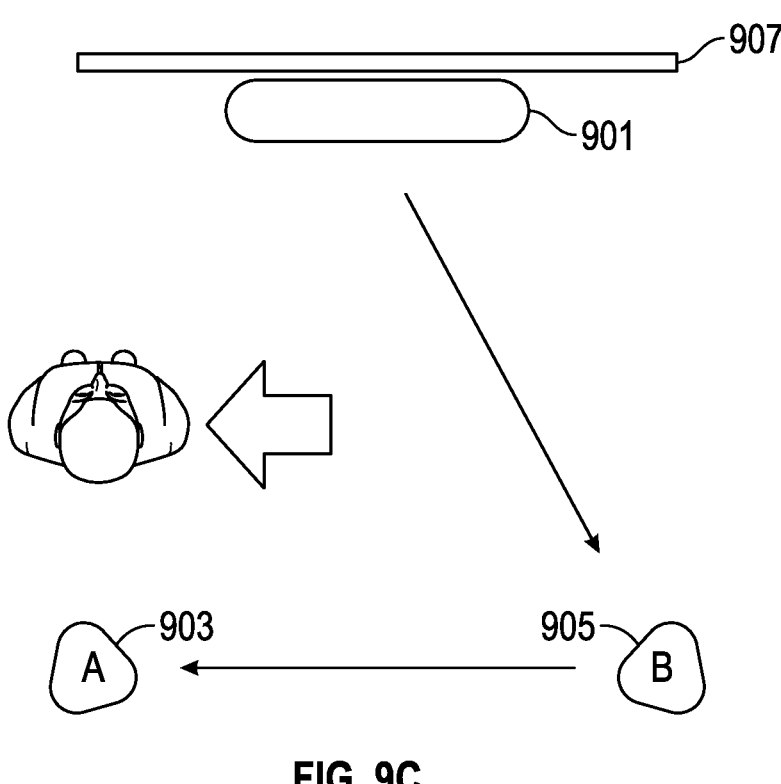
Figure 9D:
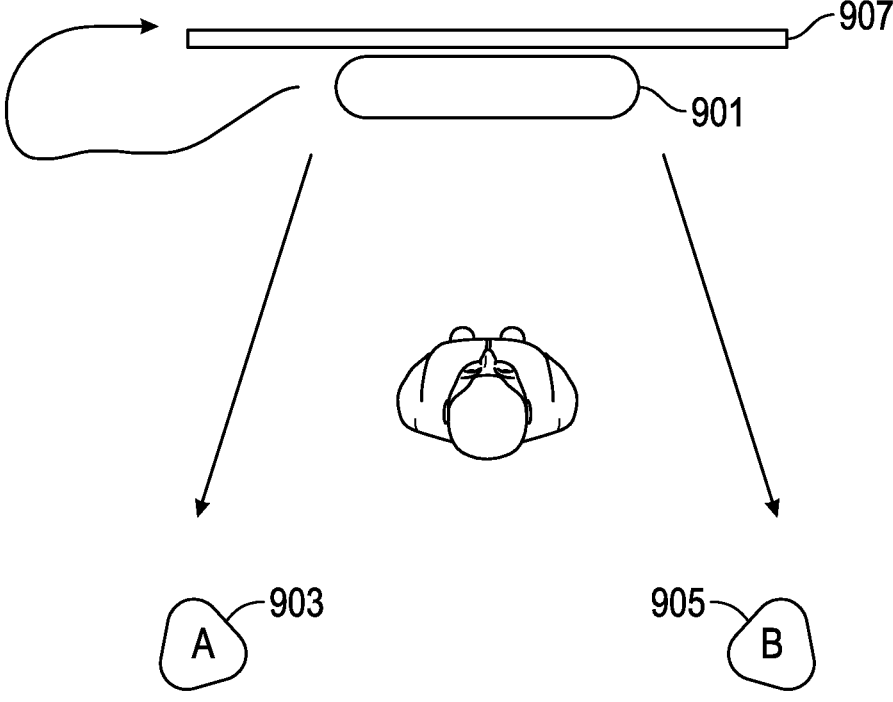
Figure 9E:
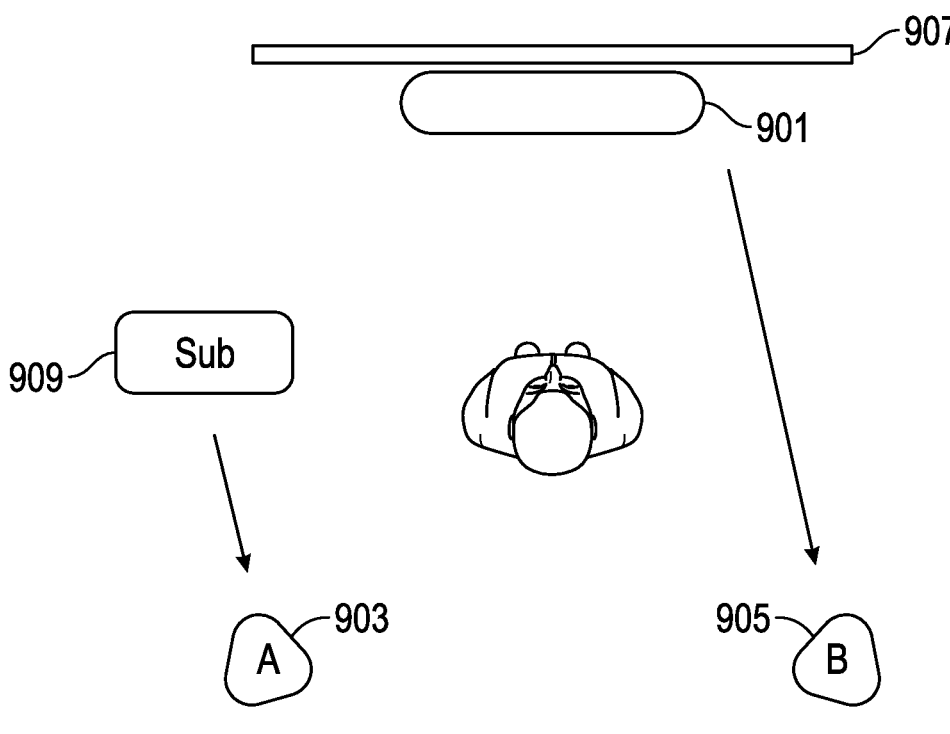
Figure 9F:
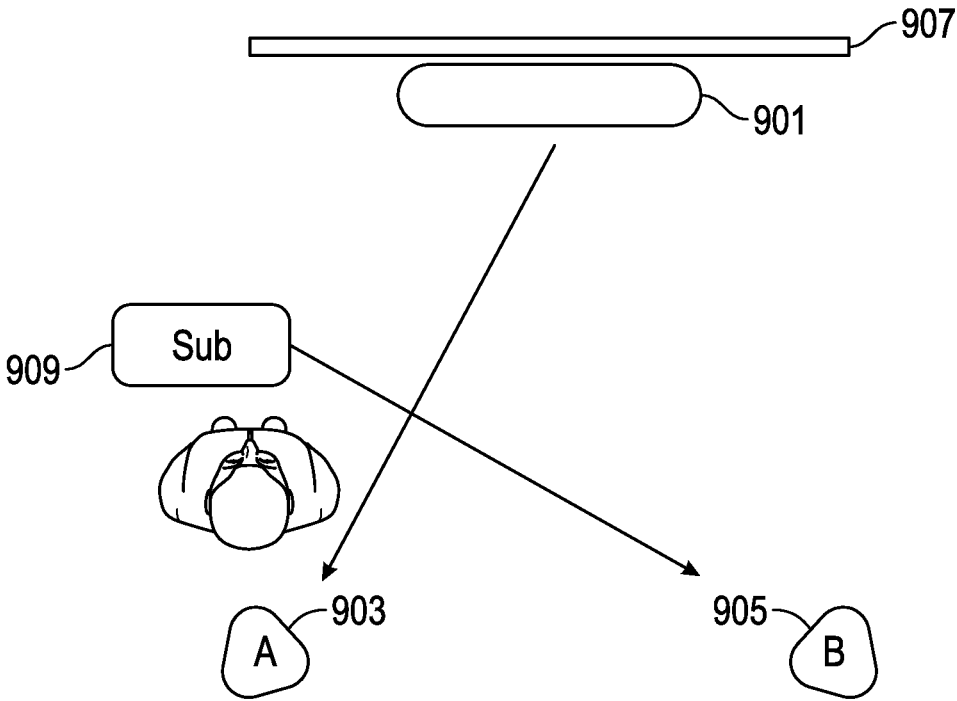
Figure 9I:
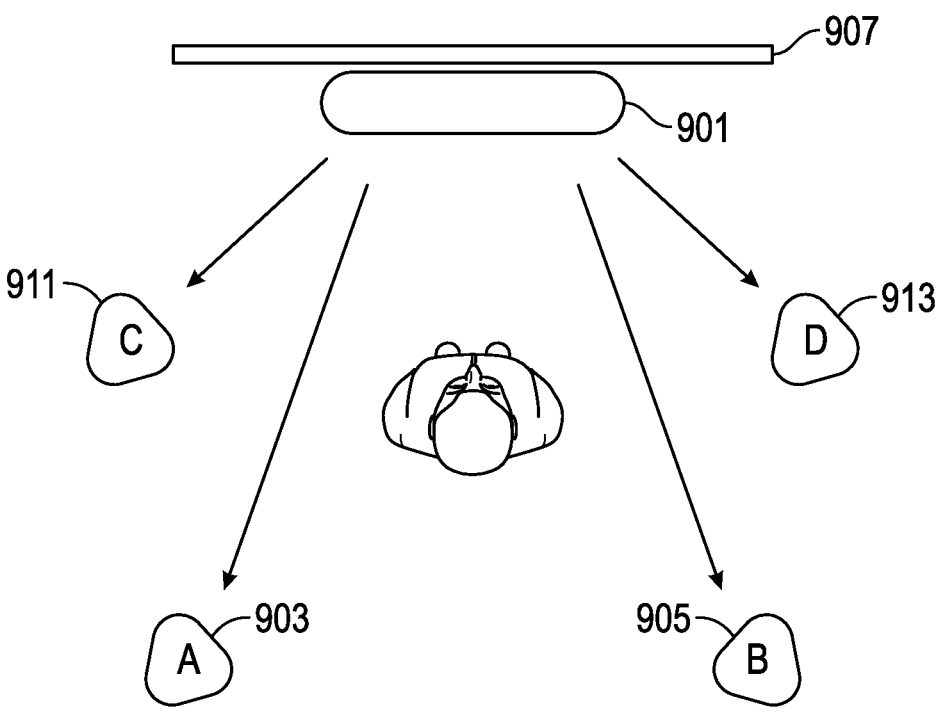
Figure 9J:
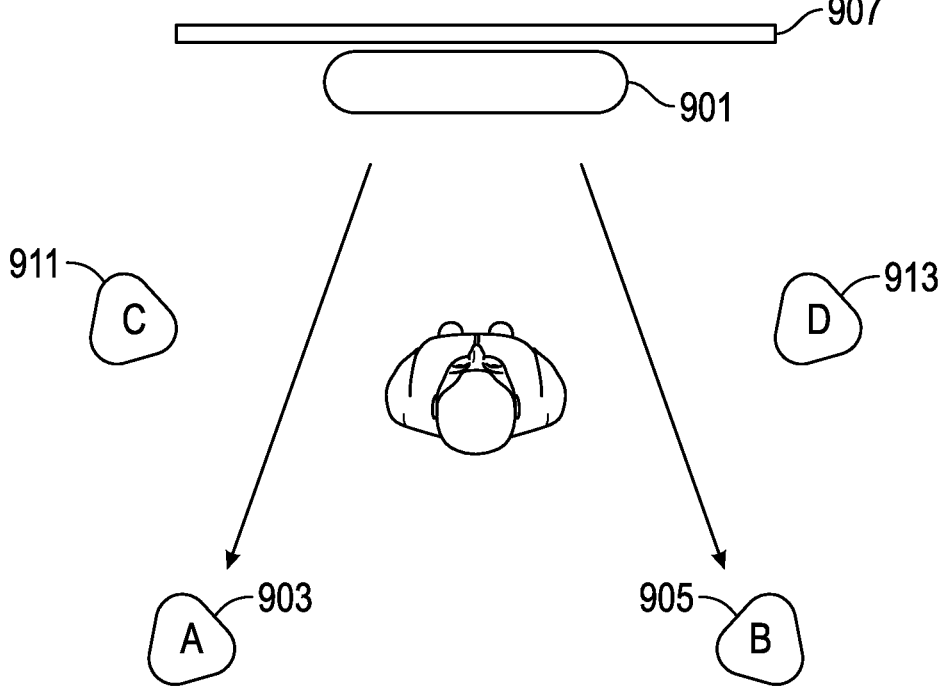
Figure 9M:
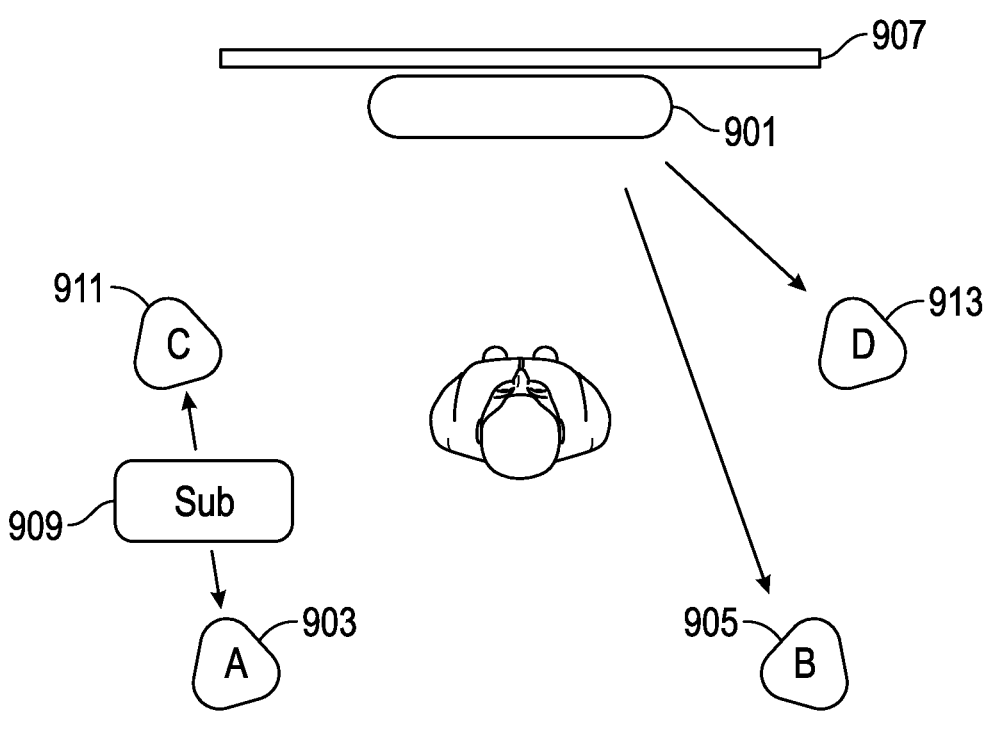
Figure 9N:
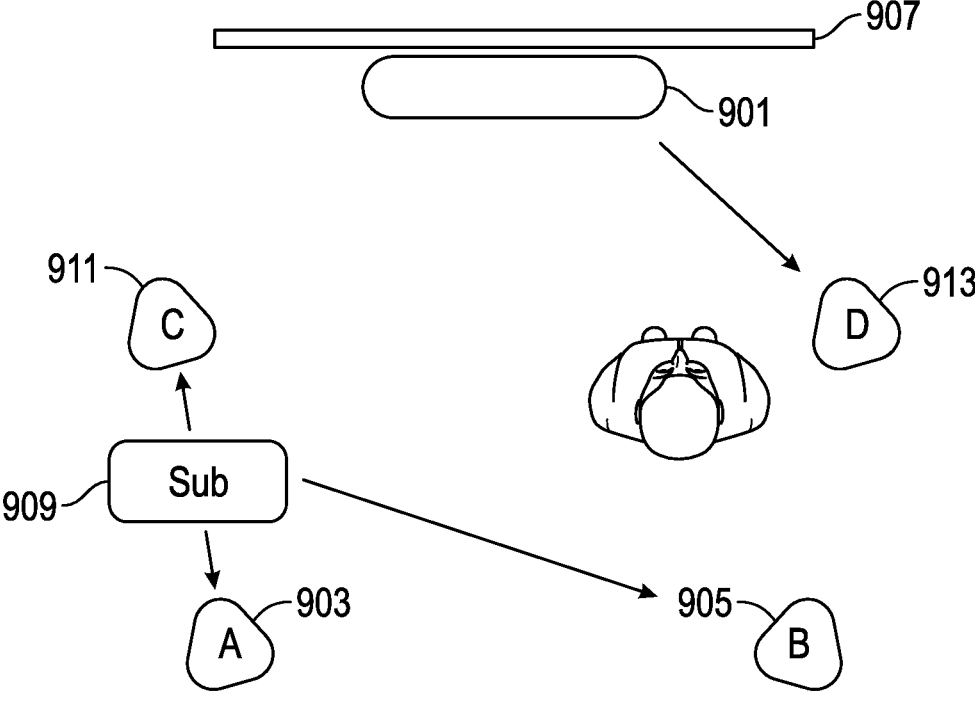
Figures 9O, 9P:
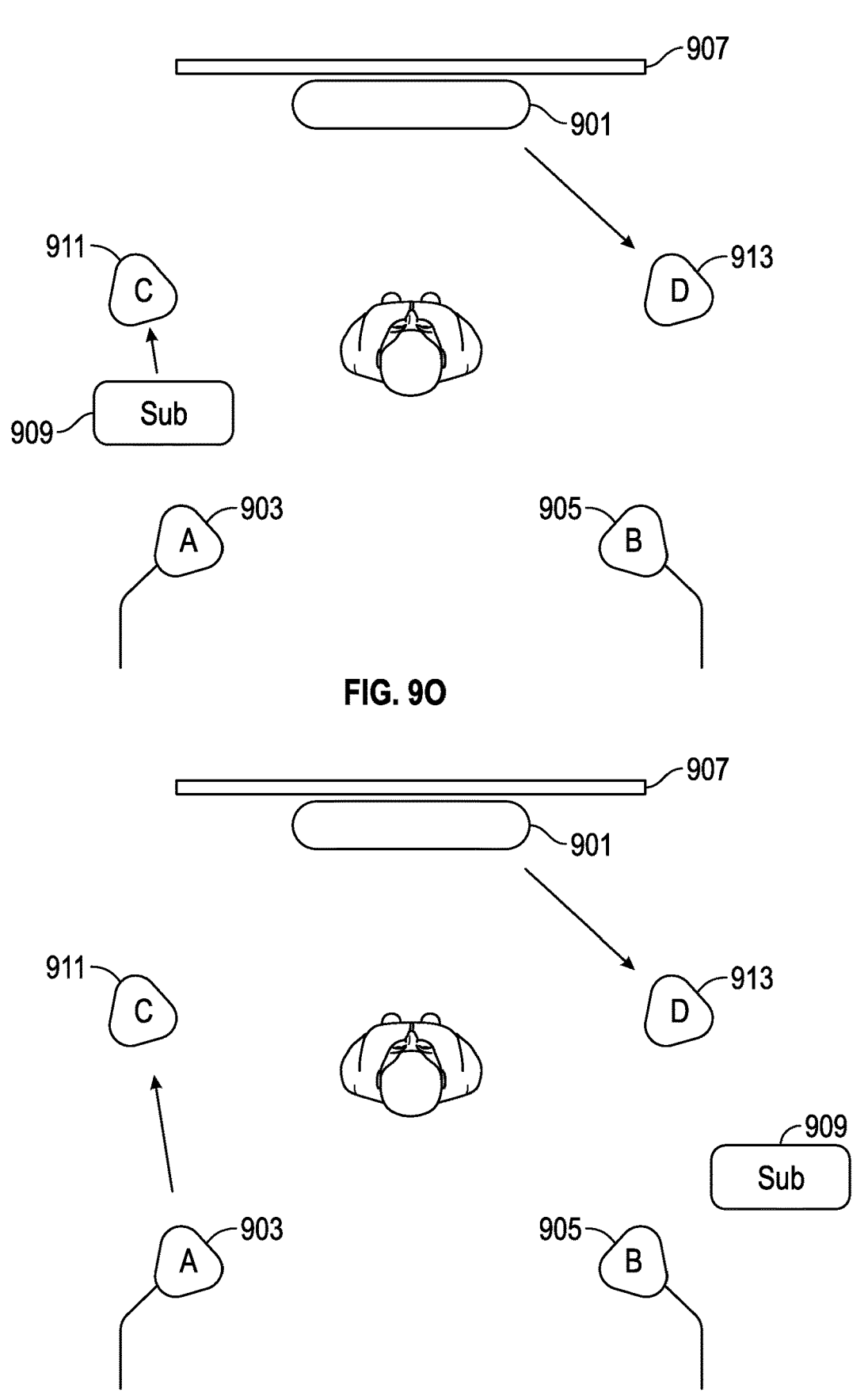
Figure 9Q:
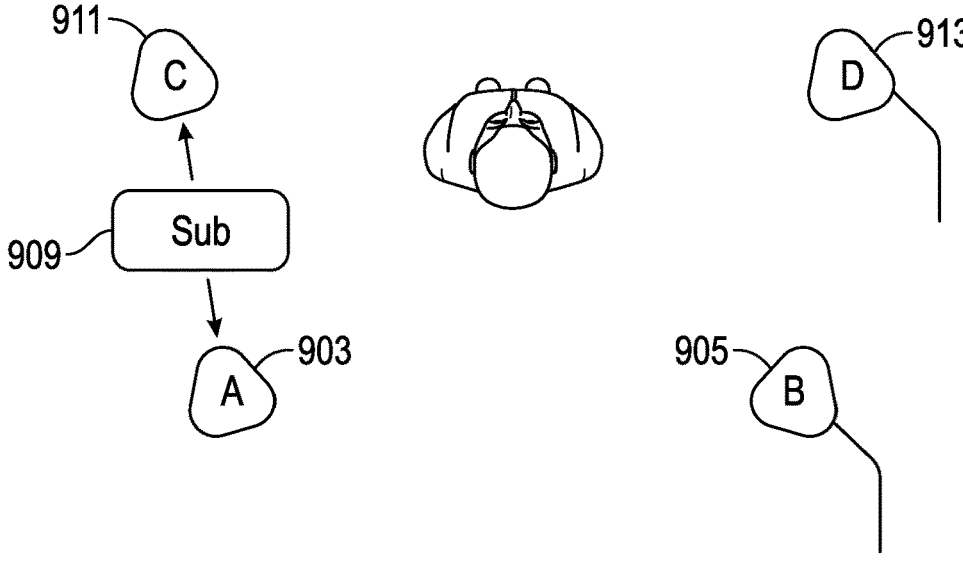
Figure 9R:
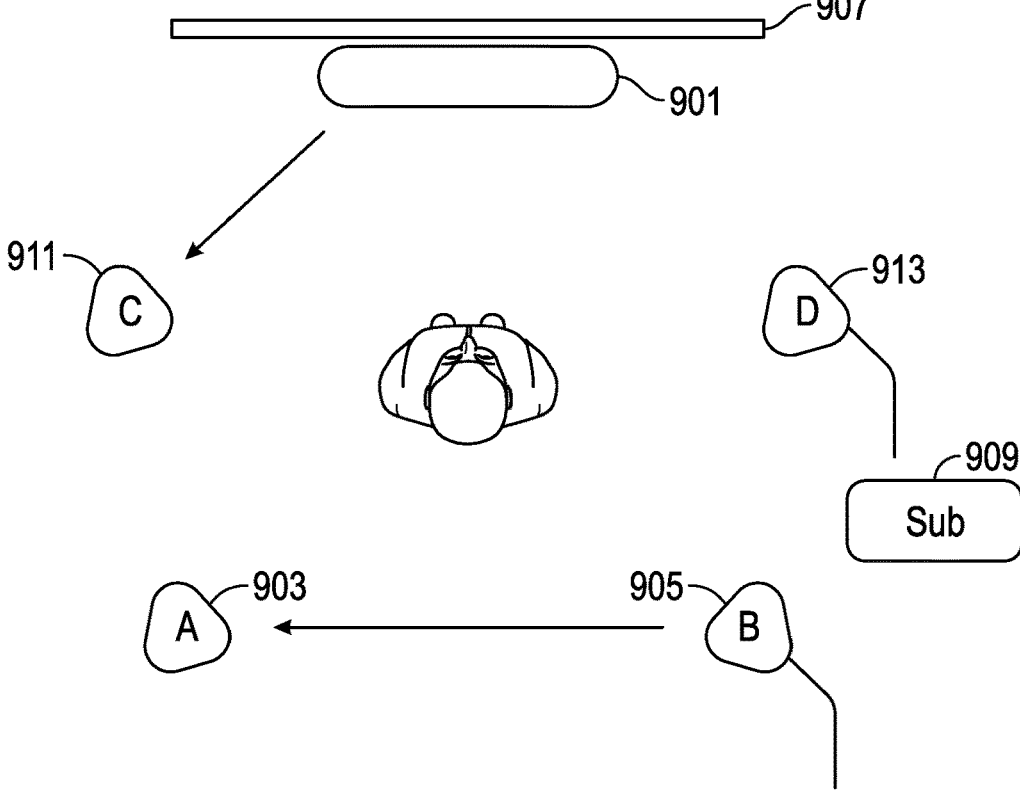
Figure 9U:
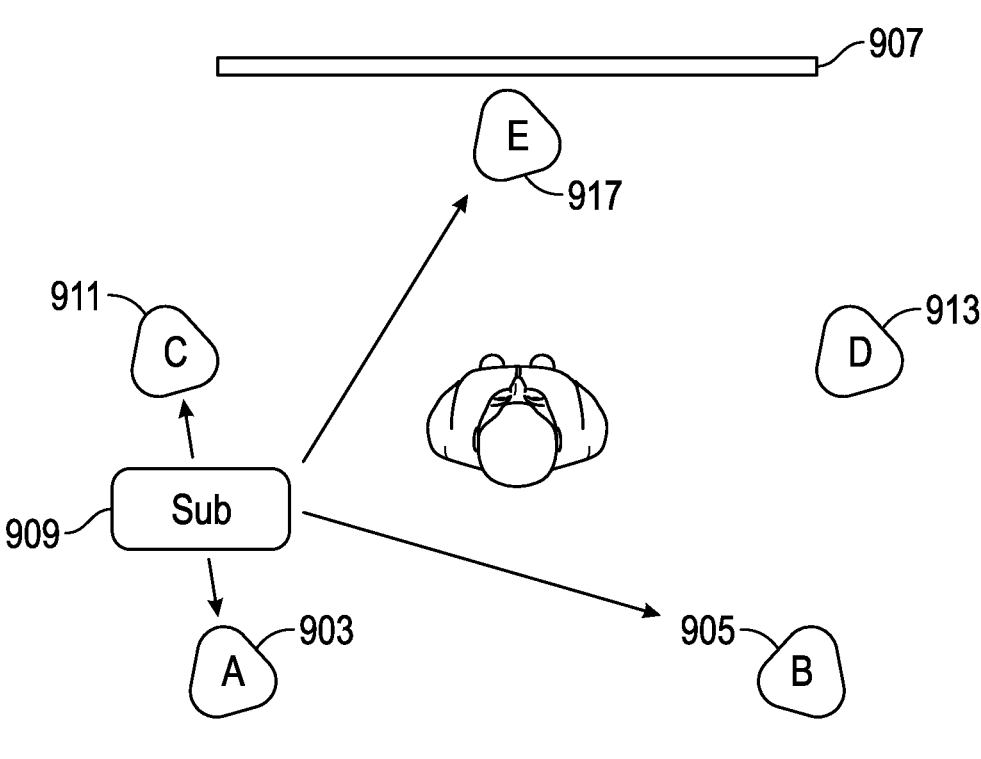
Figure 9V:
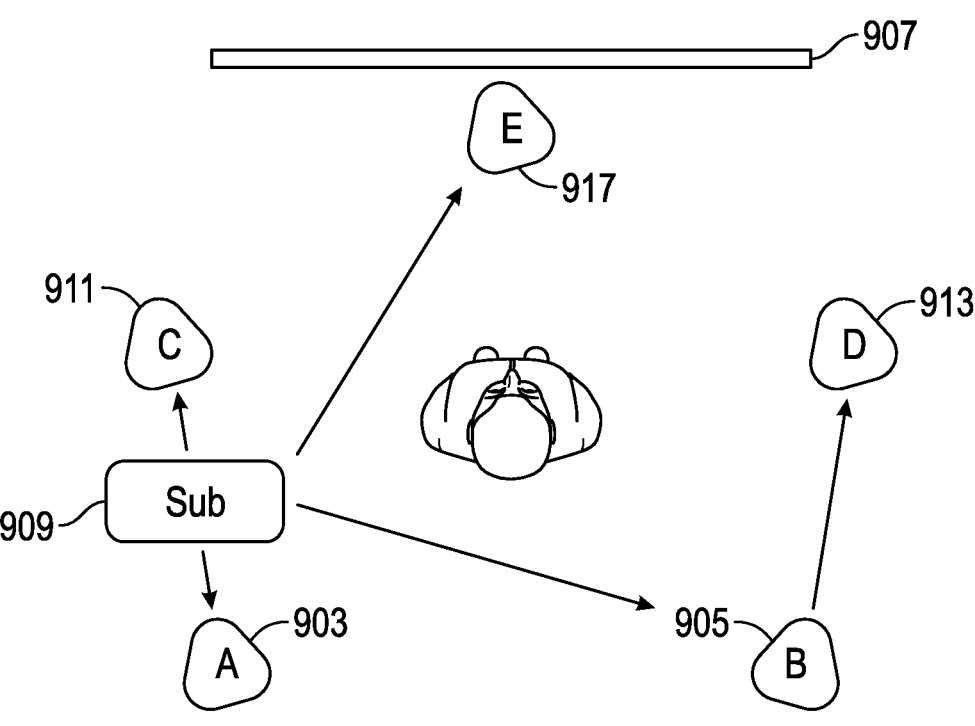
Figure 9W:
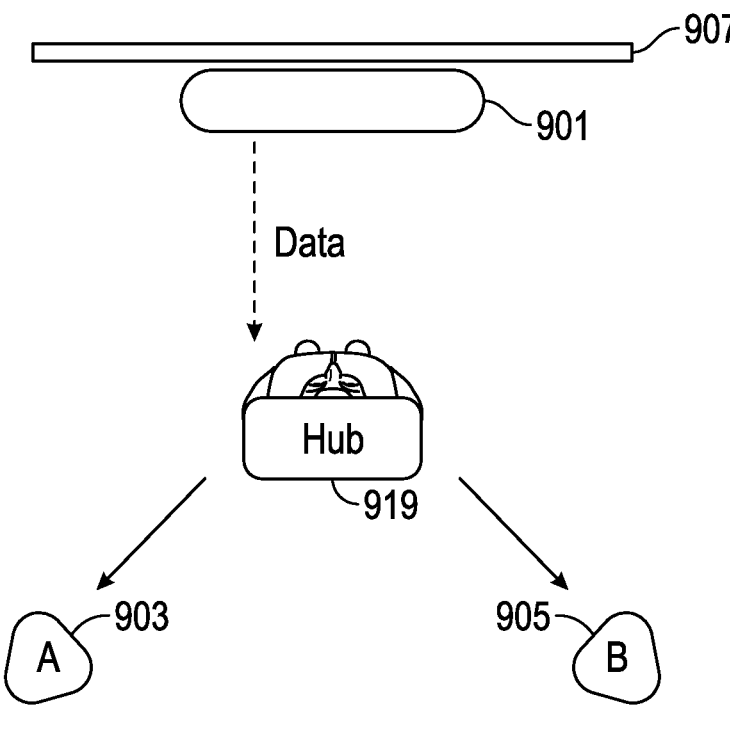
Figure 9X:
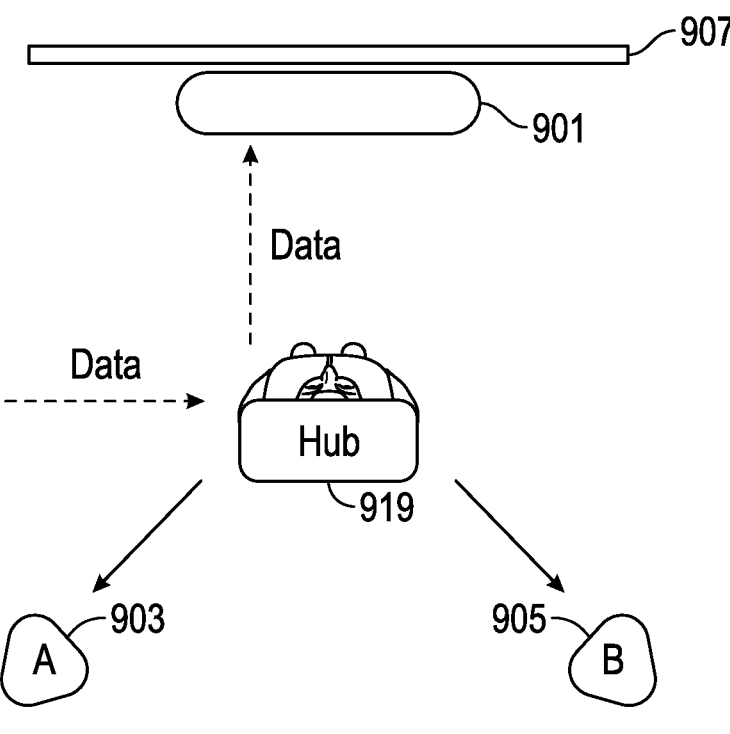
Figure 12:
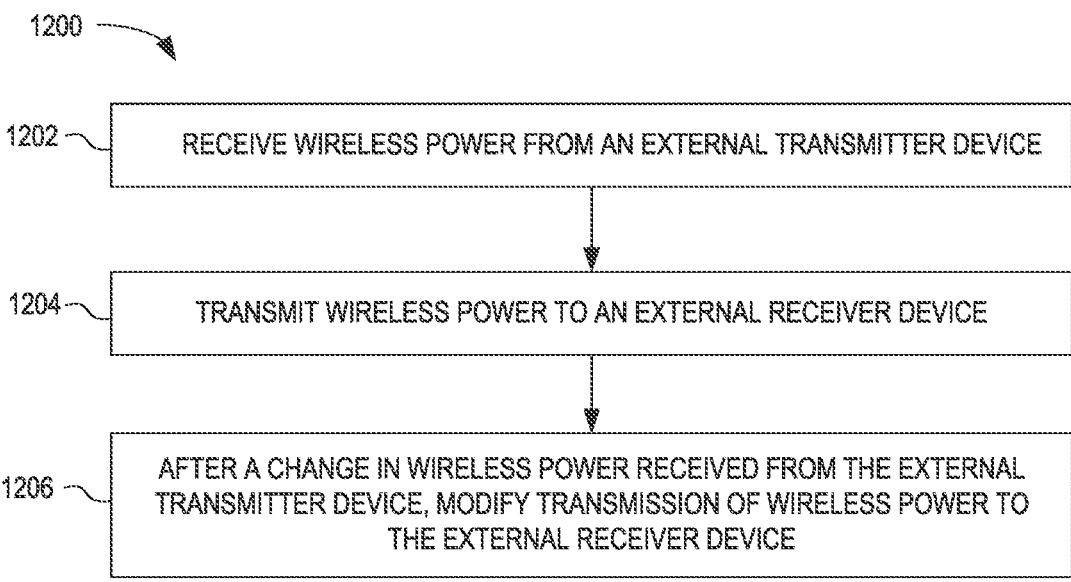
Figure 13:
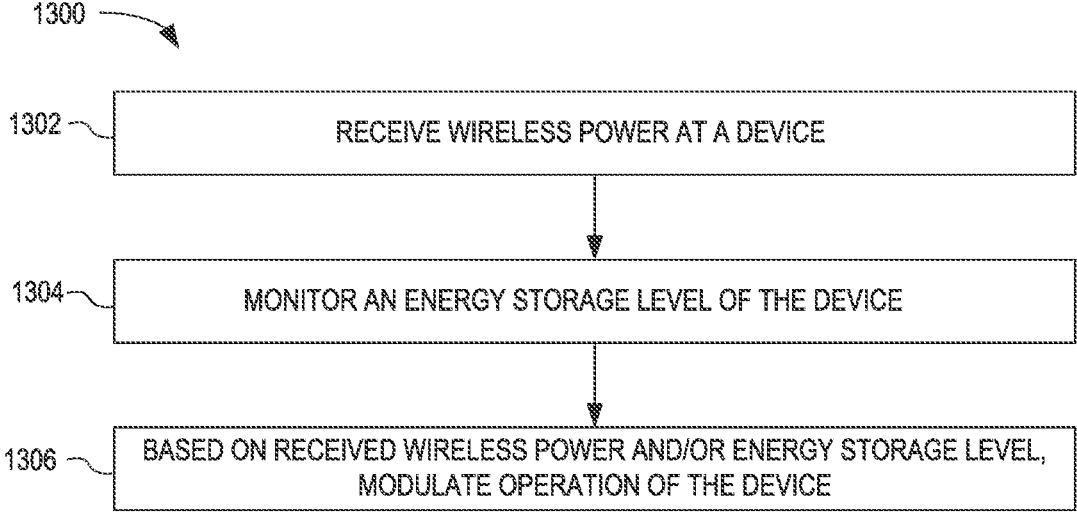
Figure 14:
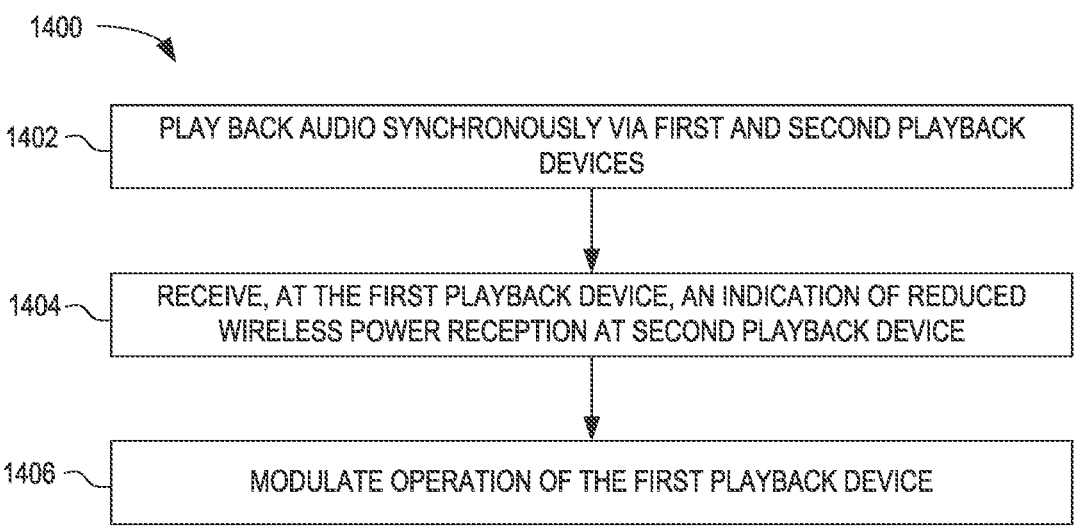
Figure 15:
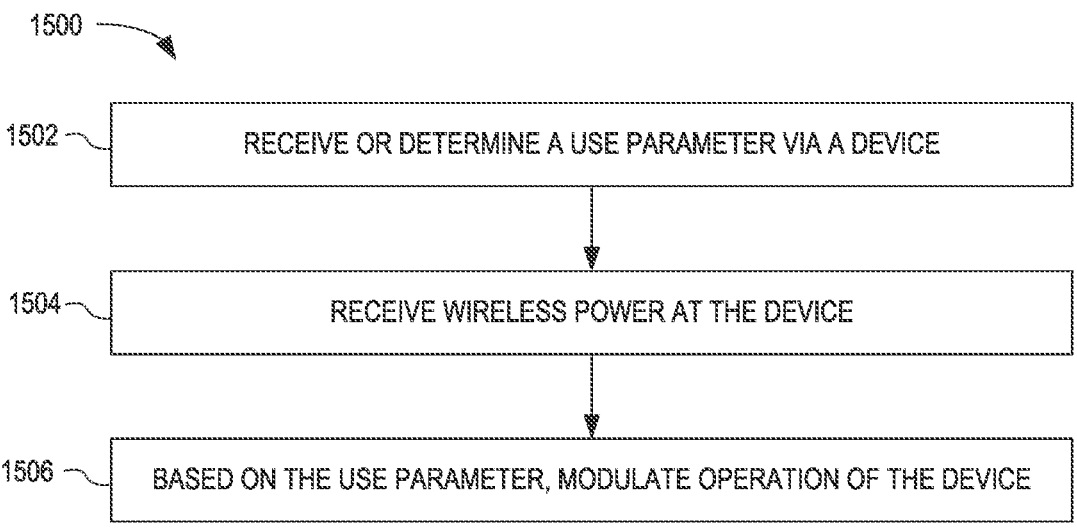

FIGS. 9A-9X illustrate a variety of example scenarios in which wireless power transfer devices and associated methods can be employed. The scenarios described herein are exemplary only, and one of ordinary skill in the art will understand that there are myriad variations in which wireless power transfer may be usefully employed for audio playback and other applications. These examples illustrate interactions among a power group in which wireless power is transferred between group members in a variety of different arrangements. In various examples, the particular configuration of wireless power transfer within the power group can be predetermined, or may be dynamically selected or determined at least in part based on relevant parameters such as: stored energy levels some or all of the device(s), power consumption rate of some or all of the devices, a rate of wireless power receipt at some or all of the devices, relative locations of some or all of the devices, a use parameter such as a user's presence or absence, or any other parameter relevant to power storage, power transmission, or power consumption.

In FIG. 9A, a first WPT device 901 transmits wireless power to second and third WPT devices 903 and 905. For example, the first WPT device 901 can be a soundbar or other such audio playback device that has a wired power input. Optionally, the first WPT device 901 is integrated into or communicatively coupled (e.g., via a wired or wireless connection) to a video playback device 907 such as a television. The second and third WPT devices 903 and 905 may be audio playback devices configured to provide surround sound audio (e.g., second WPT device 903 may be a left rear surround, and the third WPT device 905 may be a right rear surround).

In the scenario shown in FIG. 9A, the first WPT device 901 transmits wireless power to each of the second and third WPT devices 903 and 905. In the scenario shown in FIG. 9B, the first WPT device 901 transmits wireless power only to the first WPT device 903, which in turn transmits wireless power to the second WPT device 905. In this configuration, the first WPT device 903 acts as a "relay," both receiving wireless power from the first WPT device 901 and transmitting wireless power to the third WPT device 905.

In the scenario illustrated in FIG. 9C, the user has moved into the transmission path between the first WPT device 901 and the second WPT device 903. As the user's position may block wireless power transmission between the first WPT device 901 and the second WPT device 903, the rate of wireless power received at the second WPT device 903 may fall. To continue powering the first WPT device 903, the first WPT device 901 may instead transmit wireless power to the third WPT device 905, which in turn transmits wireless power to the second WPT 903.

In some examples, this transition can be effected based on a determination that a rate or level of wireless power received at the second WPT 903 has decreased or fallen below a predetermined threshold. Additionally or alternatively, additional sensor(s) can be used to detect the presence of a user (or other object) blocking the line of sight between the first WPT device 901 and the second WPT device 903.

FIG. 9D illustrates another arrangement in which the first WPT 901 also provides wireless power to the video display device 907. Such wireless power transmission can be instead of or in addition to any wired power provided to the video display device 907.

In FIG. 9E, another WPT device 909 (e.g., an audio playback device having its own wired power source) separately provides wireless power to the second WPT device 903 while the first WPT device 901 provides wireless power to the third WPT 905. In some examples, the WPT device 911 can be a subwoofer or other audio playback device having a wired power input.

In the scenario shown in FIG. 9F, the user has moved into the line of sight between the WPT device 909 and the second WPT 903. In response, the configuration of wireless power transfer can be modified. For example, the first WPT device 901 may transmit wireless power instead to the second WPT 903, while the WPT device 909 transmits wireless power to the third WPT device 905.

FIG. 9G illustrates a configuration in which the second and third WPT devices 903 and 905 are powered solely by the WPT device 909, with no wireless power transmitted from the first WPT 901. FIG. 9H illustrates the scenario in which the second and third WPT devices 903 and 905 are moved further from the WPT 909 and closer to the first WPT 901. In response, the first WPT 901 may initiate wireless power transmission to the second and third WPT devices 903 and 905, and the WPT device 909 may cease wireless power transmission. For example, as a level of wireless power received at certain devices falls, the system may reconfigure transmission such that a different device begins to transmit wireless power to those devices.

FIGS. 9I-9K illustrate a configuration in which the first, second, and third WPT devices 901, 903, and 905 are joined by two additional WPT devices 911 and 913. These additional WPT devices 911 and 913 can be, for example, front left and front right surround playback devices. In the example shown in FIG. 9I, the first WPT device 901 transmits wireless power to all four WPT devices: 903, 905, 911, and 913. In the example shown in FIG. 9J, the first WPT device 901 transmits wireless power to the first and second WPT devices 903 and 905, but the additional WPT devices 911 and 913 do not receive wireless power from the other devices. In at least some cases, the devices 911 and 913 may be audio playback devices that are powered over a wired connection, and optionally are not capable of receiving wireless power from external transmitter devices. In the example shown in FIG. 9K, the WPT devices 911 and 913 transmit wireless power to the first and second WPT devices 903 and 905, respectively.

Referring now to FIG. 9L, the additional WPT 909 (e.g., a subwoofer or other playback device, optionally with a wired power connection) transmits wireless power to the first and second WPT devices 903 and 905, while the first WPT device 901 transmits wireless power to the WPT devices 911 and 913. FIG. 9M illustrates a similar configuration, except that the additional WPT device 909 transmits wireless power to WPT devices 903 and 911, and the first WPT 901 transmits wireless power to WPT devices 905 and 913. In FIG. 9N, the additional WPT device 909 transmits wireless power to WPT devices 903, 905, and 911, while the first WPT device 901 transmits wireless power only to the WPT 913. This transition can be made as a result of the user moving to obstruct a line of sight between the WPT device 909 and the WPT device 913, or based on other parameters.

In the arrangement shown in FIG. 9O, the second and third WPT devices 903 and 905 are connected to wired power, while the WPT device 909 wirelessly powers WPT device 911, and the first WPT device 901 wirelessly powers the WPT device 913. FIG. 9P illustrates a similar arrangement, except that WPT device 909 neither transmits or receives wireless power, and the second WPT device 903 (which is connected to a wired power input) wirelessly powers WPT device 911. In some examples, the system can transition from the arrangement of FIG. 9O to that of FIG. 9P when a user moves the WPT device 909 to a new location that is further from the WPT device 911.

FIG. 9Q illustrates a similar configuration except that the WPT device 909 (which can be a subwoofer or other device with a wired connection) wirelessly powers the WPT devices 903 and 911, while WPT devices 905 and 913 each have their own wired power connection. In the arrangement shown in FIG. 9R, the WPT device 909 is moved further from WPT devices 903 and 911 (or alternatively by removing the WPT device 909 altogether, or by the WPT device 909 losing power), and in response the power group can adapt by transmitting wireless power from the third WPT device 905 to the second WPT device 903, and by transmitting wireless power from the first WPT device 901 to the WPT device 911.

In the arrangement shown in FIG. 9S, WPT devices 909 and 915 can each take the form of audio playback devices (e.g., subwoofers) having wired power connections. These devices provide wireless power to the second and third WPT devices 903 and 905, respectively, while the first WPT device 901 provides wireless power to the WPT devices 911 and 913. In an alternative state, shown in FIG. 9T, the WPT devices 909 and 915 each power two WPT devices, with no wireless power being transmitted from the first WPT device 901. This transition (from the arrangement of FIG. 9S to that of FIG. 9T) may be made based on, for example, moving the WPT devices 911 and 913 closer to the respective WPT devices 909 and 915, or by a change in power level or other state of the first WPT device 901.

In the examples shown in FIGS. 9U and 9V, the first playback device 901 (e.g., a soundbar with a wired power connection) is replaced with a WPT device 917 having no wired power connection. As shown in FIG. 9U, the WPT device 909 (e.g., a subwoofer having a wired power connection) can power each of WPT devices 903, 905, 911, and 917. However, because the user is blocking a line of sight between the WPT device 909 and the WPT device 913, no power is transmitted to WPT device 913. In FIG. 9V, the third WPT device 905 transmits wireless power to the WPT device 913, for example in response to an indication that the WPT device 913 is low on battery, has stopped receiver power, or other such instruction.

FIGS. 9W and 9X illustrate examples in which a WPT hub device 919 provides wireless power to the second and third WPT devices 903 and 905. In some examples, the WPT hub device 919 can be a standalone device that does not have audio playback capabilities, but has a wired power input and is configured to transmit wireless power to one or more external receiver devices. In some examples, the WPT hub device 919 can be an architectural feature configured to be integrated into a structure (e.g., ceiling-mounted, wall-mounted, integrated into furniture such as a television stand, etc.). In some examples, the WPT hub device 919 may provide power to external WPT devices and may also communicate with at least the first WPT 901. In the illustrated example, the first WPT 901 transmits data to the WPT hub device 919, which in turn provides wireless power to the second and third WPT devices 903 and 905. In the example shown in FIG. 9X, the WPT hub device 919 receives data from one or more external devices (e.g., one or more remote computing devices, other local devices, etc.), and optionally may transmit data to the first WPT 901 and/or to any other devices. In some instances, based on the received data, the WPT hub device 919 may initiate, cease, or modify transmission of wireless power to nearby receiver devices.

VI. Example Methods for Managing Wireless Power Transfer Devices

FIGS. 10-19 illustrate example methods for managing wireless power transfer (WPT) devices, such as audio playback devices having wireless power transmitters and/or wireless power receivers integrated therein. The methods described herein may be performed by a device, such as the WPT device 700 of FIG. 7, the power group coordinator 800 or power group members 850*a-b* of FIG. 8, the NMD 103*a* of FIG. 1A, or a playback device such as playback device 120 of FIG. 2A. In various examples, the illustrated blocks may be modified, combined, sub-divided, or performed in orders other than those shown and described herein.

a. Modulating Wireless Power Transmission Based on Wireless Power Delivered

In some cases, it may be useful to modify the transmission of wireless power based on the rate, level, or amount of wireless power received by one or more external receiver devices. An example method 1000 begins in block 1002 with transmitting wireless power from a transmitter device to one or more external devices. The transmitter device can be, for example an audio playback device having a wireless power transmitter incorporated therein, and/or the external device(s) can be an audio playback device having a wireless power receiver incorporated therein. In some examples, the one or more external devices are spaced apart from the transmitter device by at least about 10 cm, about 50 cm, or about 1 m.

In block 1004, the transmitter device receives a power receipt parameter corresponding to the one or more external devices. In various examples, the power receipt parameter can include an indication of the power received by the external device(s). The indication can be a rate of wireless power received, a total amount of wireless power received, or a binary indicator of whether or not wireless power is currently being (or has recently been) received by the external device(s). In some examples, the power receipt parameter includes an energy storage level indication (e.g., a battery level) of the one or more external devices.

The method 1000 advances to block 1006 to modify the wireless power transmission based at least in part on the power receipt parameter. For example, modifying the wireless power transmission can include temporarily suspending transmission of wireless power for a period of time, and after the period of time, resuming transmission of wireless power. Such temporary suspension may be useful if, for example, a user is temporarily blocking a path of wireless power transmission between the devices.

Additionally or alternatively, modifying the wireless power transmission can include changing a directional output of the wireless power (e.g., using adjustable lenses, mirrors, antennas, etc.). In some cases, real-time or near-real-time feedback can be provided regarding wireless power received from the external devices, and this feedback can be used to steer or otherwise change the directional output of the wireless power so as to ensure that the external device(s) receive sufficient power via the wireless power output.

In some examples, modifying the wireless power transmission includes transmitting wireless power to a second one or more external devices different from the first. For example, if the first device ceases to receive wireless power from the transmitter device, the transmitter device may instead deliver wireless power to a second external device. Optionally, the second external device may be configured to in turn provide wireless power to the first external device (e.g., in a "relay" configuration). In at least some examples, modifying wireless power transmission includes ceasing transmission of wireless power altogether.

b. Guidance for Placement of Wireless Power Receiver Devices

In some cases, it may be useful to guide a user with respect to relative positioning of wireless power transmitter and receiver devices. An example method 1100 begins in block 1102 with outputting instructions to facilitate placement of wireless power receiver devices. For a given wireless power transmitter device and wireless power receiver device, certain relative positions may be more beneficially adapted to receive wireless power transfer. Accordingly, it can be useful to provide guidance (e.g., in the form of an output from the transmitter device) as to where the intended wireless power receiver devices should be positioned.

In various examples, the guidance can take the form of a visual or audible representation of suitable placement positions within the environment. For example, the instructions or guidance can include audible output, such as real-time or near-real-time audio feedback regarding placement of the one or more second devices. Additionally or alternatively, the guidance can include one or more positioning guides, such as an optical projection. As one example, an optical pattern can be projected into the environment with desirable locations (e.g., those with a clear line-of-sight from the transmitter device) indicated visually for a user to see. In some examples, such guidance can be presented as an augmented reality visualization (e.g., displayed via a control device) that indicates desirable placement locations for receiver device(s) within the environment. In some cases, desirable placement locations can be determined by scanning the environment, for example using a camera coupled to the control device or other suitable imaging device. Images, video, or other data regarding the environment can be analyzed to determine desirable relative positions of the transmitter device and receiver device(s).

In at least some instances, the instructions can indicate a position of the one or more second devices suitable to receive wireless power (e.g., from the wireless power transmitter). In various examples, the instructions may indicate a position at least about 10 cm, at least about 50 cm, or at least about 1 m away from the transmitter device.

Although such indicated placement positions can rely in whole or in part on a projected or determined wireless power transmission parameter, in some examples the instructions indicate one or more positions of the one or more second devices based at least in part on a projected acoustic performance of the one or more second devices at the one or more positions. For example, if a receiver device may perform particularly well acoustically at a given location, that location may be preferred even if it is not the optimal location for wireless power delivery, because the improved acoustic performance can reduce the power consumption of that device, leading to an overall optimization of device operating time by positioning the device at an acoustically beneficial location.

Method 1100 continues in block 1104 with transmitting wireless power to the receiver device(s). In some examples, the transmitter device may receive a power receipt parameter indicating acceptable placement of the receiver device(s). Additionally or alternatively, the method can further include outputting an indicator to the user of successful placement of the one or more receiver devices. In various examples, the indicator can include at least one of: (i) a light, (ii) a sound, or (iii) a notification output via a control device.

c. Modulating Device Operation Based on Wireless Power Received

As noted elsewhere herein, in some cases the power received at a wireless receiver device may vary over time. Accordingly, it may be useful to modify operation of the receiver device based on the wireless power received. An example method 1200 begins in block 1202 with receiving wireless power from an external transmitter device. In block 1204, the device transmits wireless power to an external receiver device. In some instances, the external transmitter device and the external receiver device can be distinct, such that the device acts as a relay, by receiving wireless power from one device and providing wireless power to another.

Method 1200 advances to block 1206, with modifying transmission of wireless power to the external receiver device after detecting a change in wireless power received from the external transmitter device. For example, if the wireless power level drops (e.g., a rate of power received is reduced), the wireless power transmitted to the external receiver device may be modified. In various examples, such modification can include ceasing or pausing wireless power transmission, and/or reducing a rate or wireless power transmission. Additionally or alternatively, modifying wireless power transmission can include redirecting wireless power transmission towards a second, different external receiver device.

In some examples, the device is a first audio playback device, the external transmitter device is a second audio playback device, and the first and second audio playback devices are configured to play back audio synchronously (e.g., the first and second audio playback devices are grouped together for audio playback). In some examples, the external receiver device can be a third audio playback device, and the first and second audio playback devices can be configured to play back audio synchronously (e.g., the first and third audio playback devices are grouped together for audio playback).

The method can further include sending a signal to a second external transmitter device, for example a signal indicating that a level of wireless power being received has been reduced. After sending the signal, a second external transmitter device may initiate wireless power transfer, such that the device begins to receive wireless power from the second external transmitter device.

d. Reducing Power Consumption in Low Power States

In scenarios in which a WPT device reaches a low power state, it may be necessary or beneficial to reduce power consumption to extend the operation time of the device and to avoid poor user experiences of a device "dropping out" unexpectedly. One example method 1300 begins in block 1302 with receiving wireless power at a device. In block 1304, the method monitors an energy storage level of the device (e.g., a battery charge level or percentage, an estimated remaining operation time, etc.).

In block 1306, the method involves modulating operation of the device based on the received wireless power and/or the energy storage level. For example, if the battery charge level indicates a reduced device operation time under normal operating conditions, then device operation may be modulated in a manner that extends the projected device operation time (e.g., by entering a low-power or stand-by state).

In some examples, the device is an audio playback device, and modulating operation of the device includes modulating audio playback, such as reducing a volume of audio playback, and/or reducing a low-frequency output of audio playback. Moreover, in some examples modulating audio playback can include routing at least a portion of low-frequency audio content to a second audio playback device for synchronous playback. Since low-frequency content is particularly power-intensive to play back, it may be especially useful to offload playback responsibilities for at least a portion of such low-frequency audio content.

Additionally or alternatively, modulating operation of the device can include disabling at least one microphone of the device. In some instances, this can include disabling access to any associated voice assistant services associated with the device.

In at least some cases, modulating operation of the device can include causing a different external transmitter device to initiate wireless power transmission. As another example, the device operation can be modulated by outputting an alert to the user (e.g., an audible alert, an indication via a control device, blinking lights, etc.) that indicates a low wireless power reception. In response, a user may reposition the device, reposition the transmitter device, or make other modifications to the environment that improves wireless power reception at the device.

e. Grouping Playback Devices Based on Wireless Power Transmission

In some cases, the grouping (e.g., bonding) of audio playback devices for synchronous playback can be based, at least in part, on the transmission of wireless power between the playback devices. One example method 1400 begins in block 1402 with playing back audio synchronously via first and second playback devices.

In block 1404, the first playback device receives an indication of reduced wireless power reception at the second playback device. At block 1406, operation of the first playback device is modulated. For example, because the second playback device has reduced power, its audio playback may be modified (e.g., reduced volume, reduced bass output, etc.). In order to reduce or eliminate any mismatch between the two devices (e.g., as when the first and second devices are configured to operate as left and right surrounds), operation of the first playback device can be modulated in response to the condition of the second playback device.

In some examples, modulating operation of the first playback device can include modulating audio playback to correspond to audio playback via the second playback device, such as reducing a volume of audio playback, reducing a low-frequency output of audio playback, etc. In some instances, at least a portion of the low-frequency audio content may be routed from the first playback device to a third audio playback device for synchronous playback.

Modulating operation of the device optionally includes wirelessly transmitting power to the second audio playback device via the wireless power transmitter. This power transmission may remedy the low power receipt of the second playback device such that audio playback conditions can be maintained.

In at least some cases, modulating operation of the first playback device can include outputting an alert (e.g., an audible or visible indication) of low wireless power reception at the second playback device.

f. Utilizing Standby Mode to Reduce Charging Time

In order to conserve power and reduce the amount of time required to fully charge a WPT device, it may be useful to intelligently utilize standby modes or other low-power states. One example method 1500 begins in block 1502 with receiving or determining a use parameter via a device (e.g., a wireless power receiver device).

In various examples, the use parameter can be any parameter that indicates or is based on usage of the device. For instance, the use parameter can be based at least in part on a scheduled device operation time, and/or a detected presence of a user. A user's presence may be detected via, for example, sonic detection, ultrasonic detection, optical detection (e.g., infrared sensors), a pattern of received wireless power (e.g., a temporary reduction in wireless power received may indicate a user passing through the line-of-sight between a transmitter device and a receiver device), a received signal strength indicator (RSSI), or any other suitable parameter or sensing technique. In some embodiments, the use parameter indicates whether the device is currently being used for audio playback. Additionally or alternatively, the use parameter indicates whether the device may be safely transitioned to standby mode (e.g., during off-hours in which the device historically has not been activated by the user).

In block 1504, wireless power is received at the device, and in block 1506, the device operation is modulated based at least in part on the use parameter. In various examples, modulating operation of the device can include transitioning the device into a low-power state, disabling one or more microphones of the device, or modulating playback of audio content (e.g., reducing volume, pausing or ceasing audio playback, reducing low-frequency output, etc.).

In some examples, modulating operation of the device includes transitioning the device from an active state into a low-power state according to a schedule, wherein the schedule includes staggered periods of low-power states for a plurality of devices, such that at any given time at least one device of the plurality of devices is in an active state. In some instances, the device may be awaked from the low-power state (e.g., transitioned back into the active state) based on scheduling, instructions from other devices (e.g., an indication that a user has activated another playback device), or other such use parameter.

According to some examples, the use parameter comprises a user-sleep indication. For example, a user's sleep may be detected using microphones of the device, by receiving a sleep indication from another device such as a fitness band, etc. In such instances, modifying operation of the device may include one or more of: dimming a light, turning off a light, delaying or forgoing a software update, or suppressing an audio output so as to not disturb the user's sleep.

g. Data Transmission Using Wireless Power Signals

Figure 16:
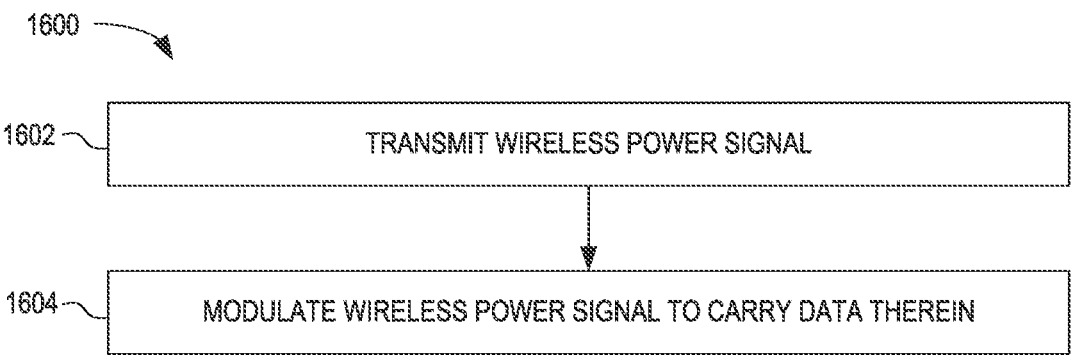
Figure 17:
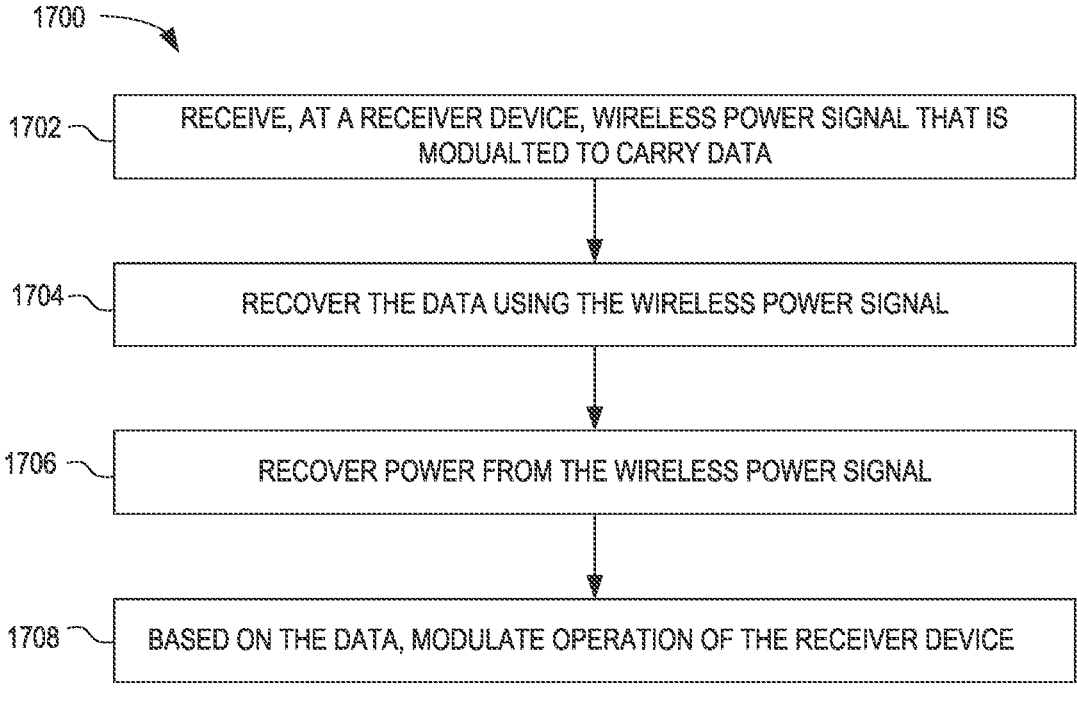

As noted elsewhere herein, in some instances a wireless power signal can be imparted with data for communication among WPT devices. FIGS. 16 and 17 illustrate methods of transmitting and receiving wireless power signals having data incorporated therein. Turning now to FIG. 16, the method 1600 begins in block 1602 with transmitting a wireless power signal via a transmitter device. In block 1604, the wireless power signal is modulated to carry data therein. In some examples, the signal can be modulated prior to any transmission, while in other instances the wireless power signal may be transmitted initially without any modulation for data transfer, and after a period of time the signal may be modulated to carry data therein. The wireless power signal can be modulated to carry data using at least one of: frequency modulation, amplitude modulation, phase modulation, pulse width modulation, spread spectrum modulation, or any other suitable modulation technique.

In various examples, the data incorporated therein can include one or more of: a battery level indication of a transmitter or receiver device, identifying information of the transmitter device, synchronization data, audio playback synchronization data, or audio content metadata. Examples of synchronization data transmitted between devices of a media playback system can be found in U.S. Provisional Application No. 63/013,069, filed on Apr. 21, 2020, which is hereby incorporated by reference in its entirety.

In some examples, the wireless power signal is a first wireless power signal modulated according to a first modulation scheme, and the wireless power transmit may transmit a second wireless power signal modulated according to a second modulation scheme different from the first. For example, based at least in part on an energy storage level of the transmitter device, the modulation scheme used to modulate the wireless power signal may be modified (e.g., to provide less data transmission vs. power transmission or vice versa).

The data transmitted can optionally include instructions to a receiver device to modulate its device operation, for example to dim one or more lights, disable one or more microphones, or modify one or more audio playback parameters. This may be particularly suitable if the receiver device is determined to be in a low-power state.

Turning to FIG. 17, the method 1700 illustrates an example method for receiving a wireless power signal carrying data therein. In block 1702, a receiver device receives a wireless power signal that is modulated to carry data from an external transmitter device. The wireless power signal can be modulated to carry data using at least one of: frequency modulation, amplitude modulation, phase modulation, pulse width modulation, spread spectrum modulation, or any other suitable modulation technique.

At block 1704, the data is recovered using the wireless power signal (e.g., the wireless power signal may be demodulated to recover the data). In various examples, the data can include some or all of: a battery level indication of the external transmitter device, identifying information of the external transmitter device, synchronization data, audio playback synchronization data, or audio content metadata.

Method 1700 advances to block 1706 with recovering power from the wireless power signal. For example, power recovered from the wireless power signal may be used to drive one or more amplifiers of an audio playback device or otherwise contribute to operation of the receiver device.

In block 1708, operation of the receiver device is modulated based on the received data. For example, such modulation can include dimming one or more lights, disabling one or more microphones, or modifying one or more audio playback parameters of the receiver device. Additionally or alternatively, at least a portion of the data can be transmitted to an external receiver device, such that the receiver device acts as an intermediary to relay data from the external transmitter device and to the external receiver device. In some examples, the receiver device further includes a wireless power transmitter, and may transmit a wireless power signal to an external receiver device. The wireless power signal may be modulated as described above to carry at least a portion of the data h. Playback Device Groupings Based on Wireless Power Transmission In some instances, the groupings of playback devices may be modified automatically based on wireless power transmission. For example, methods 1800 and 1900 relate to methods for managing temporary playback device groupings based at least in part on wireless power transmission among them. Method 1800 begins in block 1802 with receiving, at a first playback device, wireless power from a second playback device. In block 1804, the first playback device is configured to play back audio content in synchrony with the second playback device (e.g., forming a group including at least the first and second playback devices).

In some examples, the method further includes ceasing receiving the wireless power from the second playback device, and after ceasing receiving the wireless power, removing the first playback device from the group. This cessation of wireless power received may indicate that the second playback device has been removed from the environment (e.g., relocated to another part of the user's home), and as such it may be appropriate to remove the second playback device from the audio playback group. Additionally or alternatively, after ceasing to receive the wireless power from the second playback device, the second playback device may be removed from the group for the same reasons.

In at least some cases, operation of the first playback device can be modified after the first and second playback devices are grouped together. For example, such modification can include adjusting a frequency output of the first playback device (e.g., increasing or reducing an output of low-frequency audio content).

Turning now to FIG. 19, the method 1900 begins in block 1902 with playing back audio content via first and second playback devices in synchrony. This can include forming a group that includes at least the first and second playback devices. In block 1904, the first playback device receives wireless power from the second playback device.

Next, in block 1906, the first playback device ceases to receive wireless power from the second playback device. After this cessation, the first playback device is configured to no longer play back audio content in synchrony with the second playback device (e.g., the devices are ungrouped or unbonded). In some examples, after ceasing to receive wireless power at the first playback device, either the first playback device or the second playback device may be removed from the group.

In at least some cases, operation of the first playback device can be modified after the first and second playback devices are ungrouped. For example, such modification can include adjusting a frequency output of the first playback device (e.g., increasing or reducing an output of low-frequency audio content).

VII. Examples

The present technology is illustrated, for example, according to various aspects described below. Various examples of aspects of the present technology are described as numbered examples for convenience. These are provided as examples and do not limit the present technology. It is noted that any of the dependent examples may be combined in any combination, and placed into a respective independent example. The other examples can be presented in a similar manner.

Example 1: A device comprising: a wireless power transmitter; one or more processors; and one or more non-transitory computer-readable media storing instructions that, when executed by the one or more processors, cause the device to perform operations comprising: causing the wireless power transmitter to transmit wireless power to one or more external receiver devices.

Example 2: A device comprising: a wireless power receiver; one or more processors; and one or more non-transitory computer-readable media storing instructions that, when executed by the one or more processors, cause the device to perform operations comprising: receiving wireless power, via the wireless power receiver, from one or more external transmitter devices.

Example 3: The device of any one of the Examples herein, wherein the device comprises both a wireless power receiver and a wireless power transmitter.

Example 4: The device of any one of the Examples herein, wherein the device comprises an energy storage component coupled to the wireless power receiver.

Example 5: The device of any one of the Examples herein, wherein the energy storage component comprises a rechargeable battery.

Example 6: The device of any one of the Examples herein, wherein the energy storage component comprises a capacitor.

Example 7: The device of any one of the Examples herein, further comprising an energy harvester.

Example 8: The device of any one of the Examples herein, wherein the energy harvester is configured to derive power from energy sources in the environment.

Example 9: The device of any one of the Examples herein, wherein the energy harvest is configured to derive power from at least one of: solar energy, thermal energy, or kinetic energy.

Example 10: The device of any one of the Examples herein, wherein the energy harvester comprises at least one of: a photovoltaic cell, a thermoelectric generator, or a piezoelectric crystal.

Example 11: The device of any one of the Examples herein, further comprising a wired power input configured to receive power over a wired electrical connection.

Example 12: The device of any one of the Examples herein, further comprising a network interface.

Example 13: The device of any one of the Examples herein, wherein the network interface is configured to communicate via at least one WIFI network.

Example 14: The device of any one of the Examples herein, wherein the network interface is configured to communicate via at least one BLUETOOTH network.

Example 15: The device of any one of the Examples herein, wherein the device comprises an audio playback device.

Example 16: The device of any one of the Examples herein, wherein the device comprises one or more amplifiers configured to drive one or more audio transducers.

Example 17: The device of any one of the Examples herein, wherein the device comprises one or more audio transducers.

Example 18: The device of any one of the Examples herein, wherein the device comprises at least one of: a soundbar, a subwoofer, a headphone device, a portable audio playback device, an architectural playback device, or a video playback device.

Example 19: The device of any one of the Examples herein, wherein the wireless power transmitter is configured to transmit wireless power via electromagnetic coupling.

Example 20: The device of any one of the Examples herein, wherein the wireless power transmitter is configured to transmit wireless power via electromagnetic radiation.

Example 21: The device of any one of the Examples herein, wherein the wireless power transmitter comprises a laser.

Example 22: The device of any one of the Examples herein, wherein the wireless power transmitter comprises a microwave source.

Example 23: The device of any one of the Examples herein, wherein the wireless power transmitter comprises an electrically conductive coil.

Example 24: The device of any one of the Examples herein, wherein the wireless power transmitter is configured to transmit wireless power via one or more of: inductive coupling, resonant inductive coupling, capacitive coupling, magnetodynamic coupling, microwaves, infrared, or laser.

Example 25: The device of any one of the Examples herein, wherein the wireless power transmitter is a mid-range or long-range wireless power transmitter.

Example 26: The device of any one of the Examples herein, wherein the wireless power transmitter is configured to transmit wireless power over a distance of greater than about 10 cm, about 50 cm, or about 1 m.

Example 27: The device of any one of the Examples herein, wherein the wireless power receiver is configured to receive wireless power via electromagnetic coupling.

Example 28: The device of any one of the Examples herein, wherein the wireless power receiver is configured to receive wireless power via electromagnetic radiation.

Example 29: The device of any one of the Examples herein, wherein the wireless power receiver comprises a photovoltaic cell.

Example 30: The device of any one of the Examples herein, wherein the wireless power receiver comprises a diode.

Example 31: The device of any one of the Examples herein, wherein the wireless power receiver comprises an electrically conductive coil.

Example 32: The device of any one of the Examples herein, wherein the wireless power receiver is configured to receive wireless power via one or more of: inductive coupling, resonant inductive coupling, capacitive coupling, magnetodynamic coupling, microwaves, infrared, or laser.

Example 33: The device of any one of the Examples herein, wherein the wireless power receiver is a mid-range or long-range wireless power receiver.

Example 34: The device of any one of the Examples herein, wherein the wireless power receiver is configured to receive wireless power over a distance of greater than about 10 cm, about 50 cm, or about 1 m.

Example 35: The device of any one of the Examples herein, wherein device comprises a first audio playback device, wherein the one or more external devices comprises a second audio playback device, and wherein the first audio playback device is configured to play back audio content in synchrony with the second audio playback device.

Example 36: A method comprising transmitting, via a wireless power transmitter, wireless power to one or more external receiver devices.

Example 37: A method comprising receiving, via a wireless power receiver, wireless power from one or more external transmitter devices.

Example 38: The method of any one of the Examples herein, wherein the method comprises both transmitting wireless power to one or more external receiver devices and receiving wireless power from one or more external transmitter devices.

Example 39: The method of any one of the Examples herein, further comprising storing energy via an energy storage component using the received wireless power.

Example 40: The method of any one of the Examples herein, wherein the energy storage component comprises a rechargeable battery.

Example 41: The method of any one of the Examples herein, wherein the energy storage component comprises a capacitor.

Example 42: The method of any one of the Examples herein, further comprising harvesting energy via one or more energy harvesters.

Example 43: The method of any one of the Examples herein, wherein harvesting energy comprises deriving power from energy sources in the environment.

Example 44: The method of any one of the Examples herein, wherein harvesting energy comprises deriving power from at least one of: solar energy, thermal energy, or kinetic energy.

Example 45: The method of any one of the Examples herein, wherein the energy harvester comprises at least one of: a photovoltaic cell, a thermoelectric generator, or a piezoelectric crystal.

Example 46: The method of any one of the Examples herein, further comprising receiving power via a wired electrical connection.

Example 47: The method of any one of the Examples herein, further comprising communicating with one or more external devices via a network interface.

Example 48: The method of any one of the Examples herein, wherein communicating via the network interface comprises communicating via a WIFI network.

Example 49: The method of any one of the Examples herein, wherein communicating via the network interface comprises communicating via a BLUETOOTH network.

Example 50: The method of any one of the Examples herein, further comprising playing back audio via one or more amplifiers of the device.

Example 51: The method of any one of the Examples herein, wherein the device comprises at least one of: a soundbar, a subwoofer, a headphone device, a portable audio playback device, an architectural playback device, or a video playback device.

Example 52: The method of any one of the Examples herein, wherein transmitting wireless power comprises transmitting wireless power via electromagnetic coupling.

Example 53: The method of any one of the Examples herein, wherein transmitting wireless power comprises transmitting wireless power via electromagnetic radiation.

Example 54: The method of any one of the Examples herein, wherein transmitting wireless power comprises emitting light.

Example 55: The method of any one of the Examples herein, wherein transmitting wireless power comprises emitting microwaves.

Example 56: The method of any one of the Examples herein, wherein transmitting wireless power comprises supplying current to an electrically conductive coil.

Example 57: The method of any one of the Examples herein, wherein transmitting wireless power comprises transmitting wireless power via one or more of: inductive coupling, resonant inductive coupling, capacitive coupling, magnetodynamic coupling, microwaves, infrared, or laser.

Example 58: The method of any one of the Examples herein, wherein transmitting wireless power comprises transmitting wireless power over a mid- or long-range distance.

Example 59: The method of any one of the Examples herein, wherein transmitting wireless power comprises transmitting wireless power over a distance of greater than about 10 cm, about 50 cm, or about 1 m.

Example 60: The method of any one of the Examples herein, wherein receiving the wireless power comprises receiving wireless power via electromagnetic coupling.

Example 61: The method of any one of the Examples herein, wherein receiving the wireless power comprises receiving wireless power via electromagnetic radiation.

Example 62: The method of any one of the Examples herein, wherein receiving the wireless power comprises receiving light at a photovoltaic cell.

Example 63: The method of any one of the Examples herein, wherein receiving the wireless power comprises receiving light at a diode.

Example 64: The method of any one of the Examples herein, wherein receiving the wireless power comprises receiving an induced electrical current in an electrically conductive coil.

Example 65: The method of any one of the Examples herein, wherein receiving the wireless power comprises receiving wireless power via one or more of: inductive coupling, resonant inductive coupling, capacitive coupling, magnetodynamic coupling, microwaves, infrared, or laser.

Example 66: The method of any one of the Examples herein, wherein the wireless power receiver is a mid-range or long-range wireless power receiver.

Example 67: The method of any one of the Examples herein, wherein receiving wireless power comprises receiving wireless power from the one or more external transmitter devices over a mid- or far-range distance.

Example 68: The method of any one of the Examples herein, wherein receiving wireless power comprises receiving wireless power from the one or more external transmitter devices over a distance of greater than about 10 cm, about 50 cm, or about 1 m.

Example 69: The method of any one of the Examples herein, wherein the device comprises a first audio playback device, wherein the one or more external devices comprises a second audio playback device, and the method further comprising playing back audio content, via the first audio playback device, in synchrony with the second audio playback device.

Example 70: A device comprising: a wireless power transmitter; one or more processors; and one or more non-transitory computer-readable media storing instructions that, when executed by the one or more processors, cause the device to perform operations comprising: causing the wireless power transmitter to transmit wireless power to one or more external devices; receiving, via the network interface, a power receipt parameter of the one or more external devices; after receiving the power receipt parameter, causing the wireless power transmitter to modify wireless power transmission.

Example 71: The device of any one of the Examples herein, wherein the power receipt parameter comprises an indication of wireless power received at the one or more external devices.

Example 72: The device of any one of the Examples herein, wherein the power receipt parameter comprises an indication of a level of wireless power received at the one or more external devices.

Example 73: The device of any one of the Examples herein, wherein the power receipt parameter comprises a battery level indication of the one or more external devices.

Example 74: The device of any one of the Examples herein, wherein the device comprises a first audio playback device, and wherein the one or more external devices comprises one or more second audio playback devices.

Example 75: The device of any one of the Examples herein, wherein modifying wireless power transmission comprises ceasing transmission of wireless power.

Example 76: The device of any one of the Examples herein, wherein modifying wireless power transmission comprises temporarily suspending transmission of wireless power for a period of time; and after the period of time, resuming transmission of wireless power.

Example 77: The device of any one of the Examples herein, wherein modifying wireless power transmission comprises changing a directional output of the wireless power.

Example 78: The device of any one of the Examples herein, wherein modifying wireless power transmission comprises transmitting wireless power to a second one or more external devices different from the first.

Example 79: The device of any one of the Examples herein, wherein the one or more external devices are spaced apart from the device by at least about 10 cm, about 50 cm, or about 1 m.

Example 80: A method comprising: transmitting wireless power from a transmitter device to one or more external devices; receiving, via a network interface, at the transmitter device, a power receipt parameter of the one or more external devices; after receiving the power receipt parameter, causing modifying the transmission of wireless power from the transmitter device.

Example 81: The method of any one of the Examples herein, wherein the power receipt parameter comprises an indication of wireless power received at the one or more external devices.

Example 82: The method of any one of the Examples herein, wherein the power receipt parameter comprises an indication of a level of wireless power received at the one or more external devices.

Example 83: The method of any one of the Examples herein, wherein the power receipt parameter comprises a battery level indication of the one or more external devices.

Example 84: The method of any one of the Examples herein, wherein the transmitter device comprises a first audio playback device, and wherein the one or more external devices comprises one or more second audio playback devices.

Example 85: The method of any one of the Examples herein, wherein modifying wireless power transmission comprises ceasing transmission of wireless power.

Example 86: The method of any one of the Examples herein, wherein modifying wireless power transmission comprises temporarily suspending transmission of wireless power for a period of time; and after the period of time, resuming transmission of wireless power.

Example 87: The method of any one of the Examples herein, wherein modifying wireless power transmission comprises changing a directional output of the wireless power.

Example 88: The method of any one of the Examples herein, wherein modifying wireless power transmission comprises transmitting wireless power to a second one or more external devices different from the first.

Example 89: The method of any one of the Examples herein, wherein the one or more external devices are spaced apart from the device by at least about 10 cm, about 50 cm, or about 1 m.

Example 90: A device comprising: a wireless power transmitter; one or more processors; and one or more non-transitory computer-readable media storing instructions that, when executed by the one or more processors, cause the device to perform operations comprising: outputting instructions to facilitate placement of the one or more second devices; and causing the wireless power transmitter to transmit wireless power to one or more second devices.

Example 91: The device of any one of the Examples herein, wherein the instructions comprise audible output.

Example 92: The device of any one of the Examples herein, wherein the audible output comprises real-time audio feedback regarding placement of the one or more second devices.

Example 93: The device of any one of the Examples herein, wherein the instructions comprise one or more positioning guides.

Example 94: The device of any one of the Examples herein, wherein the instructions comprise an optical projection.

Example 95: The device of any one of the Examples herein, wherein outputting instructions comprises causing an augmented reality visualization to be displayed via a control device.

Example 96: The device of any one of the Examples herein, wherein the instructions indicate a position of the one or more second devices suitable to receive wireless power.

Example 97: The device of any one of the Examples herein, wherein the instructions indicate a position of the one or more second devices suitable to receive wireless power from the wireless transmitter.

Example 98: The device of any one of the Examples herein, wherein the instructions indicate one or more positions of the one or more second devices based at least in part on a projected acoustical performance of the one or more second devices at the one or more positions.

Example 99: The device of any one of the Examples herein, wherein the operations further comprise receiving a power receipt parameter indicating acceptable placement of the one or more second devices.

Example 100: The device of any one of the Examples herein, wherein the operations further comprise outputting an indicator to the user of successful placement of the one or more second devices.

Example 101: The device of any one of the Examples herein, wherein the indicator comprises at least one of: (i) a light, (ii) a sound, or (iii) a notification output via a control device.

Example 102: The device of any one of the Examples herein, wherein the instructions indicate a position at least about 10 cm, at least about 50 cm, or at least about 1 m away from the device.

Example 103: A method comprising: outputting instructions, via a wireless power transmitter device, to facilitate placement of one or more wireless power receiver devices; and transmitting wireless power to the one or more wireless power receiver devices.

Example 104: The method of any one of the Examples herein, wherein the instructions comprise audible output.

Example 105: The method of any one of the Examples herein, wherein the audible output comprises real-time audio feedback regarding placement of the one or more wireless power receiver devices.

Example 106: The method of any one of the Examples herein, wherein the instructions comprise one or more positioning guides.

Example 107: The method of any one of the Examples herein, wherein outputting the instructions comprise projecting optically projecting one or more placement indicators.

Example 108: The method of any one of the Examples herein, wherein outputting instructions comprises causing an augmented reality visualization to be displayed via a control device.

Example 109: The method of any one of the Examples herein, wherein the instructions indicate a position of the one or more second devices suitable to receive wireless power.

Example 110: The method of any one of the Examples herein, wherein the instructions indicate a position of the one or more wireless power receiver devices suitable to receive wireless power from the wireless transmitter device.

Example 111: The method of any one of the Examples herein, wherein the instructions indicate one or more positions of the one or more wireless power receiver devices based at least in part on a projected acoustical performance of the one or more wireless power receiver devices at the one or more positions.

Example 112: The method of any one of the Examples herein, wherein the operations further comprise receiving a power receipt parameter indicating acceptable placement of the one or more wireless power receiver devices.

Example 113: The method of any one of the Examples herein, wherein the operations further comprise outputting an indicator to a user of successful placement of the one or more wireless power receiver devices.

Example 114: The method of any one of the Examples herein, wherein the indicator comprises at least one of: (i) a light, (ii) a sound, or (iii) a notification output via a control device.

Example 115: The method of any one of the Examples herein, wherein the instructions indicate a position at least about 10 cm, at least about 50 cm, or at least about 1 m away from the wireless power transmitter.

Example 116: A device, comprising: a wireless power receiver; a wireless power transmitter; one or more processors; and one or more non-transitory computer-readable media storing instructions that, when executed by the one or more processors, cause the device to perform operations comprising: receiving power via the wireless power receiver from an external transmitter device; causing the wireless power transmitter to transmit wireless power to an external receiver device different from the external transmitter device; and after a change in power received via the wireless power receiver, causing the wireless power transmitter to modify wireless power transmission.

Example 117: The device of any one of the Examples herein, wherein the external transmitter device and the external receiver device are distinct.

Example 118: The device of any one of the Examples herein, wherein the change in power received comprises a reduction in a rate of power received.

Example 119: The device of any one of the Examples herein, wherein causing the wireless power transmitter to modify wireless power transmission comprises causing the wireless power transmitter to cease wireless power transmission.

Example 120: The device of any one of the Examples herein, wherein causing the wireless power transmitter to modify wireless power transmission comprises causing the wireless power transmitter to redirect wireless power transmission towards a second, different external receiver device.

Example 121: The device of any one of the Examples herein, wherein causing the wireless power transmitter to modify wireless power transmission comprises causing the wireless power transmitter to reduce a rate of wireless power transmission.

Example 122: The device of any one of the Examples herein, wherein the device comprises a first audio playback device, wherein the external transmitter device comprises a second audio playback device, and wherein the first audio playback device is configured to play back audio content synchronously with the second audio playback device.

Example 123: The device of any one of the Examples herein, wherein the device comprises a first audio playback device, wherein the external receiver device comprises a third audio playback device, and wherein the first audio playback device is configured to play back audio content synchronously with the third audio playback device.

Example 124: The device of any one of the Examples herein, wherein the operations further comprise: sending a signal to a second external transmitter device; and after sending the signal, receiving wireless power from the second external transmitter device.

Example 125: The device of any one of the Examples herein, wherein the second external transmitter device comprises an audio playback device.

Example 126: A method comprising: receiving, at a first device, wireless power from an external transmitter device; transmitting, via the first device, wireless power to an external receiver device; and after a change in power received from the external transmitter device, modifying the transmission of wireless power to the external receiver device.

Example 127: The method of any one of the Examples herein, wherein the external receiver device and the external transmitter device are distinct.

Example 128: The method of any one of the Examples herein, wherein the change in power received comprises a reduction in a rate of power received.

Example 129: The method of any one of the Examples herein, wherein modifying the transmission of wireless power comprises ceasing wireless power transmission.

Example 130: The method of any one of the Examples herein, wherein modifying the transmission of wireless power comprises redirecting wireless power transmission towards a second, different external receiver device.

Example 131: The method of any one of the Examples herein, modifying the transmission of wireless power comprises reducing a rate of wireless power transmission.

Example 132: The method of any one of the Examples herein, wherein the device comprises a first audio playback device, wherein the external transmitter device comprises a second audio playback device, the method further comprising playing back audio content via the first audio playback device, in synchrony with the second audio playback device.

Example 133: The method of any one of the Examples herein, wherein the device comprises a first audio playback device, wherein the external receiver device comprises a third audio playback device, the method further comprising playing back audio content via the first audio playback device in synchrony with the third audio playback device.

Example 134: The method of any one of the Examples herein, further comprising: sending a signal to a second external transmitter device; and after sending the signal, receiving wireless power from the second external transmitter device.

Example 135: The method of any one of the Examples herein, wherein the second external transmitter device comprises an audio playback device.

Example 136: A device comprising: a wireless power receiver; one or more processors; and one or more non-transitory computer-readable media storing instructions that, when executed by the one or more processors, cause the device to perform operations comprising: receiving wireless power via the wireless power receiver; based on received wireless power, modulating operation of the device.

Example 137: The device of any one of the Examples herein, further comprising an energy storage component, the operations further comprising: monitoring a level of the energy storage component; and based on the power level, modulating operation of the device.

Example 138: The device of any one of the Examples herein, wherein the device comprises an audio playback device, and wherein modulating operation of the device comprises modulating audio playback.

Example 139: The device of any one of the Examples herein, wherein the device comprises an audio playback device, and wherein modulating operation of the device comprises reducing a volume of audio playback.

Example 140: The device of any one of the Examples herein, wherein the device comprises an audio playback device, and wherein modulating operation of the device comprises reducing a low-frequency output of audio playback.

Example 141: The device of any one of the Examples herein, wherein the device comprises a first audio playback device, and wherein modulating operation of the device comprises routing at least a portion of low-frequency audio content to a second audio playback device for synchronous playback.

Example 142: The device of any one of the Examples herein, wherein modulating operation of the device comprises disabling at least one microphone of the device.

Example 143: The device of any one of the Examples herein, wherein the device comprises an audio playback device, and wherein modulating operation of the device comprises causing a different external transmitter device to initiate wireless power transmission.

Example 144: The device of any one of the Examples herein, wherein modulating operation of the device comprises outputting an alert to the user indicating low wireless power reception.

Example 145: The device of any one of the Examples herein, wherein outputting the alert comprises outputting an audible indication of low wireless power reception or outputting a visible indication of low wireless power reception.

Example 146: A method comprising: receiving, at a device, wireless power; based on received wireless power, modulating operation of the device.

Example 147: The method of any one of the Examples herein, further comprising: monitoring a level of an energy storage component of the device; and based on the power level, modulating operation of the device.

Example 148: The method of any one of the Examples herein, wherein the device comprises an audio playback device, and wherein modulating operation of the device comprises modulating audio playback.

Example 149: The method of any one of the Examples herein, wherein the device comprises an audio playback device, and wherein modulating operation of the device comprises reducing a volume of audio playback.

Example 150: The method of any one of the Examples herein, wherein the device comprises an audio playback device, and wherein modulating operation of the device comprises reducing a low-frequency output of audio playback.

Example 151: The method of any one of the Examples herein, wherein the device comprises a first audio playback device, and wherein modulating operation of the device comprises routing at least a portion of low-frequency audio content to a second audio playback device for synchronous playback.

Example 152: The method of any one of the Examples herein, wherein modulating operation of the device comprises disabling at least one microphone of the device.

Example 153: The method of any one of the Examples herein, wherein the device comprises an audio playback device, and wherein modulating operation of the device comprises causing a different external transmitter device to initiate wireless power transmission.

Example 154: The method of any one of the Examples herein, wherein modulating operation of the device comprises outputting an alert to the user indicating low wireless power reception.

Example 155: The method of any one of the Examples herein, wherein outputting the alert comprises outputting an audible indication of low wireless power reception or outputting a visible indication of low wireless power reception.

Example 156: A first playback device comprising one or more amplifiers configured to drive one or more audio transducers; a wireless power receiver; one or more processors; and one or more non-transitory computer-readable media storing instructions that, when executed by the one or more processors, cause the first playback device to perform operations comprising: playing back audio content synchronously with a second playback device; receiving an indication of reduced wireless power reception at the second playback device; and after receiving the indication, modulating operation of the first playback device.

Example 157: The device of any one of the Examples herein, wherein modulating operation of the first playback device comprises modulating audio playback to correspond to audio playback via the second playback device.

Example 158: The device of any one of the Examples herein, wherein modulating operation of the first playback device comprises reducing a volume of audio playback.

Example 159: The device of any one of the Examples herein, wherein modulating operation of the first playback device comprises reducing a low-frequency output of audio playback.

Example 160: The device of any one of the Examples herein, wherein modulating operation of the first playback device comprises routing at least a portion of low-frequency audio content to a third audio playback device for synchronous playback.

Example 161: The device of any one of the Examples herein, further comprising a wireless power transmitter, wherein modulating operation of the device comprises wirelessly transmitting power to the second audio playback device via the wireless power transmitter.

Example 162: The device of any one of the Examples herein, wherein outputting the alert comprises outputting an audible indication of low wireless power reception or outputting a visible indication of low wireless power reception.

Example 163: A method comprising: playing back audio, via a first playback device, synchronously with a second playback device; receiving, at the first playback device, an indication of reduced wireless power reception at the second playback device; and after receiving the indication, modulating operation of the first playback device.

Example 164: The method of any one of the Examples herein, wherein modulating operation of the device comprises modulating audio playback to correspond to audio playback via the second playback device.

Example 165: The method of any one of the Examples herein, wherein modulating operation of the first playback device comprises reducing a volume of audio playback.

Example 166: The method of any one of the Examples herein, wherein modulating operation of the first playback device comprises reducing a low-frequency output of audio playback.

Example 167: The method of any one of the Examples herein, wherein modulating operation of the first playback device comprises routing at least a portion of low-frequency audio content to a third audio playback device for synchronous playback.

Example 168: The method of any one of the Examples herein, wherein modulating operation of the first playback device comprises wirelessly transmitting power from the first audio playback device to the second audio playback device via a wireless power transmitter.

Example 169: The method of any one of the Examples herein, wherein outputting the alert comprises outputting an audible indication of low wireless power reception or outputting a visible indication of low wireless power reception.

Example 170: A device comprising: a wireless power receiver; one or more processors; and one or more non-transitory computer-readable media storing instructions that, when executed by the one or more processors, cause the device to perform operations comprising: receiving or determining a use parameter; receiving wireless power via the wireless power receiver; and based on the use parameter, modulating operation of the device.

Example 171: The device of any one of the Examples herein, wherein the use parameter is based at least in part on a scheduled device operation time.

Example 172: The device of any one of the Examples herein, wherein the use parameter is based at least in part on a detected presence of a user.

Example 173: The device of any one of the Examples herein, wherein the detected presence of a user is based on at least one of: sonic detection or optical detection.

Example 174: The device of any one of the Examples herein, wherein the detected presence of a user is based on at least one of: ultrasonic detection or infrared detection.

Example 175: The device of any one of the Examples herein, wherein the detected presence of a user is based on a pattern of received wireless power.

Example 176: The device of any one of the Examples herein, wherein a temporary reduction in wireless power received indicates the detected presence of a user.

Example 177: The device of any one of the Examples herein, wherein the detected presence of a user is based on a received signal strength indicator (RSSI).

Example 178: The device of any one of the Examples herein, wherein modulating operation of the device comprises transitioning the device into a low-power state.

Example 179: The device of any one of the Examples herein, wherein modulating operation of the device comprises disabling one or more microphones of the device.

Example 180: The device of any one of the Examples herein, wherein the device comprises an audio playback device, and wherein modulating operation of the device comprises modulating playback of audio content.

Example 181: The device of any one of the Examples herein, wherein modulating playback of audio content comprises reducing a volume of audio playback.

Example 182: The device of any one of the Examples herein, wherein modulating playback of audio content comprises pausing or ceasing audio playback.

Example 183: The device of any one of the Examples herein, wherein modulating operation of the device comprises transitioning the device from an active state into a low-power state according to a schedule, wherein the schedule includes staggered periods of low-power states for a plurality of devices, such that at any given time at least one device of the plurality of devices is in an active state.

Example 184: The device of any one of the Examples herein, wherein the use parameter comprises a user-sleep indication, and wherein modifying operation of the device comprises one or more of: dimming a light, turning off a light, delaying or forgoing a software update, or suppressing an audio output.

Example 185: A method comprising: receiving or determining a use parameter via a device; receiving wireless power via a wireless power receiver of the device; and based on the use parameter, modulating operation of the device.

Example 186: The method of any one of the Examples herein, wherein the use parameter is based at least in part on a scheduled device operation time.

Example 187: The method of any one of the Examples herein, wherein the use parameter is based at least in part on a detected presence of a user.

Example 188: The method of any one of the Examples herein, wherein the detected presence of a user is based on at least one of: sonic detection or optical detection.

Example 189: The method of any one of the Examples herein, wherein the detected presence of a user is based on at least one of: ultrasonic detection or infrared detection.

Example 190: The method of any one of the Examples herein, wherein the detected presence of a user is based on a pattern of received wireless power.

Example 191: The method of any one of the Examples herein, wherein a temporary reduction in wireless power received indicates the detected presence of a user.

Example 192: The method of any one of the Examples herein, wherein the detected presence of a user is based on a received signal strength indicator (RSSI).

Example 193: The method of any one of the Examples herein, wherein modulating operation of the device comprises transitioning the device into a low-power state.

Example 194: The method of any one of the Examples herein, wherein modulating operation of the device comprises disabling one or more microphones of the device.

Example 195: The method of any one of the Examples herein, wherein the device comprises an audio playback device, and wherein modulating operation of the device comprises modulating playback of audio content.

Example 196: The method of any one of the Examples herein, wherein modulating playback of audio content comprises reducing a volume of audio playback.

Example 197: The method of any one of the Examples herein, wherein modulating playback of audio content comprises pausing or ceasing audio playback.

Example 198: The method of any one of the Examples herein, wherein modulating operation of the device comprises transitioning the device from an active state into a low-power state according to a schedule, wherein the schedule includes staggered periods of low-power states for a plurality of devices, such that at any given time at least one device of the plurality of devices is in an active state.

Example 199: The method of any one of the Examples herein, wherein the use parameter comprises a user-sleep indication, and wherein modifying operation of the device comprises one or more of: dimming a light, turning off a light, delaying or forgoing a software update, or suppressing an audio output.

Example 200: A device comprising: a wireless signal transmitter configured to transmit a wireless power signal; one or more processors; and one or more non-transitory computer-readable media storing instructions that, when executed by the one or more processors, cause the playback device to perform operations comprising: causing the wireless signal transmitter to transmit a wireless power signal that is modulated to carry data.

Example 201: The device of any one of the Examples herein, wherein the data comprises instructions to a receiver device to modulate device operation.

Example 202: The device of any one of the Examples herein, wherein the instructions comprise instructions to dim one or more lights, disable one or more microphones, or modify one or more audio playback parameters.

Example 203: The device of any one of the Examples herein, wherein the data comprises a battery level indication.

Example 204: The device of any one of the Examples herein, wherein the data comprises identifying information of the device.

Example 205: The device of any one of the Examples herein, wherein the data comprises synchronization data.

Example 206: The device of any one of the Examples herein, wherein the data comprises audio playback synchronization data.

Example 207: The device of any one of the Examples herein, wherein the data comprises audio content metadata.

Example 208: The device of any one of the Examples herein, wherein the wireless power signal is modulated to carry data using at least one of: frequency modulation, amplitude modulation, phase modulation, pulse width modulation, or spread spectrum modulation.

Example 209: The device of any one of the Examples herein, wherein the wireless power signal comprises a first wireless power signal modulated according to a first modulation scheme, the operations further comprising causing the wireless power transmitter to transmit a second wireless power signal modulated according to a second modulation scheme different from the first.

Example 210: The device of any one of the Examples herein, the operations further comprising monitoring an energy storage level of the device, and based at least in part on the energy storage level, modifying a modulation scheme used to modulate the wireless power signal.

Example 211: A method comprising: to transmit, via a device, a wireless power signal; modulating the wireless power signal to carry data therein.

Example 212: The method of any one of the Examples herein, wherein the data comprises instructions to a receiver device to modulate device operation.

Example 213: The method of any one of the Examples herein, wherein the instructions comprise instructions to dim one or more lights, disable one or more microphones, or modify one or more audio playback parameters.

Example 214: The method of any one of the Examples herein, wherein the data comprises a battery level indication.

Example 215: The method of any one of the Examples herein, wherein the data comprises identifying information of the device.

Example 216: The method of any one of the Examples herein, wherein the data comprises synchronization data.

Example 217: The method of any one of the Examples herein, wherein the data comprises audio playback synchronization data.

Example 218: The method of any one of the Examples herein, wherein the data comprises audio content metadata.

Example 219: The method of any one of the Examples herein, wherein modulating the wireless power signal comprises using at least one of: frequency modulation, amplitude modulation, phase modulation, pulse width modulation, or spread spectrum modulation.

Example 220: The method of any one of the Examples herein, wherein the wireless power signal comprises a first wireless power signal modulated according to a first modulation scheme, the method further comprising transmit a second wireless power signal modulated according to a second modulation scheme different from the first.

Example 221: The method of any one of the Examples herein, further comprising monitoring an energy storage level of the device, and based at least in part on the energy storage level, modifying a modulation scheme used to modulate the wireless power signal.

Example 222: A device comprising: a wireless signal receiver configured to receive a wireless power signal; and one or more non-transitory computer-readable media storing instructions that, when executed by the one or more processors, cause the playback device to perform operations comprising: receiving, from an external transmitter device, a wireless power signal that is modulated to carry data; based on the data, modulating operation of the device.

Example 223: The device of any one of the Examples herein, the operations further comprising recovering power from the wireless power signal.

Example 224: The device of any one of the Examples herein, the operations further comprising using power from the wireless power signal to drive one or more amplifiers.

Example 225: The device of any one of the Examples herein, the operations further comprising recovering data from the wireless power signal.

Example 226: The device of any one of the Examples herein, wherein modulating operation of the device comprises dimming one or more lights, disabling one or more microphones, or modifying one or more audio playback parameters.

Example 227: The device of any one of the Examples herein, wherein the data comprises a battery level indication of an external transmitter device.

Example 228: The device of any one of the Examples herein, wherein the data comprises identifying information of an external transmitter device.

Example 229: The device of any one of the Examples herein, wherein the data comprises synchronization data.

Example 230: The device of any one of the Examples herein, wherein the data comprises audio playback synchronization data.

Example 231: The device of any one of the Examples herein, wherein the data comprises audio content metadata.

Example 232: The device of any one of the Examples herein, wherein the wireless power signal is modulated to carry data using at least one of: frequency modulation, amplitude modulation, phase modulation, pulse width modulation, or spread spectrum modulation.

Example 233: The device of any one of the Examples herein, the operations further comprising transmitting at least a portion of the data to an external receiver device.

Example 234: The device of any one of the Examples herein, the device further comprising a wireless power transmitter, the operations further comprising causing the wireless power transmitter to transmit a wireless power signal to an external receiver device, the wireless power signal modulated to carry at least a portion of the data.

Example 235: A method comprising: receiving, at a receiver device, from an external transmitter device, a wireless power signal that is modulated to carry data; recovering the data using the wireless power signal; and based on the data, modulating operation of the receiver device.

Example 236: The method of any one of the Examples herein, further comprising recovering power from the wireless power signal.

Example 237: The method of any one of the Examples herein, further comprising using power from the wireless power signal to drive one or more amplifiers.

Example 238: The method of any one of the Examples herein, wherein modulating operation of the receiver device comprises dimming one or more lights, disabling one or more microphones, or modifying one or more audio playback parameters.

Example 239: The method of any one of the Examples herein, wherein the data comprises a battery level indication of an external transmitter device.

Example 240: The method of any one of the Examples herein, wherein the data comprises identifying information of an external transmitter device.

Example 241: The method of any one of the Examples herein, wherein the data comprises synchronization data.

Example 242: The method of any one of the Examples herein, wherein the data comprises audio playback synchronization data.

Example 243: The method of any one of the Examples herein, wherein the data comprises audio content metadata.

Example 244: The method of any one of the Examples herein, wherein modulating the wireless power signal to carry data comprises using at least one of: frequency modulation, amplitude modulation, phase modulation, pulse width modulation, or spread spectrum modulation.

Example 245: The method of any one of the Examples herein, further comprising transmitting at least a portion of the data to an external second receiver device.

Example 246: The method of any one of the Examples herein, transmitting a wireless power signal from the receiver device to an external second receiver device, the wireless power signal modulated to carry at least a portion of the data.

Example 247: A first playback device for playing back audio via a plurality of audio transducers, comprising: one or more amplifiers configured to drive one or more audio transducers; a wireless power receiver; one or more processors; and one or more non-transitory computer-readable media storing instructions that, when executed by the one or more processors, cause the first playback device to perform operations comprising: receiving wireless power from a second playback device; and after receiving the wireless power, configuring the first playback device to play back audio content in synchrony with the second playback device.

Example 248: The device of any one of the Examples herein, wherein configuring the first playback device to play back audio content in synchrony with the second playback device comprises forming a group.

Example 249: The device of any one of the Examples herein, the operations further comprising ceasing receiving the wireless power from the second playback device, and after ceasing receiving the wireless power, removing the first playback device from the group.

Example 250: The device of any one of the Examples herein, the operations further comprising ceasing receiving the wireless power from the second playback device, and after ceasing receiving the wireless power, removing the second playback device from the group.

Example 251: The device of any one of the Examples herein, the operations further comprising modifying operation of the first playback device after configuring the first playback device to play back audio content in synchrony with the second playback device.

Example 252: The device of any one of the Examples herein, wherein modifying operation of the first playback device comprises adjusting a frequency output of the first playback device.

Example 253: The device of any one of the Examples herein, wherein modifying operation of the first playback device comprises reducing an output of low-frequency audio content.

Example 254: A method comprising: receiving, at a first playback device, wireless power from a second playback device; and after receiving the wireless power, configuring the first playback device to play back audio content in synchrony with the second playback device.

Example 255: The method of any one of the Examples herein, wherein configuring the first playback device to play back audio content in synchrony with the second playback device comprises forming a group.

Example 256: The method of any one of the Examples herein, further comprising ceasing receiving the wireless power from the second playback device, and after ceasing receiving the wireless power, removing the first playback device from the group.

Example 257: The method of any one of the Examples herein, further comprising ceasing receiving the wireless power from the second playback device, and after ceasing receiving the wireless power, removing the second playback device from the group.

Example 258: The method of any one of the Examples herein, further comprising modifying operation of the first playback device after configuring the first playback device to play back audio content in synchrony with the second playback device.

Example 259: The method of any one of the Examples herein, wherein modifying operation of the first playback device comprises adjusting a frequency output of the first playback device.

Example 260: The method of any one of the Examples herein, wherein modifying operation of the first playback device comprises reducing an output of low-frequency audio content.

Example 261: A first playback device for playing back audio via a plurality of audio transducers, comprising: one or more amplifiers configured to drive one or more audio transducers; a wireless power receiver; one or more processors; and one or more non-transitory computer-readable media storing instructions that, when executed by the one or more processors, cause the first playback device to perform operations comprising: playing back audio content via the one or more amplifiers in synchrony with a second playback device; receiving wireless power from the second playback device; ceasing receiving wireless power from the second playback device; and after ceasing to receive the wireless power, configuring the first playback device to no longer play back audio content in synchrony with the second playback device.

Example 262: The device of any one of the Examples herein, wherein playing back audio content in synchrony with the second playback device comprises forming a group.

Example 263: The device of any one of the Examples herein, the operations further comprising, after ceasing receiving the wireless power, removing the first playback device from the group.

Example 264: The device of any one of the Examples herein, the operations further comprising, after ceasing receiving the wireless power, removing the second playback device from the group.

Example 265: The device of any one of the Examples herein, the operations further comprising modifying operation of the first playback device after configuring the first playback device to no longer play back audio content in synchrony with the second playback device.

Example 266: The device of any one of the Examples herein, wherein modifying operation of the first playback device comprises adjusting a frequency output of the first playback device.

Example 267: The device of any one of the Examples herein, wherein modifying operation of the first playback device comprises increasing an output of low-frequency audio content.

Example 268: A method comprising: playing back audio content via a first playback device in synchrony with a second playback device; receiving wireless power at the first playback device from the second playback device; ceasing receiving wireless power from the second playback device; and after ceasing to receive the wireless power, configuring the first playback device to no longer play back audio content in synchrony with the second playback device.

Example 269: The method of any one of the Examples herein, wherein playing back audio content in synchrony with the second playback device comprises forming a group.

Example 270: The method of any one of the Examples herein, further comprising, after ceasing receiving the wireless power, removing the first playback device from the group.

Example 271: The method of any one of the Examples herein, further comprising, after ceasing receiving the wireless power, removing the second playback device from the group.

Example 272: The method of any one of the Examples herein, further comprising modifying operation of the first playback device after configuring the first playback device to no longer play back audio content in synchrony with the second playback device.

Example 273: The method of any one of the Examples herein, wherein modifying operation of the first playback device comprises adjusting a frequency output of the first playback device.

Example 274: The method of any one of the Examples herein, wherein modifying operation of the first playback device comprises increasing an output of low-frequency audio content.

Example 275: A method comprising: performing the operations of any one of the Examples herein.

Example 276: A tangible, non-transitory computer-readable medium storing instructions that, when executed by one or more processors, cause the one or more processors to perform operations comprising the method of any one of the Examples herein.

VIII. Conclusion

The above discussions relating to wireless power transfer devices, playback devices, controller devices, playback zone configurations, and media/audio content sources provide only some examples of operating environments within which functions and methods described below may be implemented. Other operating environments and configurations of wireless power transfer systems, media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A method for an audio playback device, the method comprising:

receiving, via a wireless power receiver, wireless power from one or more external transmitter devices;

making a first determination that at least one of a rate or a level of wireless power received from the one or more external transmitter devices has fallen below a predetermined threshold;

based on the first determination, making a first modification of audio playback via the audio playback device;

making a second determination that the rate or the level of wireless power received from the one or more external transmitter devices has exceeded the predetermined threshold; and based on the second determination, making a second modification of audio playback to reverse the first modification.

2. The method of claim 1, wherein the first modification of audio playback comprises reducing a volume of audio playback.

3. The method of claim 1, wherein the first modification of audio playback comprises reducing a low-frequency output of audio playback.

4. The method of claim 1, wherein the one or more external transmitter devices comprises a second audio playback device.

5. The method of claim 4, wherein the audio playback device is configured for synchronous audio playback with the second audio playback device.

6. The method of claim 1, further comprising storing energy via an energy storage component of the audio playback device using the received wireless power.

7. The method of claim 1, wherein receiving wireless power comprises receiving the wireless power over a distance of greater than about 10 cm.

8. An audio playback device comprising:

a wireless power receiver;

one or more processors; and data storage having instructions stored thereon that, when executed by the one or more processors, cause the audio playback device to perform operations comprising:

receiving, via the wireless power receiver, wireless power from one or more external transmitter devices;

making a first determination that at least one of a rate or a level of wireless power received from the one or more external transmitter devices has fallen below a predetermined threshold;

based on the first determination, making a first modification of audio playback via the audio playback device;

making a second determination that the rate or the level of wireless power received from the one or more external transmitter devices has exceeded the predetermined threshold; and based on the second determination, making a second modification of audio playback to reverse the first modification.

9. The audio playback device of claim 8, wherein the first modification of audio playback comprises reducing a volume of audio playback.

10. The audio playback device of claim 8, wherein the first modification of audio playback comprises reducing a low-frequency output of audio playback.

11. The audio playback device of claim 8, wherein the one or more external transmitter devices comprises a second audio playback device.

12. The audio playback device of claim 11, wherein the audio playback device is configured for synchronous audio playback with the second audio playback device.

13. The audio playback device of claim 8, further comprising an energy storage component configured to store energy using the received wireless power.

14. The audio playback device of claim 8, wherein the wireless power receiver is configured to receive the wireless power over a distance of greater than about 10 cm.

15. One or more tangible, non-transitory computer-readable media having stored thereon instructions that, when executed by one or more processors of an audio playback device, cause the audio playback device to perform operations comprising:

receiving, via a wireless power receiver, wireless power from one or more external transmitter devices;

making a first determination that at least one of a rate or a level of wireless power received from the one or more external transmitter devices has fallen below a predetermined threshold;

based on the first determination, making a first modification of audio playback via the audio playback device;

making a second determination that the rate or the level of wireless power received from the one or more external transmitter devices has exceeded the predetermined threshold; and based on the second determination, making a second modification of audio playback to reverse the first modification.

16. The one or more computer-readable media of claim 15, wherein the first modification of audio playback comprises reducing a volume of audio playback.

17. The one or more computer-readable media of claim 15, wherein the first modification of audio playback comprises reducing a low-frequency output of audio playback.

18. The one or more computer-readable media of claim 15, wherein the one or more external transmitter devices comprises a second audio playback device.

19. The one or more computer-readable media of claim 18, wherein the audio playback device is configured for synchronous audio playback with the second audio playback device.

20. The one or more computer-readable media of claim 15, wherein the operations further comprise storing energy via an energy storage component of the audio playback device using the received wireless power.

* * * * *